(12) United States Patent
Tonogai et al.

(10) Patent No.: US 8,212,871 B2
(45) Date of Patent: Jul. 3, 2012

(54) IMAGE PROCESSING DEVICE

(75) Inventors: Norikazu Tonogai, Ayabe (JP); Yutaka Kato, Fukuchiyama (JP); Kiyoshi Imai, Kyoto (JP)

(73) Assignee: Omron Corporation, Tokyo (JP)

(\*) Notice: Subject to any disclaimer, the term of this patent is extended or adjusted under 35 U.S.C. 154(b) by 424 days.

(21) Appl. No.: 12/611,619

(22) Filed: Nov. 3, 2009

(65) Prior Publication Data

US 2010/0110180 A1  May 6, 2010

(30) Foreign Application Priority Data

Nov. 4, 2008 (JP) ............... P2008-283361
Nov. 5, 2008 (JP) ............... P2008-284496
Oct. 6, 2009 (JP) ............... P2009-232626

(51) Int. Cl.
*H04N 7/18* (2006.01)
*H04N 9/68* (2006.01)
(52) U.S. Cl. ...................... 348/136; 348/234
(58) Field of Classification Search ............ None
See application file for complete search history.

(56) References Cited

U.S. PATENT DOCUMENTS

| | | | | |
|---|---|---|---|---|
| 6,765,224 B1 * | 7/2004 | Favreau et al. | ............ | 250/559.4 |
| 7,999,861 B2 * | 8/2011 | Kato | ............... | 348/234 |
| 8,072,507 B2 * | 12/2011 | Fuh et al. | ................. | 348/229.1 |
| 8,115,830 B2 * | 2/2012 | Kato et al. | ................. | 348/234 |
| 2003/0035103 A1 * | 2/2003 | Werzinger et al. | ........ | 356/239.1 |
| 2003/0099407 A1 * | 5/2003 | Matsushima | ................ | 382/274 |
| 2008/0088710 A1 * | 4/2008 | Iwamoto et al. | ............ | 348/220.1 |

FOREIGN PATENT DOCUMENTS

JP  2002-334326  11/2002

\* cited by examiner

*Primary Examiner* — John B. Walsh
(74) *Attorney, Agent, or Firm* — Foley & Lardner LLP

(57) ABSTRACT

This invention provides an image processing device capable of appropriately generating a synthetic image with an enlarged dynamic range even when a measuring article is moving. A work to be a reference (reference work) is imaged a plurality of times under an exposure condition same as that for generating a synthesized image, and specified regions are registered as reference images from a plurality of input images acquired in the respective imaging processes. In an operation mode, a plurality of input images is acquired by imaging a work a plurality of times under a plurality of exposure conditions, and search processes based on the reference images are executed on the respective input images. A partial image having a predetermined size is extracted from each of the plurality of input images based on each specified position, and an image synthesizing process is executed on the plurality of extracted partial images to generate a synthesized image.

20 Claims, 58 Drawing Sheets

FIG. 6
| EXPOSURE TIME LENGTH (SEC.) | BRIGHTNESS RANGE |
|---|---|
| 1/125 | 10~30 |
| 1/250 | 20~40 |
| 1/500 | 30~50 |
| 1/1000 | 40~60 |
| 1/2000 | 50~70 |
| 1/4000 | 60~80 |
| 1/8000 | 70~90 |
| 1/16000 | 80~100 |
FIG. 7A
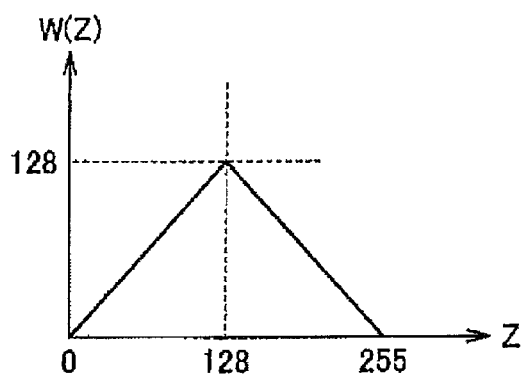
FIG. 7B
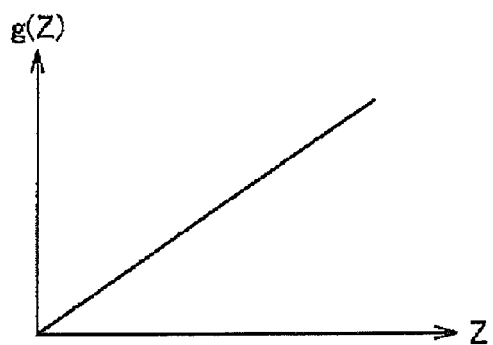

PRESENT EMBODIMENT

← CONVEYING DIRECTION

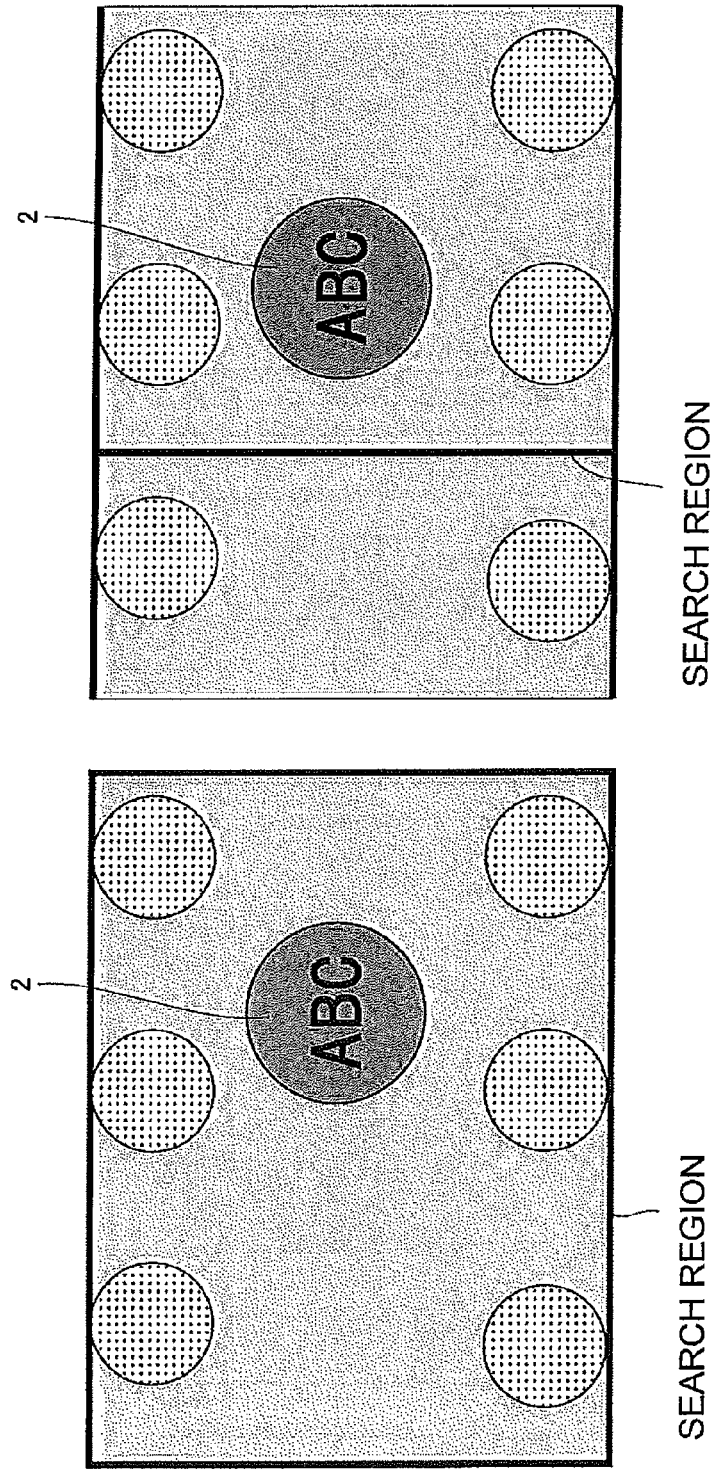

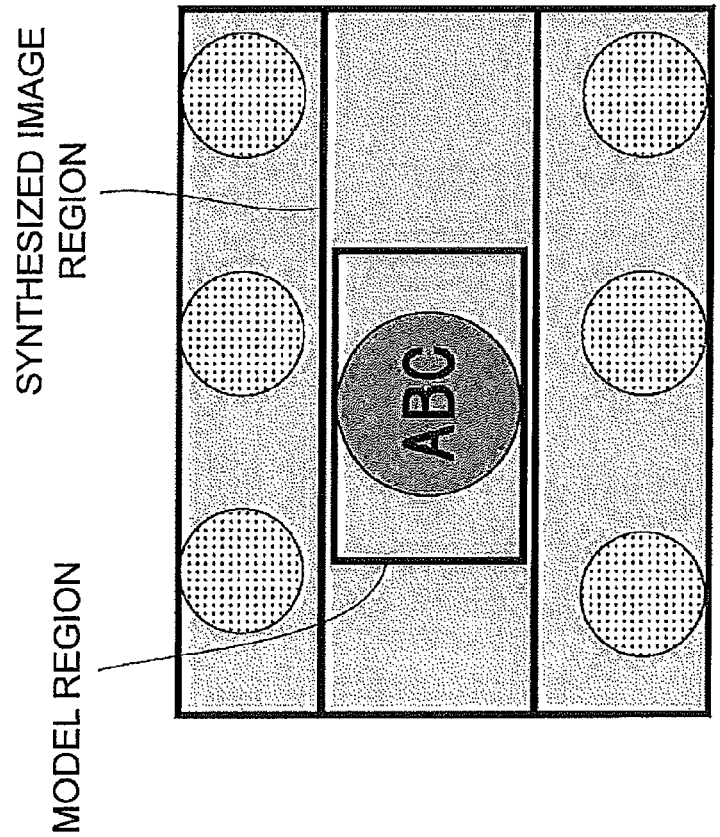
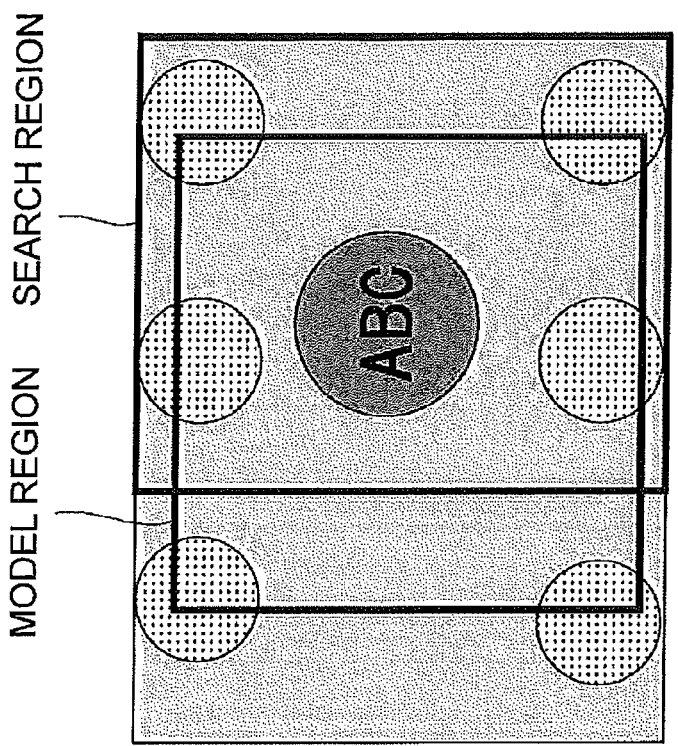
FIG. 47A
FIG. 47B

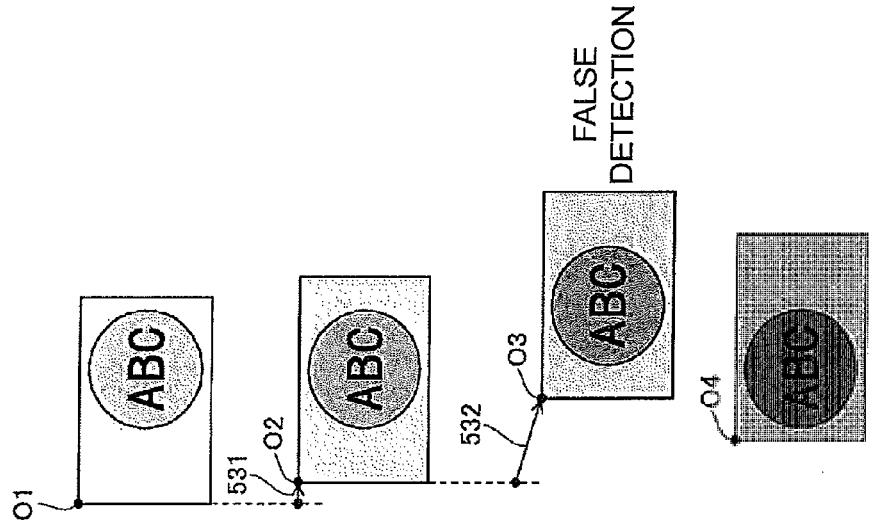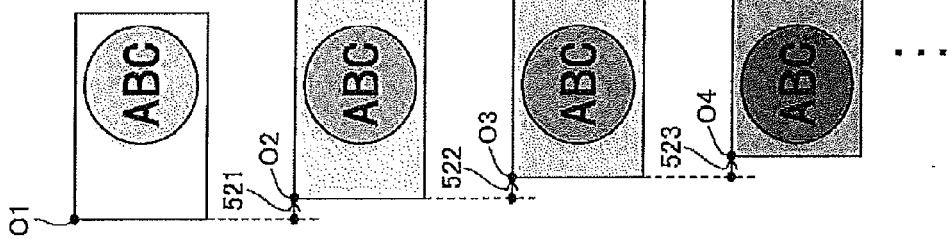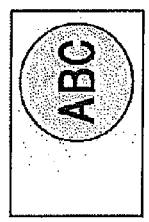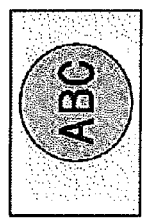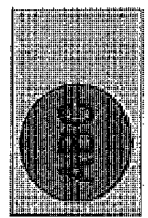

FIG. 49A

|  | 1→2 | 2→3 | 3→4 | 4→5 |
|---|---|---|---|---|
| POSITION SHIFT AMOUNT (x,y) | (24,0) | (40,20) | (23,1) | (24,0) |

FIG. 49B

|  | 1→2 | 2→3 | 3→4 | 4→5 |
|---|---|---|---|---|
| POSITION SHIFT AMOUNT (x,y) | (24,0) | (24,0) | (23,1) | (25,-1) |

| ILLUMINATION INTENSITY (W) | BRIGHTNESS RANGE |
|---|---|
| 0.25 | 10～30 |
| 0.5 | 20～40 |
| 1.0 | 30～50 |
| 2.0 | 40～60 |
| 4.0 | 50～70 |
| 8.0 | 60～80 |
| 16.0 | 70～90 |
| 32.0 | 80～100 |

IMAGE PROCESSING DEVICE

This nonprovisional application claims priority under 35 U.S.C. §119(a) on Patent Applications No. 2008-283361 filed in Japan on Nov. 4, 2008, No. 2008-284496 filed in Japan on Nov. 5, 2008, and No. 2009-232626 filed in Japan on Oct. 6, 2009, the entire contents of which are hereby incorporated by reference.

BACKGROUND OF THE INVENTION

1. Field of the Invention

The present invention relates to an image processing device for synthesizing a plurality of images acquired by carrying out imaging a plurality of times under different exposure conditions so as to enlarge a dynamic range.

2. Description of the Related Art

In the field of FA (Factory Automation) and the like, a so-called visual sensor has been put to practical use as a device for optically testing defects in half-completed products in a manufacturing process, products before shipment, and the like, as well as for optically measuring the size thereof.

A measuring article needs to be appropriately imaged when performing tests and measurements using such a visual sensor. The dynamic range (tone range where light can be detected) of an imaging element such as a CCD (Coupled Charged Device) or a CIS (Complementary Metal Oxide Semiconductor Image Sensor) is generally finite. Thus, when the exposure time length upon imaging becomes relatively long, whiteout (halation) occurs entirely or partially, and luminance and color information on the measuring article cannot be accurately acquired. When the exposure time length upon imaging becomes relatively short, total underexposure occurs entirely or partially, and an effective luminance cannot be acquired. Furthermore, in the measuring article locally having a portion where reflectivity differs and the measuring article having a portion of a large curvature, whiteout and total underexposure may locally occur by the influence of lighting and the like.

Thus, if the difference between the minimum value and the maximum value of light intensity (light energy that enters per unit time) radiated from one measuring article exceeds the dynamic range of the imaging element, the entire measuring article cannot be appropriately imaged.

There is known a technique of enlarging the dynamic range by imaging one measuring article a plurality of times under different exposure conditions and synthesizing a plurality of images acquired therefrom. Such a process is also referred to as a high dynamic synthesizing process or a super latitude process (SL process). For instance, Japanese Laid-Open Patent Publication No. 2002-334326 discloses a visual sensor that enlarges the dynamic range with a small calculation processing load.

In the FA field, the measuring article to be the target of tests and measurements, is generally conveyed on a line of a conveyor or the like. Thus, if the same measuring article is imaged a plurality of times under different exposure conditions to enlarge the dynamic range as described above, the differences in relative position of the measuring article among the images acquired by the respective imaging processes due to the time length required for the series of imaging processes, the imaging view, and the conveying speed of the measuring article may not be ignorable. In other words, as long as the imaging processes by the imaging unit are performed in time-series, the measuring article that was positioned on the upstream of the conveyance path in the first imaging process moves towards the downstream of the conveyance path as the imaging processes proceed.

As a result, when the respective images are synthesized with the view of the imaging unit as a reference, an image in a shifted state appears. Such image shift may cause errors in tests and measurements.

SUMMARY

The present invention has been devised to solve the problems described above, and an object thereof is to provide an image processing device capable of appropriately generating a synthetic image with an enlarged dynamic range even in a case where a measuring article is moving.

In accordance with one aspect of the present invention, an image processing device includes: a camera interface unit, connected to an imaging unit for imaging a measuring article and generating image data, for receiving the image data imaged by the imaging unit; a display screen output unit, connected to a display unit, for outputting display image data to be displayed on the display unit; an input unit for accepting an input from outside; an acquiring unit for acquiring a plurality of images by imaging a plurality of times under different exposure conditions using the imaging unit; a specifying unit for specifying positions of the specific measuring article contained in a plurality of first images acquired by the acquiring unit, respectively; an extraction unit for extracting second images having same sizes from the plurality of first images with the positions of the measuring article as references, respectively; and a synthesizing unit for generating a synthesized image with a dynamic range enlarged by synthesizing the plurality of second images.

Preferably, the image processing device further includes: a registering unit for registering at least one of a reference image showing the specific measuring article and characteristic information of the specific measuring article; wherein the specifying unit specifies the positions of the specific measuring article respectively by searching for one of the pre-registered reference image and the characteristic information in the first images.

The registering unit preferably includes: a portion for extracting a region specified as the reference image from each of a plurality of third images acquired by the acquiring unit; and a portion for performing at least one of registration of the plurality of extracted references images in correspondence with the respective exposure conditions and registration of the characteristic information contained in each of the plurality of extracted reference images in correspondence with the exposure condition of the reference image corresponding to the characteristic information, and the specifying unit performs searching using at least one of the reference image and the characteristic information corresponding to the exposure condition for each of the first images.

The registering unit preferably extracts as the reference image a region having a preset size as a size of the second image to be extracted from the first image.

The registering unit preferably extracts as the reference image a region having a size independent from a region having a preset size as the size of the second image to be extracted from the first image according to the input to the input unit.

In the image processing device, the size of the second image is preferably set on the image being displayed while the image imaged by the imaging unit is being displayed on the display unit.

Preferably, the image processing device further includes: an abnormality monitoring unit for notifying an error when at least one of specification of the positions of the measuring article in the plurality of first images by the specifying unit and extraction of the plurality of second images from the plurality of first images is abnormal.

More preferably, the abnormality monitoring unit displays the region of each of the plurality of extracted second images in correspondence with a view of the imaging unit.

More preferably, the abnormality monitoring unit monitors both of an abnormality in specification of the positions corresponding to the reference images in the plurality of first images and an abnormality in extraction of the plurality of second images from the plurality of first images, and notifies the error with a type of the abnormality being distinguished.

More preferably, the abnormality monitoring unit determines presence of an abnormality according to whether or not a temporal position change of the region of the extracted second image indicates a change estimated from a line speed for conveying the measuring article.

The specifying unit preferably specifies the position of the specific measuring article in one of the subsequently acquired first images by extracting a preset region in one of the first images as a reference image showing the specific measuring article and searching for the reference image in the subsequent first image.

More preferably, the specifying unit extracts the preset region in the first image acquired first as a first reference image showing the specific measuring article, specifies the position of the specific measuring article in the first image acquired second by searching for the first reference image in the first image acquired second, extracts a region corresponding to a position of the first reference image searched in the first image acquired second as a second reference image showing the specific measuring article, and specifies the position of the specific measuring article in the first image acquired third by searching for the second reference image in the first image acquired third.

Alternatively, the synthesizing unit more preferably limits a target region for generation of the synthesized image in each of the plurality of first images to a region set according to the input to the input unit.

Alternatively, the specifying unit more preferably searches in the subsequently acquired first image with limitation to a region corresponding to a movement amount that is calculated by a product of a movement velocity of the measuring article in a view of the imaging unit set according to the input to the input unit and a time length required to acquire the plurality of images under the exposure conditions set according to the input to the input unit.

Alternatively, the image processing device more preferably further includes: a position correction unit for correcting a relative positional relationship between a preceding first image and the subsequent first image so as to correspond to a movement amount, when a relative position shift amount between the preceding first image and the subsequent first image in performing alignment with the specific measuring article in the images as the reference in a series of the plurality of times of imaging by the acquiring unit is different at least by a predetermined value from the movement amount calculated by a product of a movement velocity of the measuring article in a view of the imaging unit set according to the input to the input unit and a time length required to acquire the preceding and subsequent first images under the exposure conditions set according to the input to the input unit.

Preferably, the image processing device further includes: a guide unit for displaying a guide on the display unit by providing the display screen output unit with information indicating a size of a maximum range for generation of the synthesized image of the specific measuring article, according to a movement distance calculated by a product of a movement velocity of the measuring article in a view of the imaging unit set according to the input to the input unit and a time length required to acquire the plurality of images under the exposure conditions set according to the input to the input unit.

More preferably, the guide unit displays the guide on the image imaged by the imaging unit.

More preferably, the synthesizing unit extracts partial images having a predetermined size from the plurality of images, respectively, and generates the synthesized image from the extracted partial images; and the size of the partial images is set on the image being displayed while the image imaged by the imaging unit is being displayed on the display unit.

More preferably, the image processing device further includes: an accepting unit for accepting a line speed for conveying the measuring article and a size of the synthesized image; wherein the guide unit calculates a length of the guide in a conveying direction according to the line speed and the size of the synthesized image.

Preferably, the image processing device further includes: a display control unit for causing the display unit to display the plurality of images acquired by starting the plurality of times of imaging under a plurality of different imaging conditions contained in the determined setting for synthesizing upon the measuring article passing a reference position of a conveying line, with coinciding in a scale size and a direction with respect to a movement direction of the measuring article in the view of the imaging unit.

According to one aspect of the present invention, the synthesized image with an enlarged dynamic range can be appropriately generated even in a case where the measuring article is moving.

BRIEF DESCRIPTION OF THE DRAWINGS

FIG. 6 is a diagram showing one example of a relationship between an exposure time length set in an imaging unit and a "brightness" range suited for imaging;

FIGS. 7A and 7B are diagrams showing one example of characteristics of a weighting function and a response function;

FIGS. 46A and 46A are diagrams for describing effects of the efficient setting function for the search region in the movement follow-up process (sequential extraction type) according to the embodiment of the present invention;

FIGS. 47A and 47B are diagrams for describing each region in the movement follow-up process (sequential extraction type) according to the embodiment of the present invention;

FIGS. 48A to 48C are diagrams for describing the content of a correction function for a position shift in the movement follow-up process (sequential extraction type) according to the embodiment of the present invention;

FIGS. 49A and 49B are diagrams showing one example of the movement amount corresponding to FIGS. 48A to 48C;

DETAILED DESCRIPTION

Figure 1:
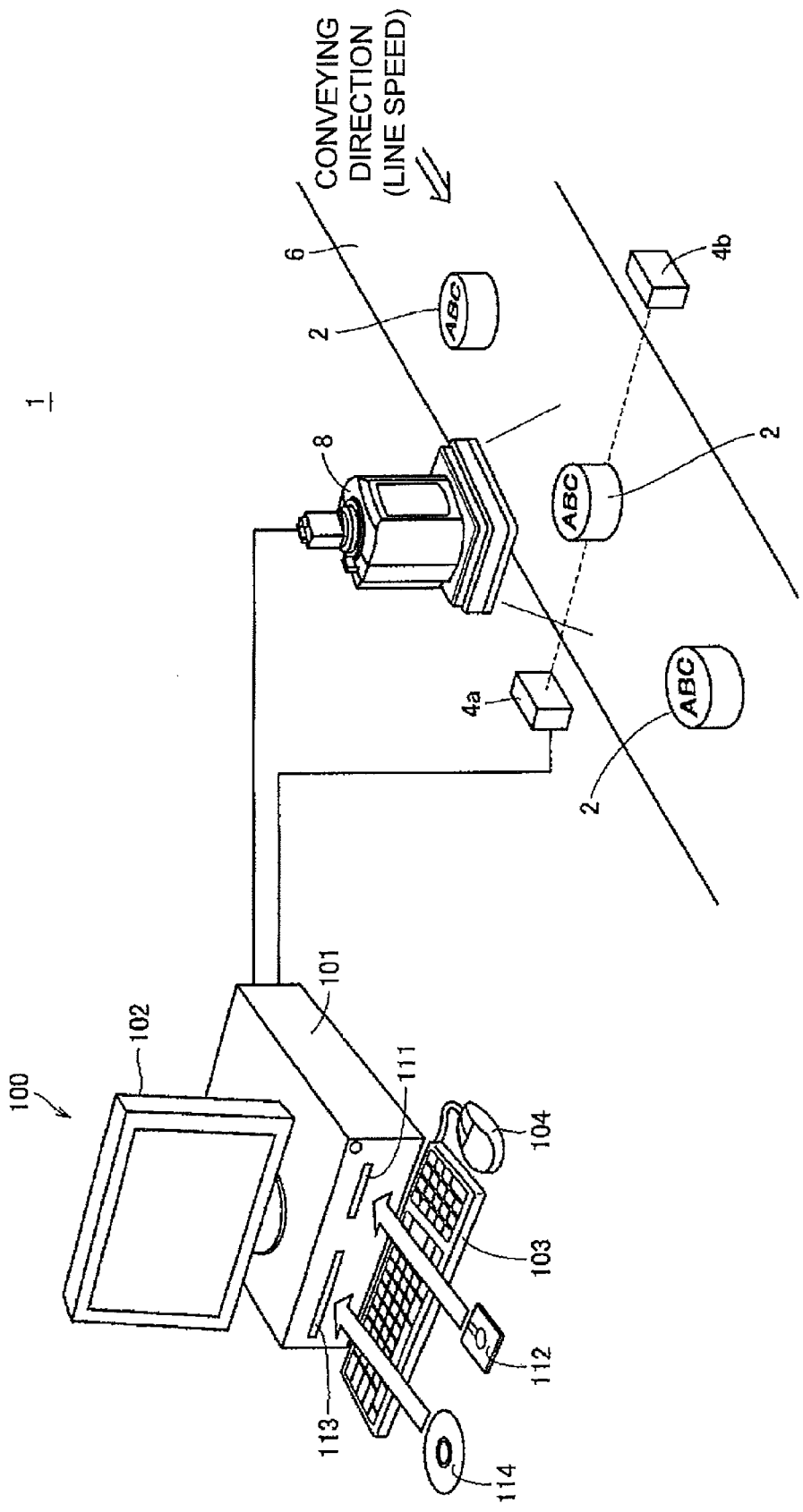
FIG. 1 is a schematic view showing one example of an overall configuration of a visual sensor system including an image processing device according to an embodiment of the present invention.

Hereinafter, preferred embodiments of the present invention will be described in detail with reference to the drawings. The same reference symbols will be given to the same or corresponding portions in the drawings, and the description thereof will not be repeated.

A. Outline

Figure 2:
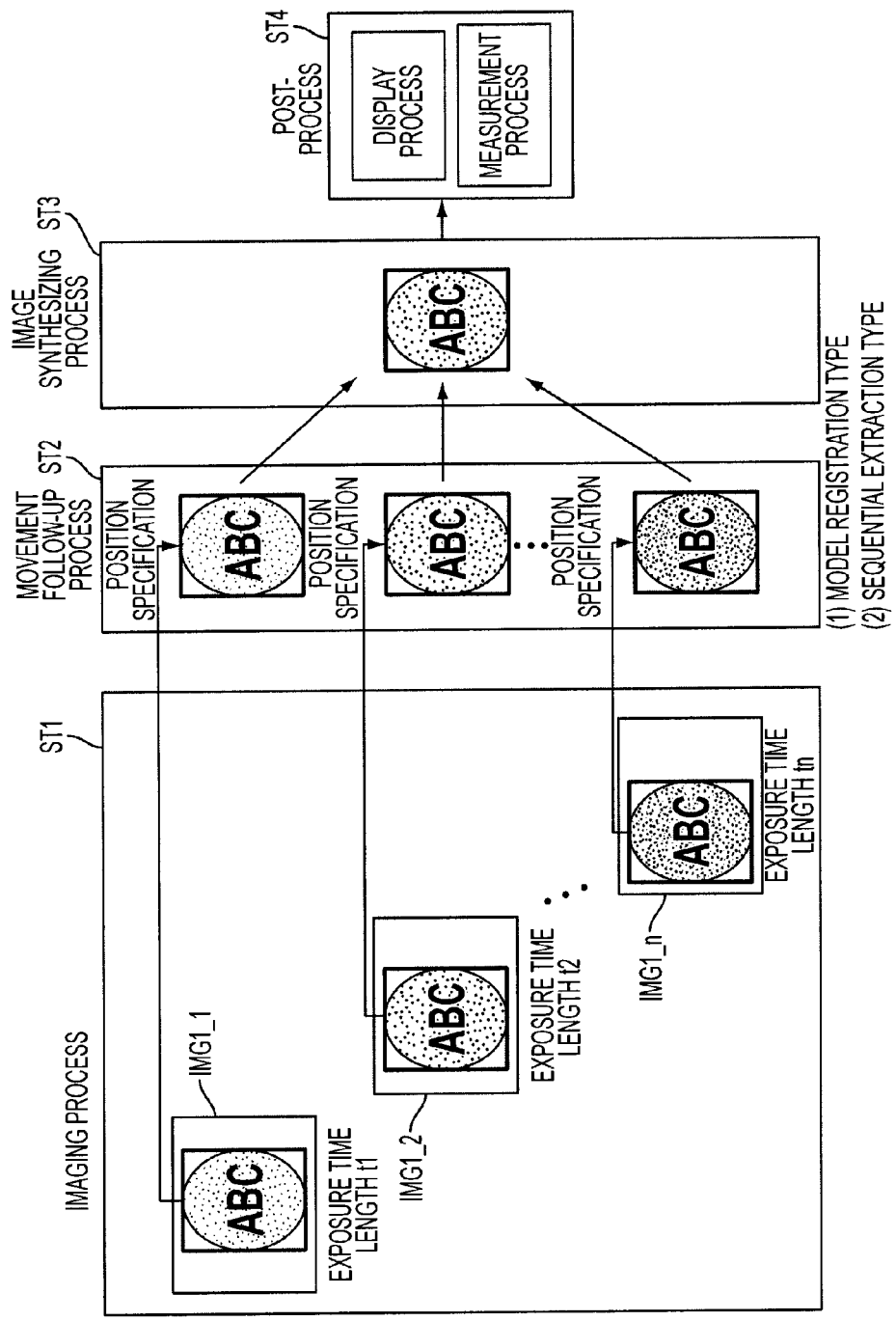
FIG. 2 is a schematic view showing overall processes in the image processing device according to the embodiment of the present invention.

FIG. 1 is a schematic view showing an overall configuration of a visual sensor system 1 including an image processing device according to an embodiment of the present invention. FIG. 2 is a schematic view showing overall processes in the image processing device according to the embodiment of the present invention.

With reference to FIG. 1, the visual sensor system 1 is representatively incorporated in a production line or the like to test defects and the like or to measure the size thereof by image processing image data acquired by imaging a measuring article (hereinafter also referred to as "work") 2 with use of an imaging unit 8. By way of example, in the present embodiment, the work 2 is conveyed by a conveyance line 6 such as a belt conveyor. In other words, the work 2 moves on the conveyance line 6 in a predetermined conveying direction at a predetermined speed.

The image processing device according to the embodiment of the present invention acquires a plurality of images by imaging the work 2 a plurality of times under different exposure conditions, and generates a synthesized image reflecting the color information and the luminance of each acquired image. Through such an image synthesizing process, imaging at a dynamic range wider than the dynamic range the imaging unit originally has is realized.

In particular, according to the present embodiment, the image processing device suited for the image synthesizing process on the work 2 that moves on the conveyance line 6 is provided. Specifically, the image processing device according to the present embodiment specifies the position of the target work 2 (specific measuring article) contained in each acquired image following the movement of the work 2 in the process of acquiring a plurality of images necessary to generate one synthesized image. The image synthesizing process is executed after aligning the plurality of images using the specification result. The imaging in which the dynamic range is more appropriately enlarged thus can be performed even on the moving work 2.

With reference to FIG. 2, image process (step S1), movement follow-up process (step S2), image synthesizing process (step S3), and post-process (step S4) are executed in the image processing device according to the present embodiment.

In the imaging process of step S1, the imaging is performed a plurality of times under different exposure conditions using the imaging unit 8 to acquire a plurality of images (hereinafter also referred to as an "input image) indicating the content of the view of the imaging unit 8 at the respective imaging timing. More specifically, the position where the target work 2 appears differs among the n input images IMG1_1, IMG1_2, ..., IMG1_n acquired by a series of imaging under n types of exposure conditions (typically, exposure time lengths t1, t2, ..., tn) using the same imaging unit 8. This is because the work 2 moves throughout the series of imaging. Thus, even in a case where the input images IMG1_1, IMG1_2, ..., IMG1_n are image synthesizing processed as is, the target synthesized image with enlarged dynamic ranges cannot be generated.

In the movement follow-up process of step S2, the position of a specific work 2 contained in the plurality of input images, which are a set of a plurality of images acquired by carrying out a series of imaging a plurality of times, is specified.

Subsequently, in the image synthesizing process of step S3, the synthesized image with enlarged dynamic ranges is generated by synthesizing a plurality of partial images for an image (hereinafter also referred to as "partial image") of a range having the position of the specific work 2 corresponding to the plurality of input images as a reference. As hereinafter described, the image synthesizing process includes a luminance synthesizing process, a tone value conversion process, a color synthesizing process, a final generation process, and the like.

Subsequently, in the post-process of step S4, a display process and a measurement process on the synthesized image are executed.

In the following description, the configuration of the image processing device according to the present embodiment and the image synthesizing process will be described, and thereafter, the "movement follow-up process", which is one feature of the image processing device according to the present embodiment will be described. In the present embodiment, "model registration type" and "sequential extraction type" will be described as examples of the "movement follow-up process". Detailed content will be described afterwards, but in the "model registration type", the reference image (pattern) showing the target work 2 or the characteristic information of the target work 2, which are pre-registered, are searched in each acquired image, to specify the position of the target work. In the "sequential extraction type", alignment is performed on the subsequent input images with the position of the target work 2 in the input image acquired first as a reference for a set of images sequentially acquired in a series of imaging of a plurality of times performed under different exposure conditions.

B1. Overall Device Configuration

With reference again to FIG. 1, the imaging unit 8 arranged fixed to the conveying line 6 starts to image over a plurality of times to enlarge the dynamic range, as hereinafter described, when the work 2 arrives in the view of the imaging unit 8. The arrival of the work 2 is detected by a sensor arranged on the conveying line 6. As shown in FIG. 1, a photoelectric sensor is typically arranged on both sides of the conveying line 6, and the imaging unit 8 starts imaging in response to the detection signal (hereinafter also referred to as "trigger signal") from the photoelectric sensor. More specifically, the photoelectric sensor includes a light receiving portion 4a and a light projecting portion arranged on the same optical axis, and outputs the trigger signal when the light receiving portion 4a detects that the light radiated by the light projecting portion 4b is shielded by the work 2. During the period the image synthesizing process is stopped, the imaging unit 8 may repeatedly perform imaging at a predetermined cycle.

Such a photoelectric sensor is ideally arranged so as to detect a state in which the work 2 is positioned at the center of view of the imaging unit 8, but is often arranged on the upstream of the conveying line 6 than the center of view of the imaging unit 8 in view of detection delay and the like in the photoelectric sensor. The position (hereinafter also referred to as "trigger position") of arranging the photoelectric sensor is thus an important adjustment item as it influences the imaging start timing by the imaging unit 8. Therefore, the image processing device according to the present embodiment also provides a function enabling even the user with little knowledge to easily adjust the trigger position. The details of such a function will be hereinafter described.

The movement velocity of the work 2, that is, the conveying speed of the conveying line 6 is also referred to as "line speed". Various controls including changing the line speed of the conveying line 6 may be controlled by a PLC (Programmable Logic Controller) (not shown) and the like.

The plurality of input images acquired by having the imaging unit 8 perform imaging a plurality of times are transmitted to the computer 100 typically embodying the image processing device according to the present embodiment. In the present embodiment, the process of handling a color input image will be mainly described.

By way of example, the imaging unit 8 is configured to include an imaging element partitioned into a plurality of pixels such as a CCD (Coupled Charged Device) and a CIS sensor (Complementary Metal Oxide Semiconductor Image Sensor), in addition to an optical system such as a lens. The imaging element corresponding to each pixel has one or a plurality of spectral sensitivities with respect to the incident light.

More specifically, the imaging element of the imaging unit 8 typically has a spectral sensitivity for each of "red", "green", and "blue" based on three primary colors of light with respect to each pixel. The imaging element of the imaging unit 8 outputs detection values (R luminance, G luminance, B luminance) of three colors of "red", "green", and "blue" for the incident light. The R luminance indicates the magnitude of the light intensity (light energy entered within a certain exposure time length) corresponding to the wavelength component contained in the red spectral sensitivity of the light entering the imaging element. The G luminance and the B luminance each indicate the magnitude of the light intensity corresponding to the wavelength component contained in the corresponding spectral sensitivity. In the present embodiment, the R luminance, the G luminance, and the B luminance are all assumed to be defined in the range of eight bits (0 to 255 tones).

The spectral sensitivity of the imaging unit is not limited to three (three bands) and may have spectral sensitivity to more colors. An imageable color gamut can be further expanded by using the multiband imaging element. Alternatively, the detection values (C luminance, M luminance, Y luminance) of three colors of "cyan", "magenta", and "yellow", which are complementary colors of the three primary colors of light, may be provided as spectral sensitivities. When using a single plate CCD and the like, each pixel sometimes has light reception sensitivity with respect to only one color of "red", "green", and "blue". In such a case, the input image having luminance for each of "red", "green", and "blue" may be generated by an interpolation unit (not shown).

The imaging unit 8 can change the exposure condition (typically, the exposure time length) upon imaging. The exposure condition is a value for adjusting the light energy that enters the imaging element in one imaging, and is representatively adjusted by the mechanical or electronic shutter speed, the aperture amount of the optical system, the illumination intensity irradiated on the measuring article, and the like. In the present embodiment, a configuration of adjusting the "exposure time length", assuming the illumination intensity on the measuring article is constant, is illustrated as a representative example of the exposure condition, but not limited to the exposure time length, the aperture amount, the illumination intensity and the like may be adjusted. Such different modes will be hereinafter described.

The computer 100 includes a computer body 101 mounting an FD (Flexible Disk) driving device 111 and a CD-ROM (Compact Disk-Read Only Memory) driving device 113, a monitor 102, a keyboard 103, and a mouse 104. The computer body 101 executes a program preliminarily stored to implement the image processing device according to the present embodiment.

B2. Hardware configuration

Figure 3:
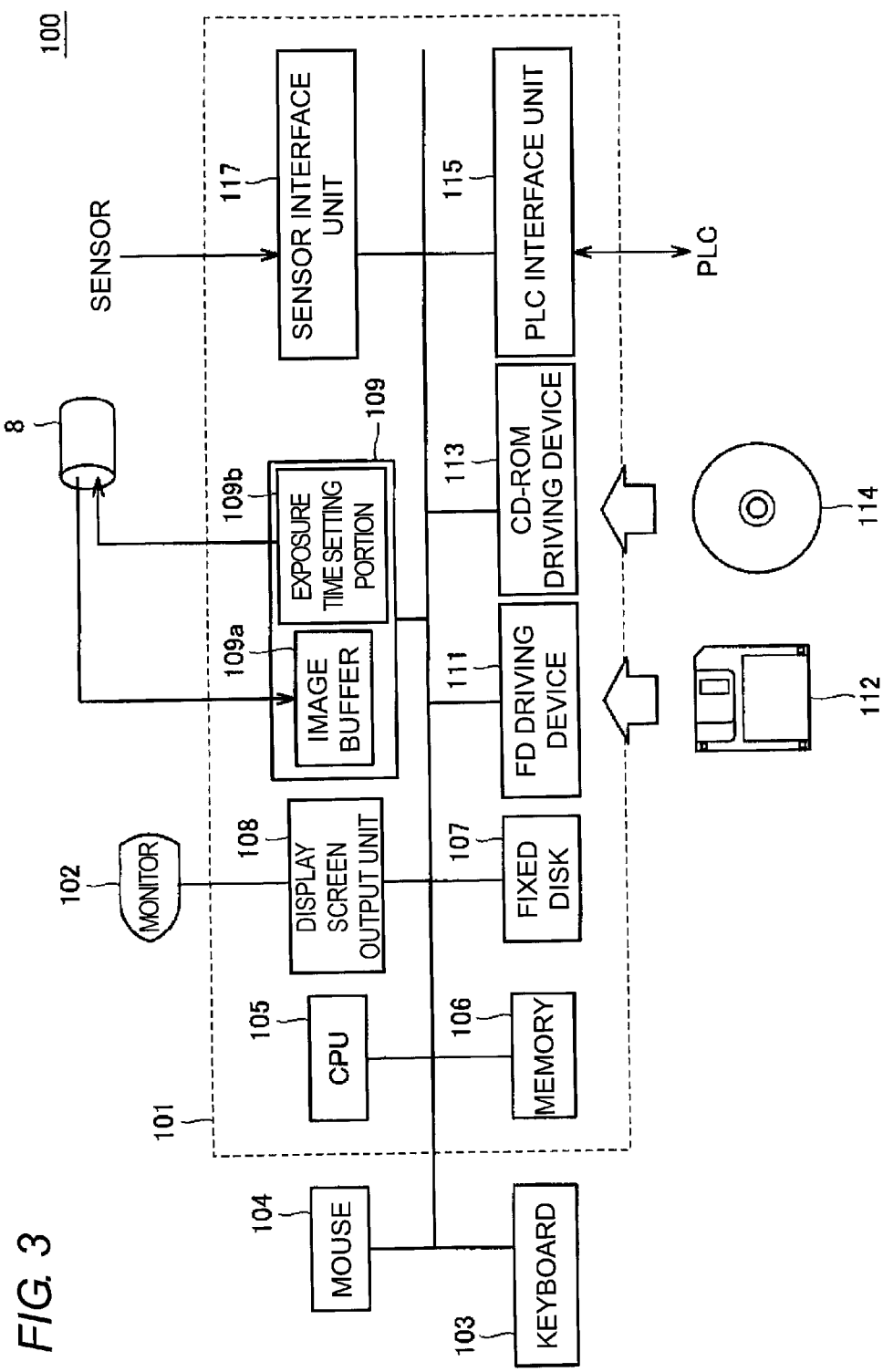
FIG. 3 is a schematic configuration diagram showing a hardware configuration of a computer according to the embodiment of the present invention.

FIG. 3 is a schematic configuration diagram showing a hardware configuration of the computer 100 according to the embodiment of the present invention.

With reference to FIG. 3, the computer body 101 includes, in addition to the FD driving device 111 and the CD-ROM driving device 113 shown in FIG. 1, a CPU (Central Processing Unit) 105, a memory 106, a fixed disk 107, a display screen output unit 108, a camera interface unit 109, a PLC interface unit 115, and a sensor interface unit 117, which are mutually connected with a bus.

An FD 112 is attachable to the FD driving device 111, and a CD-ROM 114 is attachable to the CD-ROM driving device 113. As described above, the image processing device according to the present embodiment is implemented when the CPU 105 executes a program using computer hardware such as the memory 106. Such a program is generally stored in a recording medium such as the FD 112 and the CD-ROM 114, or distributed through network and the like. Such a program is read from the recording medium by the FD driving device 111 or the CD-ROM driving device 113, and once stored in the fixed disk 107, which is a storage device. The program is then read from the fixed disk 107 to the memory 106 and executed by the CPU 105.

The CPU 105 is a calculation processing unit for performing various types of calculations by sequentially executing the programmed commands. The memory 106 temporarily stores various types of information according to the execution of the program in the CPU 105.

The display screen output unit 108 is connected to the monitor 102, which is a display unit for displaying the information output by the CPU 105, and outputs display image data to be displayed to the monitor 102. More specifically, the display screen output unit 108 sequentially generates image data for display on the image memory by performing a drawing process according to an internal command from the CPU 105. The monitor 102 is configured by an LCD (Liquid Crystal Display), a CRT (Cathode Ray Tube), and the like, by way of example. As hereinafter described, the monitor 102 according to the present embodiment displays the synthesized image generated by imaging the work 2 a plurality of times, the prospective processing time length required for one image synthesizing process, the histogram for "brightness" of the synthesized image, and the like.

The camera interface unit 109 is connected to the imaging unit 8 for imaging the measuring article and generating image data, and is input with the image data imaged by the imaging unit 8. In other words, the camera interface unit 109 intermediates data communication between the computer body 101 and the imaging unit 8. More specifically, the camera interface unit 109 includes an image buffer 109a and an exposure time setting portion 109b. The image buffer 109a once accumulates the input images imaged and sequentially transmitted by the imaging unit 8, and transfers the accumulated data to the memory 106 or the fixed disk 107 when the input image for one imaging is accumulated. The exposure time setting portion 109b transmits a command to the imaging unit 8 before the start of respective imaging according to the internal command from the CPU 105, and sets the exposure time length in the imaging unit 8.

The PLC interface unit 115 is a device for intermediating data communication between the computer body 101 and the PLC (not shown). The sensor interface unit 117 receives a trigger signal from the photoelectric sensors and the like, and transmits the signal to the CPU 105.

The fixed disk 107 is a non-volatile recording device for storing programs to be executed by the CPU 105, input images, and the like.

The keyboard 103 and the mouse 104 are input units for externally accepting an input. More specifically, the keyboard 103 accepts a command from the user corresponding to the input key. The mouse 104 accepts a command from the user corresponding to the operation of clicking, sliding, and the like.

The computer 100 may also be connected with other output devices such as a printer, as necessary.

B3. Operation Mode

The visual sensor system 1 according to the present embodiment can generate a synthesized image by imaging the work 2 a plurality of times, and select an "operation mode" in which tests and measurements are executed on the synthesized image as necessary, and a "setting mode" in which the setting related to the image synthesizing process for the work 2 is performed. In the "setting mode", the user inputs the setting related to the image synthesizing process while referencing the synthesized image generated by the image synthesizing process to be displayed on the monitor 102.

C. Image Synthesizing Process

The image synthesizing process for generating the synthesized image is described next. The image synthesizing process according to the present embodiment mainly aims to enlarge the dynamic range of the imaging unit 8.

Figure 4A:
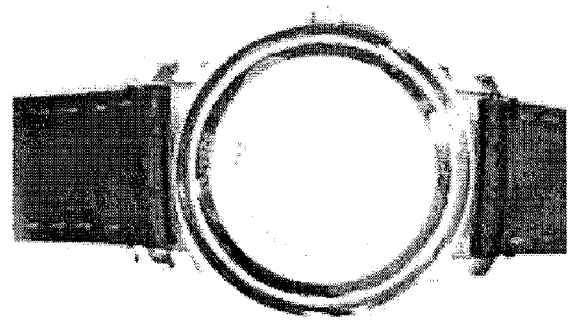
FIGS. 4A to 4C are diagrams showing an example of input images when a back surface of a watch is imaged as a work.
Figure 4B:
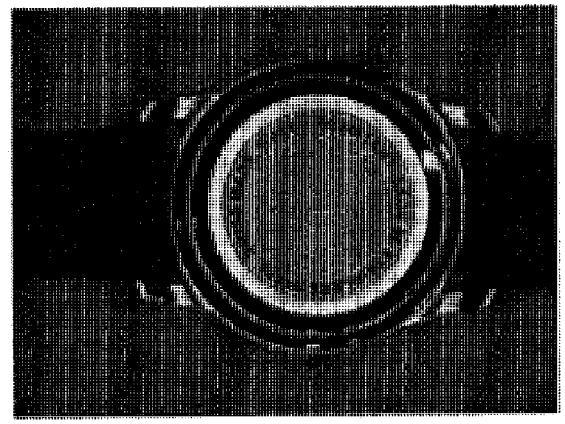
Figure 4C:
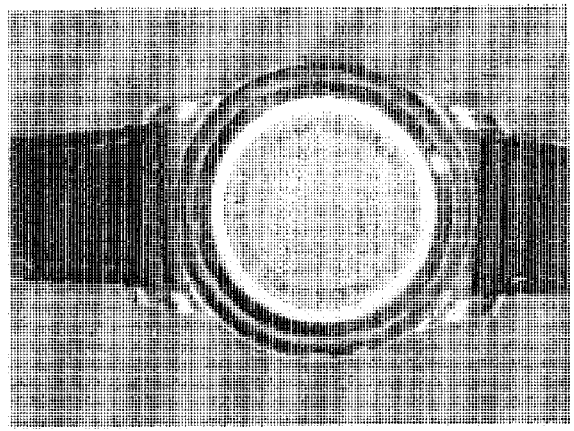

FIGS. 4A to 4C are diagrams showing an example of the input image when a back surface of a watch is imaged as a work. FIG. 4A shows the input image acquired by one imaging under a condition of relatively a long exposure time length, and FIG. 4B shows the input image acquired by one imaging under a condition of relatively short exposure time length. In FIGS. 4A and 4B, the light intensity of the incident light is assumed to be under the same condition. The work shown in FIGS. 4A to 4C includes a clock main body made of metal and a band made of leather. As the reflectivity of the clock main body and the band greatly differs, a large difference is also created in the light intensity (light energy radiated per unit time) radiated from each part.

Thus, when the exposure time length is long, the clock main body having a relatively high reflectivity produces whiteout, and an effective luminance cannot be acquired. In other words, the characters marked on the clock main body cannot be identified, as shown in FIG. 4A. When the exposure time length is short, the light energy cannot be sufficiently received from the band having a relatively low reflectivity, and an effective luminance cannot be acquired. In other words, the band produces total underexposure, and defects such as stitches cannot be identified, as shown in FIG. 4B.

The image processing device according to the present embodiment thus images the same work 2 a plurality of times under different exposure conditions (exposure time length), and generates the synthesized image from a plurality of acquired input images. The input image includes a value (luminance distribution of each color) indicating the distribution of the light intensity that enters the imaging unit 8, and the image processing device according to the present embodiment calculates the color information (hereinafter also referred to as "synthetic color information") and the luminance (hereinafter also referred to as "synthetic luminance") of each pixel of the synthesized image based on the value (luminance of each color) indicating the light intensity of the respective input image corresponding to each pixel and the exposure condition (exposure time length) upon imaging the corresponding input image. The synthesized image is then generated based on the synthetic color information and the synthetic luminance.

In other words, the synthetic luminance is equivalent to the luminance value corresponding to the light intensity that enters the imaging element of the imaging unit 8, and has a luminance resolution of greater than or equal to a predetermined value within the effective dynamic range. Furthermore, the luminance value distribution corresponding to the distribution of the light intensity that enters the imaging element of the imaging unit 8 is calculated from the synthetic luminance. The effective dynamic range means the difference between the minimum value and the maximum value of the synthetic luminance, or the range in between.

In summary, in the calculation process of the synthetic luminance, the value (luminance) indicating the light intensity in each of the input images is standardized with the exposure time length for each pixel. That having a magnitude of the standardized light intensity in an appropriate range is preferentially adopted. In other words, the synthetic luminance of each pixel in the synthesized image is calculated with the information of the pixel imaged at the exposure time length suited to the light intensity (light energy that enters per unit time) radiated from the work 2 of the information of the corresponding pixels of the plurality of input images as the main component. Through such a process, the synthesized image can be generated as a collection of pixels having the luminance imaged with an appropriate exposure time length. FIG. 4C is a diagram showing one example of the synthesized image generated by the image synthesizing process according to the present embodiment. As shown in FIG. 4C, the synthesized image that does not include whiteout as in FIG. 4A and total underexposure as in FIG. 4B can be generated by performing the above-described image synthesizing process.

A non-linear tone mapping is effectively carried out to represent a wide dynamic range with one image having finite tones. The tone mapping includes various methods, logarithmic conversion, gamma correction, and the like being representative examples of the non-linear tone mapping calculated using the function. Alternatively, the tone mapping of any shape can be performed by using a lookup table preliminarily defined instead of the function. The timing of applying tone mapping includes two methods of processing after performing the addition process and processing before the addition process. That is, the tone mapping has numerous variations, and the processing timing has two methods.

In the present embodiment, the configuration for a case of performing the addition process after performing the logarithmic conversion is shown as an example of such processes.

D1. Overall Control Structure

As described above, the image processing device according to the present embodiment mainly executes the following three processes.

(1) Process of imaging the work a plurality of times with different exposure time lengths (Imaging process)

(2) Specifying the position of a specific work 2 contained in a plurality of input images acquired by carrying out a series of imaging a plurality of times (Movement follow-up process)

(3) Generating the synthesized image with enlarged dynamic ranges by synthesizing partial images having the position of the specific work 2 in the plurality of input images as a reference (Image synthesizing process).

The image synthesizing process mainly includes the following four sub-processes.

(3-1) Process of calculating the synthetic luminance from the luminance of the imaged input image (Luminance synthesizing process)

(3-2) Process of calculating the tone value from the calculated synthetic luminance (Tone value converting process)

(3-3) Process of calculating the synthetic color information from the color information of the imaged input image (Color synthesizing process)

(3-4) Process of generating the synthesized image from the synthetic color information and the tone value (Final generation process).

First, the outline of the processes (1) to (3) will be described, and thereafter, the detailed content of "model registration type" and "sequential extraction type" will be described as an example of the (2) movement follow-up process.

Figure 5:
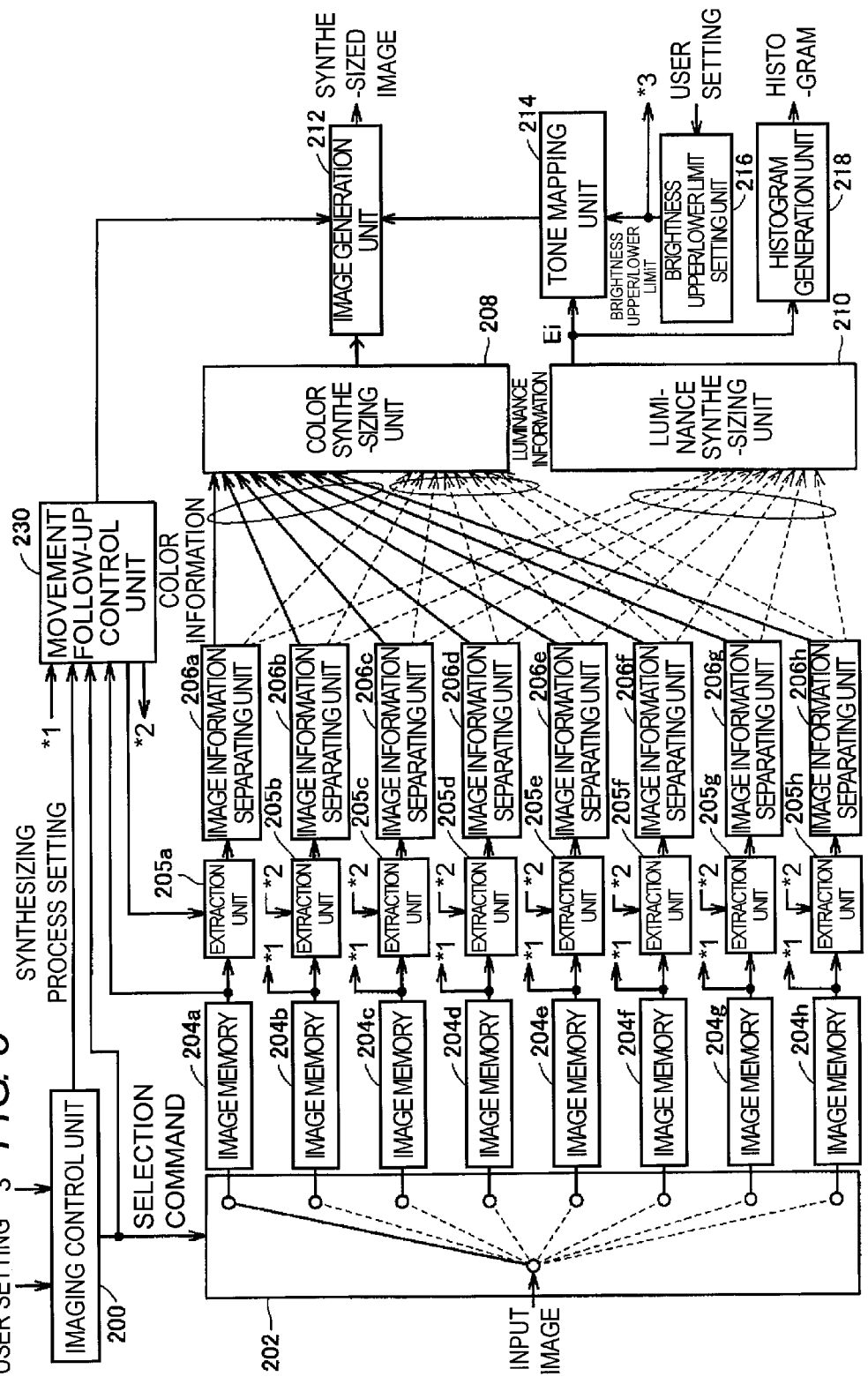
FIG. 5 is a functional block diagram showing an overall control structure of the image processing device according to the embodiment of the present invention.

FIG. 5 is a functional block diagram showing the overall control structure of the image processing device according to the embodiment of the present invention.

With reference to FIG. 5, the image processing device according to the present embodiment includes, an imaging control unit 200, a selecting unit 202, and image buffers 204a to 204h as a control structure for implementing the (1) imaging process; includes a movement follow-up control unit 230 and extraction units 205a to 205h as a control structure for implementing the (2) movement follow-up process; image information separating units 206a to 206h, a luminance synthesizing unit 210 and a histogram generation unit 218 as a control structure for implementing the (3-1) luminance synthesizing process; a tone mapping unit 214 and a brightness upper/lower limit setting unit 216 as a control structure for implementing the (3-2) tone value conversion process; the image information separating units 206a to 206h and a color synthesizing unit 208 as a control structure for implementing the (3-3) color synthesizing process; and an image generation unit 212 as a control structure for implementing the (3-4) final generation process.

The content of each process in the image processing device according to the present embodiment will be described below with the operation of each function block.

(1) Imaging Process

With reference to FIG. 5, the imaging control unit 200 acquires a plurality of input images by causing the imaging unit 8 to image the same work 2 a plurality of times under different exposure conditions (exposure time lengths). The input images indicate the content of the view of the imaging unit 8 at the respective imaging timing. The imaging control unit 200 determines how to sequentially switch the exposure time length according to the user setting. More specifically, the imaging unit 8 according to the present embodiment includes an electronic shutter, of which the shutter speed can be set to any speed, by way of example, so that the exposure time length can be arbitrarily changed. The exposure time lengths that can be changed includes eight patterns as a standard, by way of example, of "$1/125$ seconds", "$1/250$ seconds", "$1/500$ seconds", "$1/1000$ seconds", "$1/2000$ seconds", "$1/4000$ seconds", "$1/8000$ seconds", and "$1/16000$ seconds". The exposure time group that can be changed is set so as to become sequentially faster at the power of two with "$1/125$ seconds" as a reference (slowest value).

The imaging control unit 200 repeats the sequential setting of the exposure time length of the imaging unit 8 before each imaging according to the setting preliminarily made (the number of imaging processes, exposure time length upon each imaging, etc.), and the imaging of the work 2 using the imaging unit 8 with each set exposure time length. Furthermore, the imaging control unit 200 provides a selection command to the selecting unit 202 in synchronization with each imaging, and sequentially stores the input image generated when the imaging unit 8 sequentially images the work 2 in the image buffers 204a to 204h.

The selecting unit 202 is disposed between the imaging unit 8 and the image buffers 204a to 204h, and electrically connects one of the image buffers 204a to 204h with the imaging unit 8 in response to the selection command from the imaging control unit 200. According to such an operation, the input image generated when the imaging unit 8 images the work 2 is sequentially stored in the image buffers 204a to 204h. In the following, the image buffers 204a to 204h are also collectively referred to as "image buffer 204".

The image buffer 204 is configured in correspondence with the exposure time length of the imaging unit 8, and stores the input image imaged at a corresponding specific exposure time length. For instance, the image buffer 204a mainly stores the input image imaged under a condition where the exposure time length is "$1/125$ seconds", and the image buffer 204b mainly stores the input image imaged under a condition where the exposure time length is "$1/250$ seconds".

As hereinafter described, the work 2 does not need to be imaged with all the exposure time lengths that can be set to the imaging unit 8 when generating the synthesized image. In other words, a plurality of exposure time lengths can be set so as to include an appropriate "brightness" range according to the light intensity radiated by the work 2.

(2) Movement Follow-Up Process

The movement follow-up control unit 230 specifies the positions of the target work 2 for the input images imaged with the respective exposure time lengths. The movement follow-up control unit 230 gives, to the extraction units 205a to 205h, an instruction to perform alignment with the target work 2 that appeared in each image as a reference with respect to set of input images acquired by carrying out a series of imaging a plurality of times based on the specified positions. In the following, the extraction units 205a to 205h are also collectively referred to as "extraction unit 205".

The extraction units 205a to 205h respectively extracts a region (partial image), where the target work 2 appeared, of the input images stored in the corresponding image memories 204a to 204h according to the instruction from the movement follow-up control unit 230, and outputs the same to the corresponding image formation separating units 206a to 206. The size of the partial image extracted by each extraction unit 205a to 205h is the same.

Alternatively, the extraction units 205a to 205h output the input image stored in the corresponding image memories 204a to 204h to the corresponding image information separating unit 206a to 206h with a relative position shift amount that complies with the instruction from the movement follow-up control unit 230.

(3-1) Luminance Synthesizing Process

The image information separating units 206a to 206h are each corresponding to the extraction units 205a to 205h, and extracts the color information and the luminance from the partial image extracted by the corresponding extraction unit 205. Representatively, assume that the input image (i.e., partial image) is configured by luminance (R luminance, G luminance, B luminance) of three colors, which values correspond to the light energy that enters each pixel. The color information of the input image standardizes such luminance of three colors, and represents the relative relationship (relative ratio) of each luminance. The luminance of the input image comprehensively represents the light energy that enters each pixel, and is equivalent to the average value (or sum) of the luminance of three colors.

The image information separating units 206a to 206h then output the extracted color information to the color synthesizing unit 208, and outputs the extracted luminance to the color synthesizing unit 208 and the luminance synthesizing unit 210.

After a series of imaging (all imaging necessary to generate one synthesized image) carried out a plurality of times by the imaging unit 8 is completed, the luminance synthesizing unit 210 calculates the synthetic luminance of each pixel after standardizing the luminance of each partial image with the corresponding exposure time length. As described above, the range of the light intensity suited for imaging fluctuates by changing the exposure time length in the imaging unit 8. In other words, relatively a short exposure time length is suited for imaging of the range of greater light intensity and relatively a long exposure time length is suited for imaging of the range of smaller light intensity.

In the present specification, an index "brightness" corresponding to the magnitude of the light intensity radiated from the work is used. The "brightness" is a relative value that depends on the performance of the imaging unit 8, where the actual light intensity (or light energy) differs even when the "brightness" is the same if the sensitivity of the imaging element, the open value of the optical system, and the like are different.

Generally, the magnitude of the light energy that enters the imaging unit 8 (imaging element) is assumed to be proportional to the exposure time length. Thus, the "brightness" in the present specification acquired by dividing the luminance detected by the imaging unit 8 with the exposure time length and taking the logarithm of the value is representatively used. Therefore, the "brightness" in the present specification is an index indicating the magnitude of the light energy (light intensity) per unit exposure time. Through the use of such "brightness", the "brightness" range suited for imaging by the imaging unit 8 can be preliminarily defined in correspondence with each exposure time length that can be set to the imaging unit 8.

More specifically, as the eight exposure time lengths that can be set to the imaging unit 8 according to the present embodiment become sequentially shorter at the power of two, the correspondence relationship between each exposure time length and the "brightness" can be defined as in FIG. 6.

FIG. 6 is a diagram showing one example of a relationship between the exposure time length set in the imaging unit 8 and the "brightness" range suited for imaging. With reference to FIG. 6, if the "brightness" range suited for imaging is set as "10 to 30" when the exposure time length is "1/125 seconds", the "brightness" range suited for imaging can be set to "20 to 40", added by "10" when the exposure time length is "1/250 seconds", which is ½ times thereof. The exposure time length can be set to cover the "brightness" range of "10 to 100" in correspondence with the range of "1/125 seconds" to "1/16000 seconds" by sequentially setting in such a manner.

Furthermore, a plurality of exposure time lengths preferably covers each "brightness" range. In the example shown in FIG. 6, at least two exposure time lengths cover the "brightness" range from 10 to 90. In other words, the exposure time lengths for cover the "brightness" range including "60" are "1/1000 seconds", "1/2000 seconds", and "1/4000 seconds". According to such setting, the imaging can be carried out a plurality of times with different exposure time lengths even in a case where the "brightness" upper/lower limit range (to be described later) input by the user is narrow.

The relationship between the exposure time length and the "brightness" range shown in FIG. 6 is such that the imaging with each of the plurality of exposure time lengths corresponding to the setting is performed when the necessary "brightness" range is set by the user of the "brightness" range in which the imaging can be performed with the imaging unit 8. In other words, the processing time length required to generate one synthesized image can be reduced by performing only imaging with a specific exposure time length instead of carrying out imaging with all exposure time lengths that can be set to the imaging unit 8.

More specifically, when the "brightness" range is set to "30 to 50" by the user, three imaging per one process are performed with the exposure time length of "1/250 seconds", "1/500 seconds", and "1/1000 seconds" included in such a range.

Again referring to FIG. 5, the luminance synthesizing unit 210 calculates the synthetic luminance or the luminance of each pixel of the synthetic image using a plurality of partial images acquired by a series of imaging carried out on the work 2. More specifically, the luminance synthesizing unit 210 standardizes the luminance of each pixel in the P partial images corresponding to each pixel (coordinate position i) of the synthesized image with the exposure time length to calculate the synthetic luminance $E_i$ of each pixel. The calcula tion formula of the synthetic luminance Ei by the luminance synthesizing unit 210 is as expressed in Equation (1).

Equation 1

$$\ln E_j = \frac{\sum_{j=1}^{P} w(Z_{i,j})(\ln g(Z_{i,j}) - \ln \Delta t_j + C)}{\sum_{j=1}^{P} w(Z_{i,j})} \quad (1)$$

where, w(Z): weighting function, g(Z): response function of imaging element $Z_{i,j}$: luminance information at coordinate position i of $j^{th}$ input image datum $\Delta t_j$: exposure time length of $j^{th}$ input image datum In Equation (1), the term "ln(g($Z_{i,j}$)–ln$\Delta t_j$)" is equivalent to the value obtained by standardizing the luminance in each input image with the exposure time length and evaluating the same as the "brightness". This is based on the technical idea that even in a case where the luminance is the same "128", the actual "brightness" is to be evaluated as a greater value if the exposure time length is relatively short, and the actual "brightness" is to be evaluated as a smaller value if the exposure time length is relatively long. In other words, the standardization (=g($Z_{i,j}$)/$\Delta t_j$) by the exposure time length is performed by multiplying the coefficient 1/$\Delta t_j$ corresponding to the exposure time length upon imaging the corresponding partial image so that the term can be transformed as ln{g($Z_{i,j}$)/$\Delta t_j$}, and then the synthetic luminance Ei is calculated using the standardized value.

Representatively, the synthetic luminance Ei is calculated as a value in the range of 0 to 100 according to the relationship between each exposure time length and the "brightness" range shown in FIG. 6. For the sake of facilitating the understanding, the synthetic luminance is expressed in the range of from 0 to 100, but the tone of "brightness" of the image acquired by synthesizing becomes greater than the tone (e.g., 8 bits) of the image acquired in one imaging, and thus is a value having digits after the decimal point as the data (e.g., handled as a value up to four digits after the decimal point using data of 16 bits).

In the above equation, the weighting function w(Z) and the response function g(Z) of the imaging element of the imaging unit 8 are introduced. Such functions will be described with reference to FIGS. 7A and 7B.

FIGS. 7A and 7B are diagrams showing one example of characteristics of the weighting function and the response function. FIG. 7A shows the characteristic of the weighting function w(Z), and FIG. 7B shows the characteristic of the response function g(Z).

With reference to FIG. 7A, the weighting function w(Z) is the function reflecting the reliability in accordance with the value of the luminance output from the imaging unit 8. In other words, the value close to the lower limit (0) or the upper limit (255) of the luminance output from the imaging unit 8 with a certain exposure time length is assumed to have low reliability compared to the value close to an intermediate value (128). In other words, if the imaging unit 8 images the measuring article having the most suitable "brightness" with a certain exposure time length, the luminance is assumed to be at substantially the intermediate value.

In view of such characteristics, the function in which the value in the vicinity of the lower limit or the upper limit becomes smaller compared to the vicinity of the intermediate value of luminance tone value is preferably used for the weighting function w(Z). By way of example, in the present embodiment, a weighting function in a triangular shape in which the intermediate value of the luminance tone value becomes a maximum value (128) and becomes zero at the lower limit and the upper limit is adopted. Of the input image for every exposure time length, that having a luminance within a predetermined range is preferentially adopted to calculate the synthetic luminance by adopting the above weighting function.

Using FIG. 7B, the response function g(Z) is the function for compensating for the nonlinearity between the luminance distribution output from the imaging unit 8 and the light energy distribution actually input to the imaging unit 8. For instance, in the imaging element such as the CCD, the relationship between the input light energy or the light intensity and the output voltage signal is nonlinear. Such a nonlinear characteristic is also referred to as, e.g., a gamma characteristic. The response function g(Z) compensates for such a gamma characteristic, and corrects the luminance output from the imaging unit 8 so as to be proportional to the light energy actually input to the imaging unit 8. In FIG. 7B, the response function g(Z) for a case where the luminance output from the imaging unit 8 is in proportional relationship with the input light energy is shown for simplification.

The "C" of the constant term in the equation is a term for compensating the offset that occurs when the relationship between each exposure time length and the "brightness" range is defined as in FIG. 6, and is appropriately set according to the relationship between each exposure time length and the "brightness" range.

In the equation, a natural logarithm having the Napier number "e" as the base is used, but is not necessarily limited to "e", and the logarithm having "2" as the base or the common logarithm having "10" as the base may be used.

Again referring to FIG. 5, the luminance synthesizing unit 210 outputs the calculated synthetic luminance Ei to the histogram generation unit 218. The histogram generation unit 218 generates the histogram for the synthetic luminance Ei. In other words, the histogram generation unit 218 generates distribution data for displaying the distribution of the synthetic luminance Ei on the monitor 102. More specifically, the luminance synthesizing unit 210 sectionalizes the synthetic luminance Ei of each pixel into classes of a predetermined width, and then calculates the frequency of each class. This helps the user to initially set the "brightness" upper limit and the "brightness" lower limit while referencing the range of relatively high ratio of the synthetic luminance Ei calculated by the luminance synthesizing unit 210.

The histogram generation unit 218 is configured to be able to interrupt or resume the histogram generation process according to the user setting.

(3-2) Tone Value Conversion Process

The tone mapping unit 214 converts the synthetic luminance Ei calculated in the luminance synthesizing unit 210 to the tone value to be displayed on the monitor 102. Specifically, the tone mapping unit 214 determines the concentration of the synthesized image by assigning the synthetic luminance Ei of each pixel (luminance range: 0 to 100; having tone greater than 256 tones) to the tone value Yi (e.g., 0 to 255 tone values) of the corresponding pixel of the synthesized image. The resolution (dynamic range) of the synthetic luminance Ei of each pixel becomes higher than the input image, and thus the synthesized image of higher accuracy can be generated and displayed by segmenting the tone value of the synthesized image more finely than the tone value of the input image.

The tone mapping unit 214 executes the conversion from the synthetic luminance Ei to the tone value Yi according to the correspondence relationship set by the brightness upper/lower limit setting unit 216. Specifically, the tone mapping unit 214 receives the set values of the "brightness" upper and lower limits to be performed with the assignment to the tone value from the brightness upper/lower limit setting unit 216, and converts the synthetic luminance Ei in the relevant range to the corresponding tone value Yi. The distribution of the tone value Yi is equivalent to the distribution of the defined range tone value indicated by the tone values within the defined numerical range.

Figure 8:
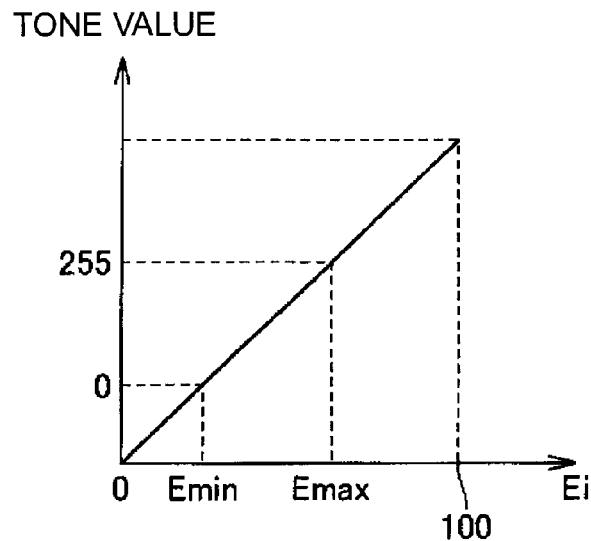
FIG. 8 is a diagram for describing an assignment process by a tone mapping unit.

FIG. 8 is a diagram for describing an assignment process by the tone mapping unit 214. With reference to FIG. 8, a case where the tone mapping unit 214 performs a linear assignment process will be illustrated to simplify the description. The simplest example includes assigning to the tone value within the range of 0 to 255 while maintaining the proportional relationship of the synthetic luminance Ei of which the luminance range is from 0 to 100. The data having a greater tone than the display ability of the monitor thus can be displayed with the tone (e.g., eight bit display) complying with the display ability of the monitor.

As described above, when the "brightness" upper limit Emax and the "brightness" lower limit Emin are set, the tone mapping unit 214 performs assignment to the tone value Yi according to the following equation.

$Yi=255 \times (Ei-Emin)/(Emax-Emin)$

In other words, the correspondence relationship used in the conversion from the synthetic luminance Ei to the tone value Yi in the tone mapping unit 214 is appropriately updated by changing the "brightness" upper limit Emax and the "brightness" lower limit Emin.

The pixels having a synthetic luminance Ei greater than the "brightness" upper limit Emax are all converted to a maximum tone value (e.g., 255), and thus the information on such brightness is lost. Similarly, the pixels having a synthetic luminance Ei smaller than the "brightness" lower limit Emin are all converted to a minimum tone value (e.g., 0), and thus the information on such brightness is lost. Therefore, only the pixel of which the value of the synthetic luminance Ei is in the range from the "brightness" lower limit Emin to the "brightness" upper limit Emax becomes a pixel having an effective tone value on the synthesized image.

In the following description, the range from the "brightness" lower limit Emin to the "brightness" upper limit Emax is also referred to as a "brightness" upper/lower limit range.

Figure 9:
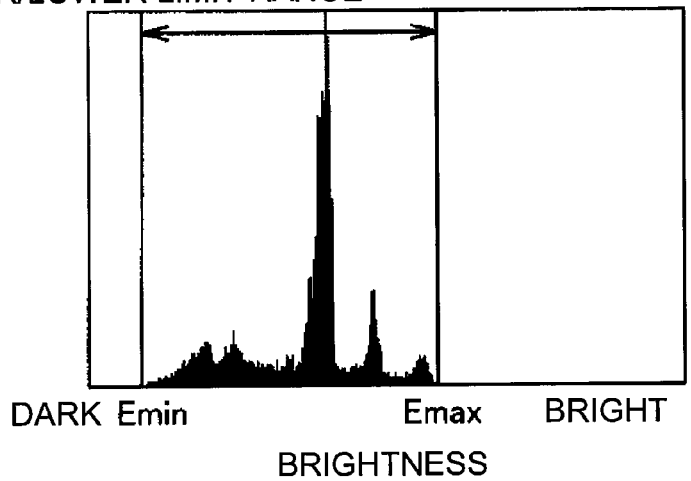
FIG. 9 is a diagram for describing a process related to setting of a "brightness" upper/lower limit range.

FIG. 9 is a diagram for describing a process related to the setting of the "brightness" upper/lower limit range. With reference to FIG. 9, the histogram on the "brightness" of the synthesized image generated in the histogram generation unit 218 (FIG. 5) is displayed on the monitor 102. The user sets the "brightness" lower limit Emin and the "brightness" upper limit Emax while referencing the histogram displayed on the monitor 102. In other words, the user sets the range of the dynamic range to be displayed on the monitor 102 as the synthesized image on the histogram indicating the entire range of the enlarged dynamic ranges of the imaging unit 8. Typically, the pixel in the range of an appropriate "brightness" is displayed as having the effective tone value on the monitor 102 according to the light intensity radiated from the work 2 to be imaged.

Therefore, the "brightness" upper/lower limit range is included in the effective dynamic range of the synthetic luminance and is set to a range narrower than the effective dynamic range of the synthetic luminance Ei in general use. The synthetic luminance Ei in the "brightness" upper/lower limit range is converted in correspondence with the tone value Y, i.e., the default range tone value represented with the tone value in the default numerical range, and the distribution of the synthetic luminance Ei is converted to the distribution of the tone value Yi equivalent to the default range tone value distribution.

<Calculation Example>

By way of example, in a case where the input image are acquired by performing imaging with three exposure time lengths of "1/250 seconds", "1/500 seconds", and "1/1000 seconds", the luminance at the coordinate position i of the three input images are "190", "100", and "50". In such a case, the synthetic luminance Ei of the pixel corresponding to the coordinate position i is calculated as below. Here, $W(190)=65$, $W(100)=100$, $W(50)=50$.

$Ei=10 \times \{65 \times (\log 190 + \log 250 - 1) + 100 \times (\log 100 + \log 500 - 1) + 50 \times (\log 50 + \log 1000 - 1)\}/(65+100+50)=37$ When the "brightness" upper limit Emax is set to "60" and the "brightness" lower limit Emin is set to "30" by the user, the tone values Yi at the coordinate position i of the synthesized image are calculated in the following manner.

$Yi=255 \times (37-30)/(60-30)=25$ (3-3) Color Synthesizing Process

Again referring to FIG. 5, the color synthesizing unit 208 calculates the synthetic color information from the color information of a plurality of partial images. As described later, the synthesized image is acquired by multiplying the corresponding tone value (concentration) calculated by the tone mapping unit 214 to the synthetic color information of each pixel calculated by the color synthesizing unit 208. Thus, the synthetic color information output from the color synthesizing unit 208 takes a value indicating a relative ratio of "red", "green", and "blue" without the information on the concentration of each pixel.

Similar to the above luminance synthesizing unit 210, the color synthesizing unit 208 calculates the synthetic color information of each pixel of the synthesized image based on the color information of each pixel in a plurality of input images corresponding to each coordinate position. More specifically, the color synthesizing unit 208 calculates the synthetic color information by cumulatively adding the value obtained by multiplying the color information of each partial image and the weight corresponding to the reliability thereof.

Assume the color information at the coordinate position i ($0 \leq i \leq$ the number of pixels n) of the $j^{th}$ partial image is ($r_{i,j}$, $g_{i,j}$, $b_{i,j}$). The color synthesizing unit 208 standardizes the color information output from the image information separating units 206a to 206h so that $r_{i,j}+g_{i,j}+b_{i,j}=1$ is satisfied. Assume the luminance at the coordinate position i of the $j^{th}$ partial image is $Z_{i,j}$. Using the standardized color information and the luminance, the calculation formula of the synthetic color information ($r_i$, $g_i$, $b_i$) is as expressed in Equations (2.1) to (2.3).

$$r_i = \frac{\sum_{j=1}^{P} w(Z_{i,j}) \cdot r_{i,j}}{\sum_{j=1}^{P} w(Z_{i,j})} \quad (2.1)$$

$$g_i = \frac{\sum_{j=1}^{P} w(Z_{i,j}) \cdot g_{i,j}}{\sum_{j=1}^{P} w(Z_{i,j})} \quad (2.2)$$

$$b_i = \frac{\sum_{j=1}^{P} w(Z_{i,j}) \cdot b_{i,j}}{\sum_{j=1}^{P} w(Z_{i,j})} \quad (2.3)$$

where, w(Z): weighting function
P: the number of input image data

The weighting function w(Z) has a characteristic similar to FIG. 7A. In other words, the weighting function w(Z) is the function for reflecting the reliability according to the value of the luminance output from the imaging unit 8. The technical meaning of the weighting function w(Z) is as described above, and thus detailed description will not be repeated.

The color synthesizing unit 208 outputs the calculated synthetic color information to the image generation unit 212.

(3-4) Final Generation Process

The image generation unit 212 sequentially calculates the image information of the pixel at the coordinate position i by sequentially multiplying the tone value Yi calculated by the luminance synthesizing unit 210 and the tone mapping unit 214 to the corresponding synthetic color information (ri, gi, bi), and generates the synthesized image.

In other words, the absolute color information (Ri, Gi, Bi) at the coordinate of the coordinate position i of the synthesized image can be expressed as below.

$(Ri,Gi,Bi)=Yi \times (ri,gi,bi)$

The synthesized image is finally generated according to the above procedure.

As described above, the size of the synthesized image becomes small compared to the size of the input image since the synthesized image is generated by extracting one part of the respective input images. Thus, if the display region of the size of the input image is ensured on the monitor 102, the synthesized image having a size same as the input image may be output by adding the color information (e.g., solid black, solid white, etc.) preliminarily defined to the periphery of the synthesized image.

(Others)

The imaging control unit 200 calculates the prospective processing time length required from the start of imaging until the generation of one synthesized image. More specifically, the imaging control unit 200 estimates the synthesizing time length in view of the number of imaging processes by the imaging unit 8, the exposure time length in each imaging, the processing amount of the image synthesizing process, and the like. The user determines whether the setting can be applied to the actual production line with reference to such a synthesizing time length.

D2. Outline of Movement Follow-Up Process

The outline of the movement follow-up process according to the present embodiment will be described below with reference to FIGS. 10A, 10B and FIGS. 11A, 11B.

Figure 10A:
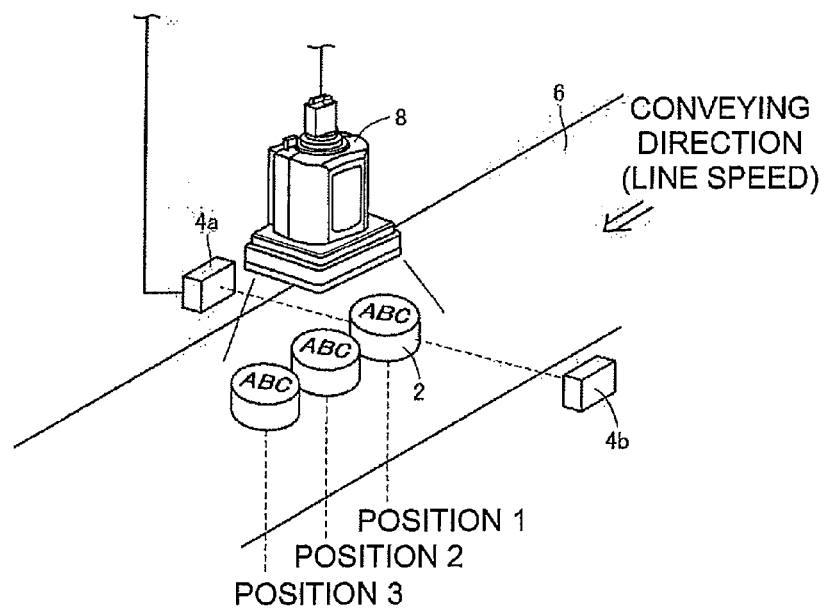
FIGS. 10A and 10B are diagrams for describing effects by a movement follow-up process according to the embodiment of the present invention.
Figure 10B:
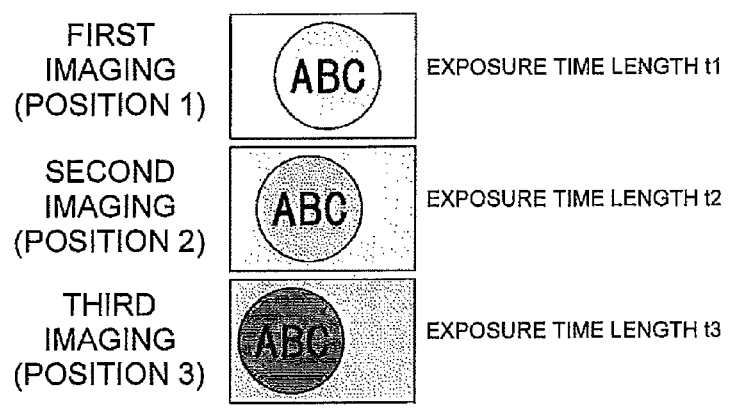
Figure 11A:
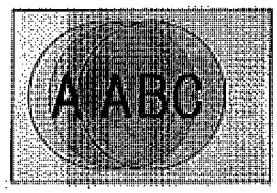
FIGS. 11A and 11B are diagrams for comparing a synthesized image generated according to the embodiment of the present invention with a synthesized image generated according to a related art.
Figure 11B:
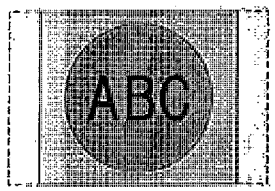

FIGS. 10A and 10B are diagrams for describing the effects by the movement follow-up process according to the embodiment of the present invention. FIGS. 11A and 11B are diagrams for comparing the synthesized image generated according to the embodiment of the present invention with the synthesized image generated by the related art.

With reference to FIG. 10A, the target work needs to be imaged a plurality of times under different exposure conditions to generate one synthesized image in the image synthesizing process according to the present embodiment, as described above. The relative positional relationship between the imaging unit 8 and the work thus changes while performing a series of imaging if the work moves on the conveying line 6.

By way of example, assume the first imaging starts at the timing the work 2 arrives at position 1 to generate one synthesized image. Thereafter, the work 2 moves to position 2 at the timing the subsequent second imaging is performed. Further, the work 2 moves to position 3 at the timing the third imaging is performed.

Thus, if the work 2 moves by a non-negligible extent within the view of the imaging unit 8 in a time length required to acquire a plurality of input images necessary for one synthesized image, the area where the work 2 appears in the respective input images differs from each other.

As a typical example, even in a case where the image of the work 2 is positioned at substantially the center in the input image acquired by the first imaging, the image of the work 2 is positioned on the downstream of the conveying line 6 in the input image acquired by the second imaging, and the image of the work 2 is positioned further on the downstream of the conveying line in the input image acquired by the third imaging, as shown in FIG. 10B.

Since a predetermined time length is required for image reading from the imaging element and various types of processes even in a case where the exposure time length is relatively short compared to the line speed, the time length required for the series of imaging becomes relatively long only when carrying out imaging a plurality of times with the common imaging element.

If the image synthesizing process according to the related art is performed on the input image shown in FIG. 10B, an image in a shifted state appears, as shown in FIG. 11A. The "shift of image" to be solved in the present embodiment mainly occurs from the movement of the subject during imaging upon imaging a plurality of times, and is different from a so-called "instability" that occurs when the position of the camera body changes in one imaging, that is, within a certain exposure time length with a normal digital camera etc.

According to the present embodiment, the position of the work 2 contained in each of the plurality of input images acquired by carrying out imaging a plurality of times is specified, and the respective input images are synthesized such that the work 2 is at substantially the same position. In other words, the image synthesizing process is executed after appropriately adjusting the relative positional relationship among the plurality of input images acquired by the series of imaging.

Since adjustment is made such that the position of the work 2 becomes substantially the same among the plurality of input images, the size of the generated synthesized image becomes small compared to the size of the input image.

E1. Outline of Movement Follow-Up Process
(Model Registration Type)

In the movement follow-up process (model registration type) according to the present embodiment, the position of the target work 2 is specified by performing a search process in each input image for the reference image (pattern) showing the target work 2 pre-registered with respect to a set of input images acquired by carrying out imaging a plurality of times under a plurality of exposure conditions. The position of the target work 2 may be specified by performing the search process in each input image for characteristic information (edge image, edge position) of the target work 2 in place of or in addition to the reference image (pattern) showing the target work 2.

Therefore, in the movement follow-up process (model registration type) according to the present embodiment, at least one of the reference image (pattern) showing the target work 2 or the characteristic information of the target work 2 is pre-registered in the setting mode. In the operation mode, the position of the target work 2 is specified by searching for the registered reference image or the characteristic information in the target input image.

Figure 12:
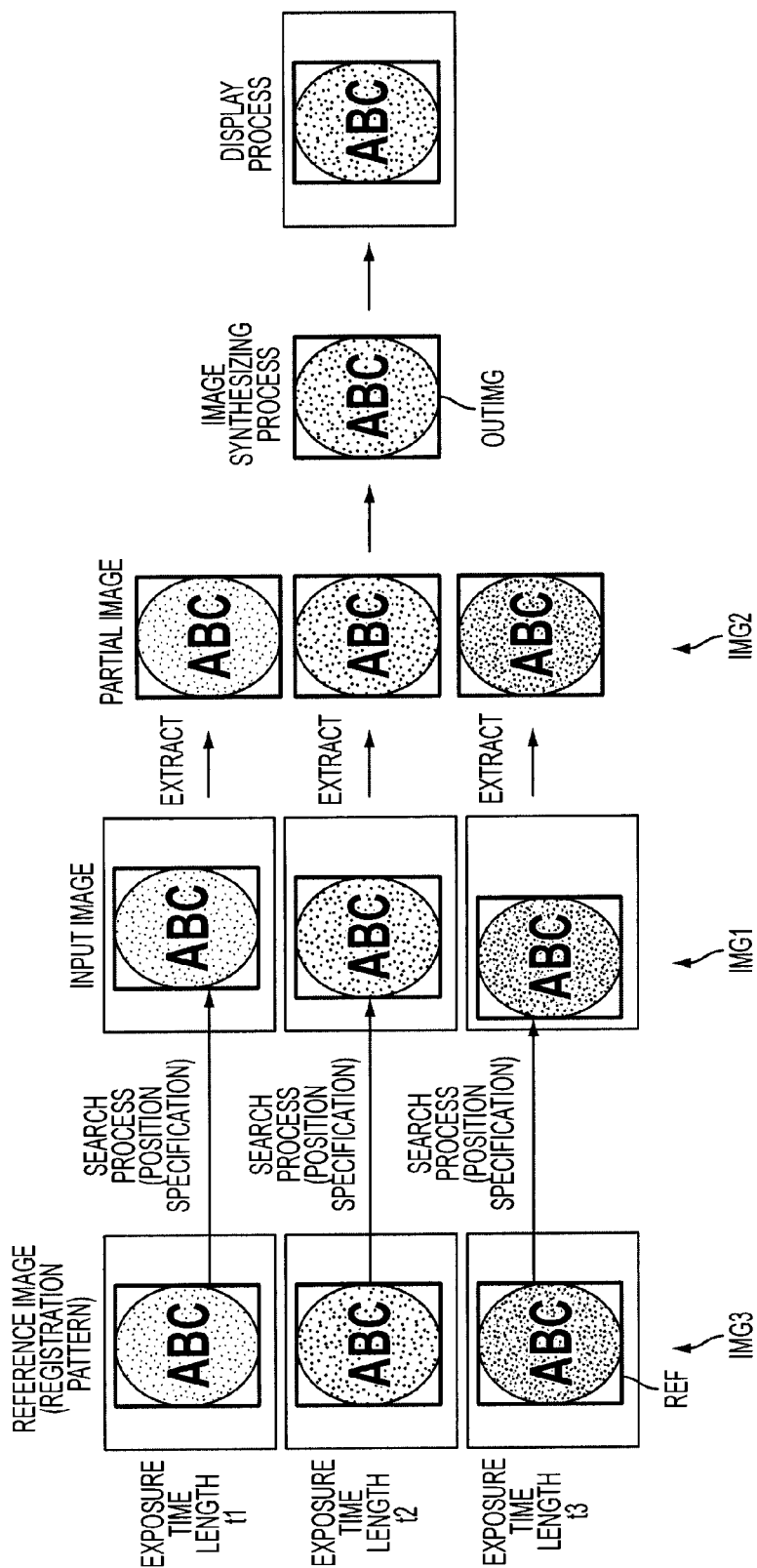
FIG. 12 is a diagram for describing the outline of s movement follow-up process (model registration type) according to the embodiment of the present invention

FIG. 12 is a diagram for describing the outline of the movement follow-up process (model registration type) according to the embodiment of the present invention. In FIG. 12, a case where one synthesized image is generated based on three input images will be illustrated for the sake of simplifying the explanation.

With reference to FIG. 12, a reference image REF, which is a model image, for specifying the position of the work 2 in each input image is first registered in the "setting mode". The reference image REF may be a color image imaged by the imaging unit 8, or may be converted to a gray scale image. The reference image REF may not be the reference image REF itself, and may be the characteristic information (edge image, edge position) of the work 2.

In particular, the reference image REF is preferably registered separately under each exposure condition in the movement follow-up process (model registration type) according to the present embodiment. This is based on the idea that the characteristic information effectively recognized in the search process, to be hereinafter described, often differs in the input images acquired by imaging under the respective exposure conditions. In other words, the portion having a relatively low light intensity has too low luminance and is not handled as superior information in the input image acquired under a condition of a relatively short exposure time length, but is handled as superior information in the input image acquired under a condition of a relatively long exposure time length.

Thus, in the registration process (setting mode) of the reference image REF according to the present embodiment, the work to be the reference (reference work) is imaged a plurality of times under the exposure condition same as the exposure condition for acquiring a plurality of input images for generating the synthesized image, and the region corresponding to the reference work is extracted from the plurality of input images IMG3 acquired by the respective imaging as the reference image REF. In other words, the region specified as the reference image is extracted from the set of input images acquired from a series of imaging carried out a plurality of times, apart from the operation mode, and a plurality of extracted reference images (or characteristic information of the target work 2 contained in each of the plurality of extracted reference images, as hereinafter described), is registered in correspondence with the respective exposure condition. The reference image (or characteristic information) corresponding to the exposure condition for the respective input image is used in the search process of the movement follow-up process. The reference work is imaged by the imaging unit 8 in a substantially stationary state. The plurality of reference images REF (or characteristic information of the reference work) extracted from the respective input images IMG3 are registered in correspondence with the respective exposure conditions.

Thereafter, a plurality of input images IMG1 is acquired by imaging the work 2 a plurality of times under different exposure conditions preliminarily defined in the operation mode. The search process based on the reference image REF is executed in the respective input images IMG1, and the position corresponding to the reference image REF is specified.

A partial image IMG2 having a predetermined size is extracted from the plurality of input images IMG1 based on the specified position. Further, the image synthesizing process, as described above, is executed on the plurality of extracted partial images IMG2, and a synthesized image OUTIMG is generated. Finally, the generated synthesized image OUTIMG is displayed on the monitor 102 and the like. In the display process, a process of interpolating the difference in size between the input image IMG1 and the synthesized image OUTIMG is simultaneously executed.

E2. Example of User Interface in Movement Follow-Up Process (Model Registration Type)

To facilitate the understanding on the image synthesizing process according to the present embodiment, one example of a user interface will be described with reference to FIGS. 13 to 17.

Figure 15:
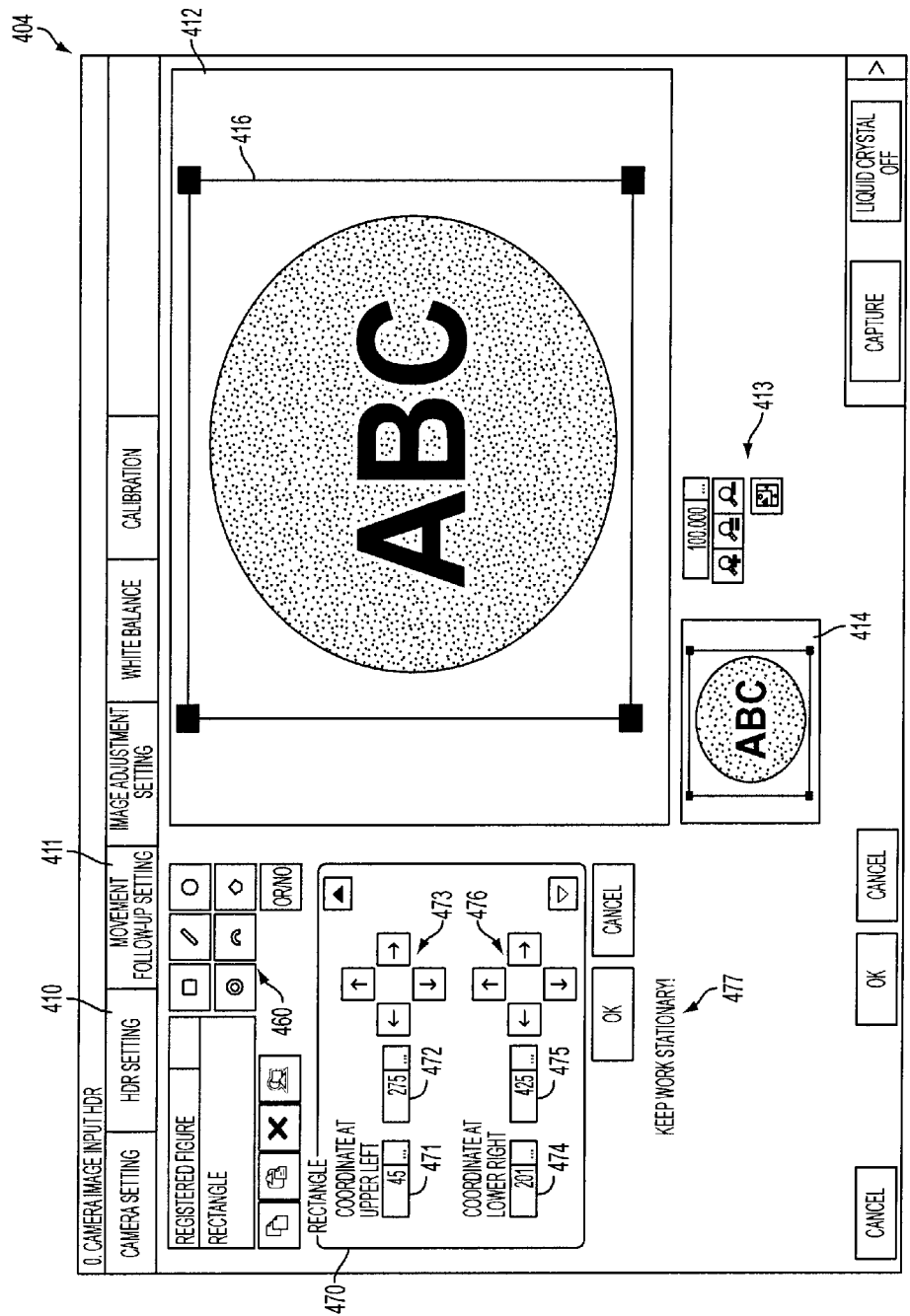
FIG. 15 is a diagram showing a screen display example (III) in the "setting mode" displayed on the monitor of the image processing device according to the embodiment of the present invention.
Figure 16:
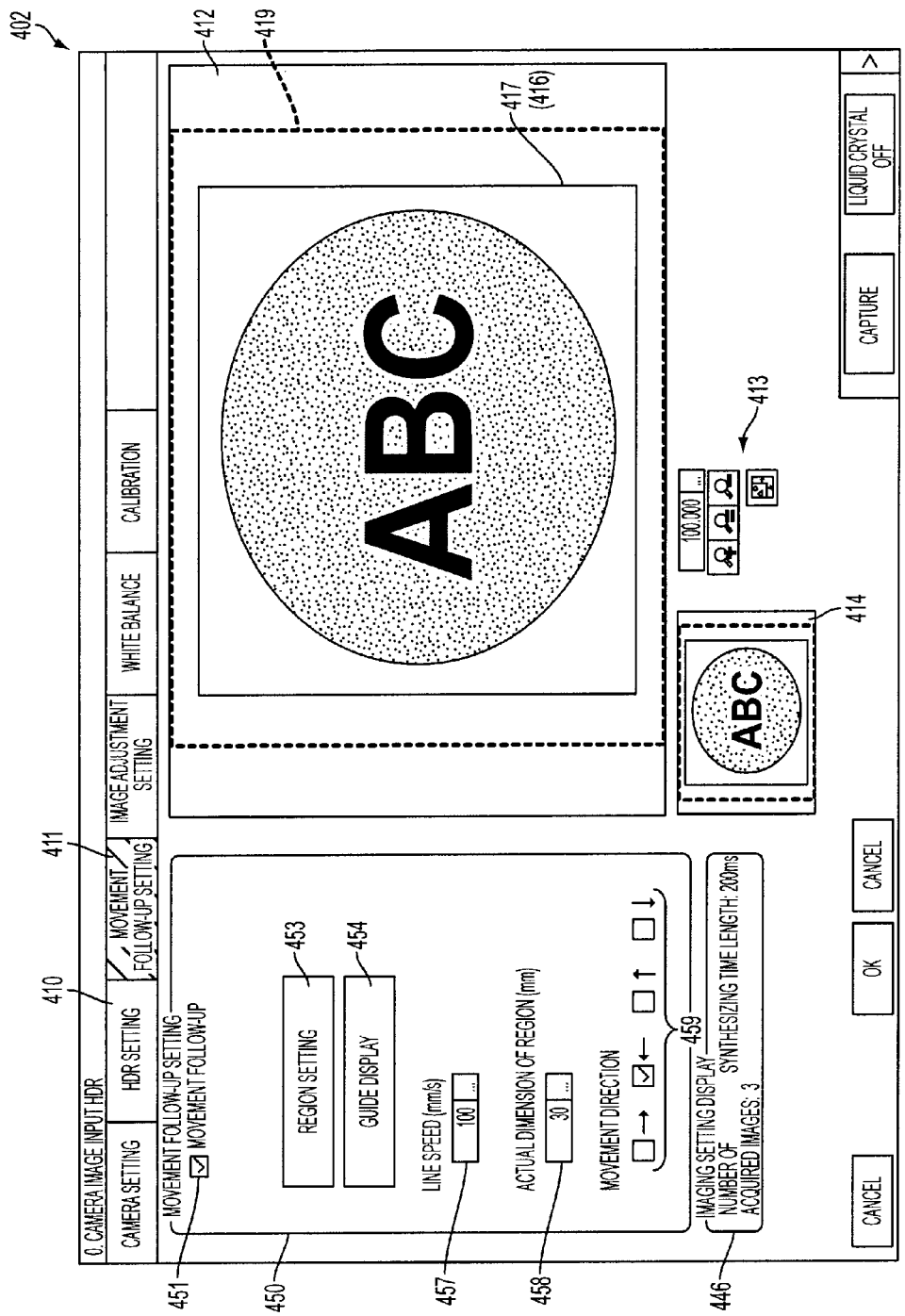
FIG. 16 is a diagram showing a screen display example (IV) in the "setting mode" displayed on the monitor of the image processing device according to the embodiment of the present invention.
Figure 17:
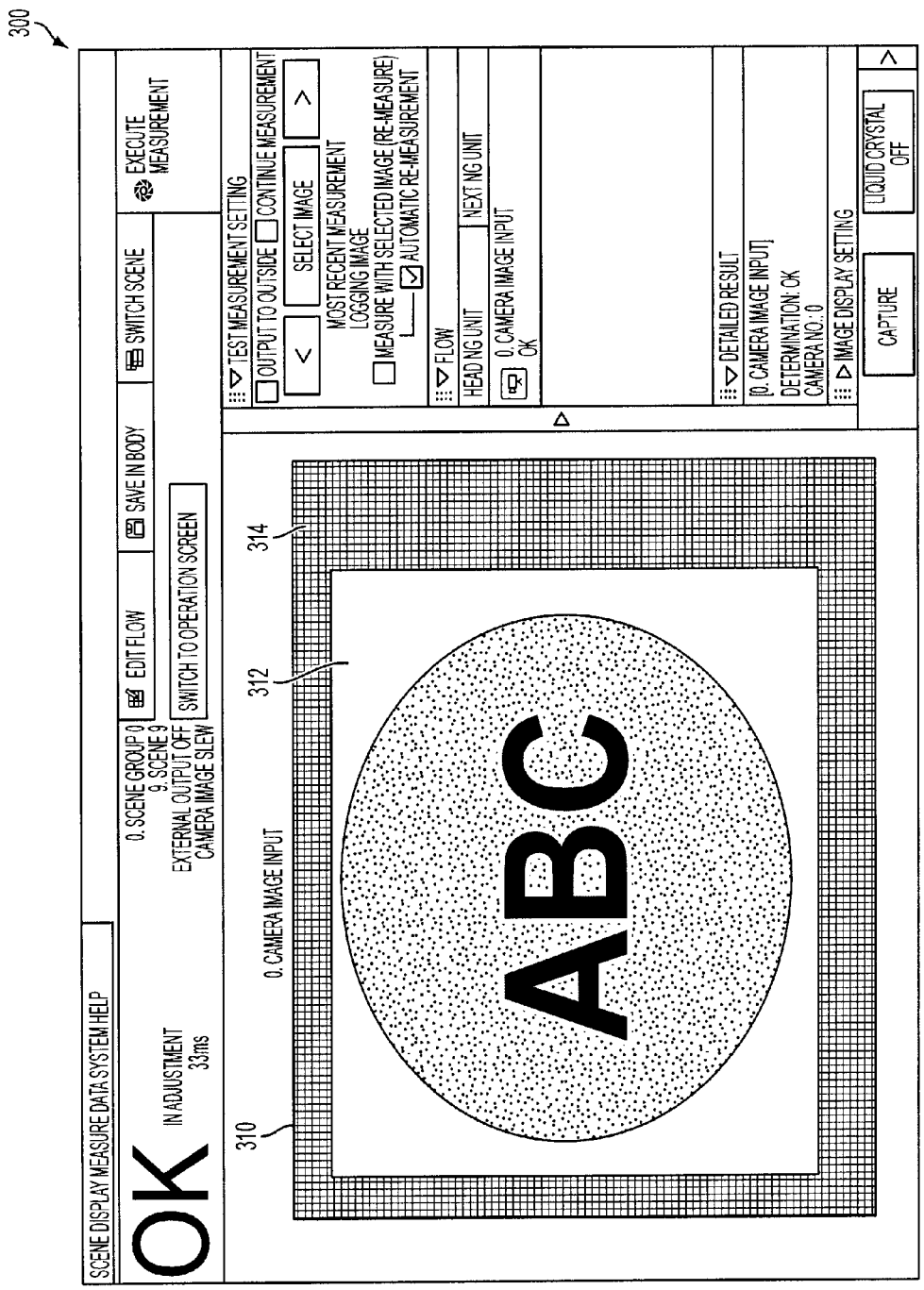
FIG. 17 is a diagram showing a screen display example in an "operation mode" displayed on the monitor of the image processing device according to the embodiment of the present invention.

FIGS. 13 to 16 are diagrams showing a screen display example in the "setting mode" displayed on the monitor 102 of the image processing device according to the embodiment of the present invention. FIG. 17 is a diagram showing a screen display example in the "operation mode" displayed on the monitor 102 of the image processing device according to the embodiment of the present invention. The setting screen as shown in FIGS. 13 to 17 are displayed by cooperatively operating the CPU 105, the display screen output unit 108 (see FIG. 3) and the like. Such screen display is implemented by a GUI (Graphical User Interface) program incorporated as one part of the OS (Operating System), which GUI also provides an environment for the user to carry out various user settings using a cursor on the screen operated by the keyboard 103 or the mouse 104.

(Setting Mode)

Various settings can be made in the "setting mode, and a screen in which a total of six tabs, "camera setting", "HDR setting", "movement follow-up setting", "image adjustment setting", "white balance" and "calibration", can be selected is displayed by way of example, as shown in FIGS. 13 to 17. In the following description, a user interface when the "HDR setting" tab 410 and the "movement follow-up setting" tab 411 for performing the main settings related to the image synthesizing process including the movement follow-up process according to the present embodiment are selected will be described. Other initial settings (setting of imaging unit 8 etc.) are assumed to be finished, and the reference work is assumed to be arranged in a stationary state in the view of the imaging unit 8 in the setting mode 8. In other words, the input image including the image of the reference work is assumed to be acquired by the imaging of the imaging unit 8.

Figure 13:
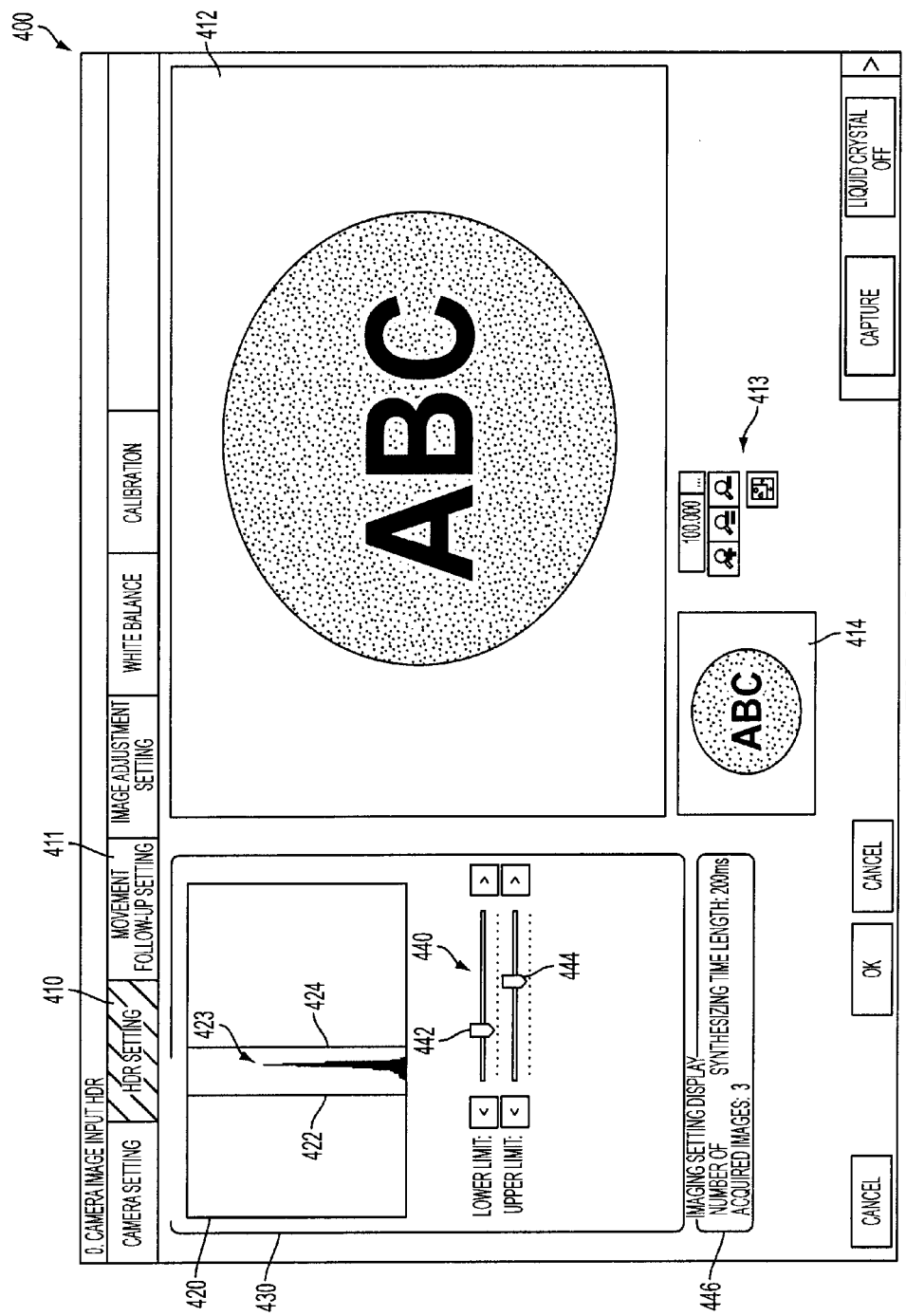
FIG. 13 is a diagram showing a screen display example (I) in a "setting mode" displayed on a monitor of the image processing device according to the embodiment of the present invention.

FIG. 13 shows one example of a setting mode screen 400 displayed in a case where the "HDR setting" tab 410 is selected. The setting mode screen 400 shown in FIG. 13 accepts the user operation (input operation) for determining the setting (hereinafter also referred to as "synthesizing process setting") related to the image synthesizing process including the exposure condition. More specifically, the user sets the "brightness" upper/lower limit range ("brightness"

upper limit and lower limit) suited to the target work 2 and the surrounding environment in the setting mode screen 400.

The setting mode screen 400 includes an image synthesis setting input area 430 including a histogram display area 420, an imaging setting display area 446, an image display area 412, an entire display area 414, and a display control icon group 413.

The histogram 423 on the "brightness" of the synthesized image is displayed and indicators 422 and 424 indicating the user set "brightness" upper limit and lower limit are respectively displayed in the histogram display area 420 of the image synthesis setting input area 430. The histogram 423 is appropriately generated by the histogram generation unit 218 (FIG. 5).

The image synthesis setting input area 430 also includes a "brightness" upper/lower limit range setting area 440. A slide bar 442 for setting the "brightness" lower limit and a slide bar 444 for setting the "brightness" upper limit are provided in the "brightness" upper/lower limit range setting area 440. The user set "brightness" upper/lower limit range is input to the brightness upper/lower limit setting unit 216 (FIG. 5) according to the operation of the slide bars 442 and 444. The "brightness" upper/lower limit range setting area 440 also displays a numerical input box for accepting the direct numerical input of the "brightness" lower limit and upper limit.

The user operates the position of the slide bar 442 or 444 with a mouse and the like while referencing the displayed histogram 423, or directly inputs numbers to the corresponding numerical input box by operating the ten key and the like to set the desired "brightness" upper/lower limit range. The range that can cover substantially the entire histogram 423 is preferred for the "brightness" upper/lower limit range of the initial value. The display positions of the indicators 422 and 424 are updated in cooperation with such user setting.

The content of the synthesizing process setting including the exposure condition is determined according to the setting of the "brightness" upper/lower limit range by the user. The synthesizing process setting is sometimes determined as the condition with the time length allowed for one image synthesizing process, and the like.

In the imaging setting display area 446, the content of the synthesizing process setting determined in such a manner is displayed. As one specific example, the imaging setting display area 446 displays the number of input images (the number of acquired images) necessary for one image synthesis, the time length (synthesizing time length) necessary for one image synthesis, and the like.

In the image display area 412, the synthesized image, which is the result of imaging and image synthesizing process, is displayed according to the content of the synthesizing process setting determined in the above manner. The synthesized image displayed in the image display area 412 is equivalent to the synthesized image used in tests and measurements in the operation mode. The user or the adjustment personnel adjusts the "brightness" upper/lower limit range, the surrounding environment (in particular, illumination environment), and the like with reference to the display of the image display area 412. The synthesized image displayed on the image display area 412 is updated in real time, and thus when the "brightness" upper/lower limit range is changed by user operation as described above, the synthesized image reflecting the "brightness" upper/lower limit range after the change is displayed. Further, the size of the synthesized image displayed on the image display area 412 can be changed according to the user operation on the display control icon group 413.

The entire display area 414 displays the image to be displayed in the image display area 412. However, the image to be displayed is always entirely displayed in the entire display area 414 independent from the display size in the image display area 412. In other words, which region of the entire image the image being displayed in the image display area 412 corresponds to is indicated in the image display area 412. The user thus can enlarge and observe the portion (region) of interest while grasping the entire synthesized image.

In the setting mode, the image to be displayed in the image display area 412 may be a synthesized image updated in real time, or may be a synthesized image generated at the timing arbitrarily specified by the user. Further, the input image imaged by the imaging unit 8 with a predetermined exposure time length may be displayed as is in the image display area 412. The type of image to be displayed in the image display area 412 is more preferably arbitrarily selectable by operating a dialogue (not shown), and the like.

Figure 14:
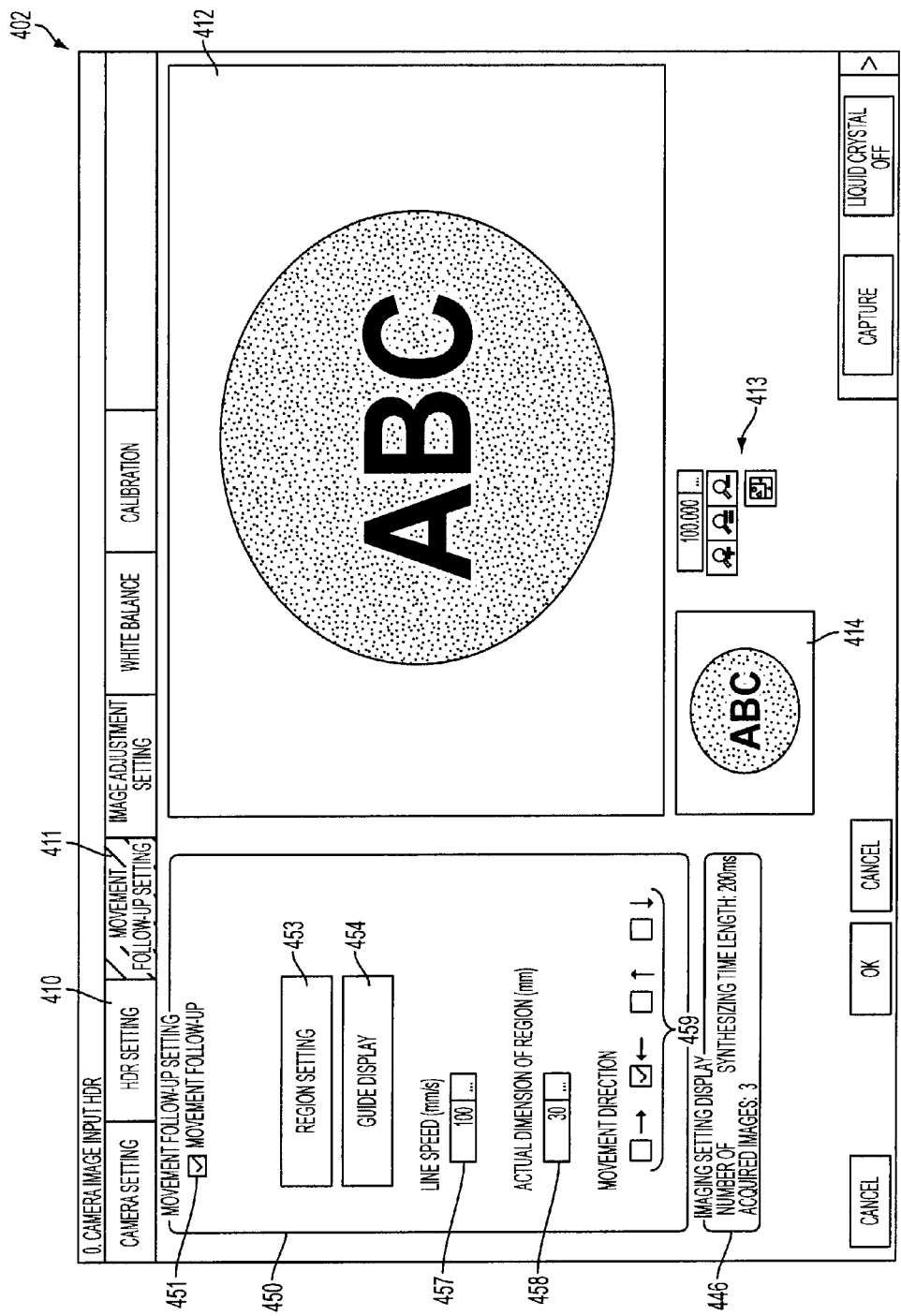
FIG. 14 is a diagram showing a screen display example (II) in the "setting mode" displayed on the monitor of the image processing device according to the embodiment of the present invention.

If the "movement follow-up setting" tab 411 is selected after the content of the synthesizing process setting including the exposure condition is determined according to the above operations, a setting mode screen 402 as shown in FIG. 14 is displayed. The setting mode screen 402 shown in FIG. 14 accepts the user operation for performing a setting related to the movement follow-up process.

The setting mode screen 402 includes a movement follow-up setting input area 450, the imaging setting display area 446, the image display area 412, the entire display area 414, and the display control icon group 413. Other than the movement follow-up setting input area 450, other areas are similar to the setting mode screen 400 shown in FIG. 13, and thus the detailed description thereof will not be repeated.

The movement follow-up setting input area 450 includes a movement follow-up check box 451, a region setting button 453, a guide display button 454, a line speed input box 457, a work size input box 458, and a line movement direction check box group 459.

The movement follow-up check box 451 accepts the setting of validation/invalidation of the movement follow-up process according to the present embodiment. The movement follow-up process is validated when the movement follow-up check box 451 is checked.

The region setting button 453 accepts a region setting for extracting a region, as the reference image REF, from the input images acquired by imaging the reference work. In the present embodiment, a case where the size of the region for extracting as the reference image REF of the input image is determined to be the same as the size of the partial image used in the image synthesizing process will be illustrated. In other words, the partial image having the size same as the size of the region, which is set by the user by selecting the region setting button 453, is extracted from the respective input images, and the synthesized image is generated. That is, the region having the preset size as the size of the partial image to be extracted from the input image is extracted as the reference image REF.

When the region setting button 453 is selected, a region setting screen 404 shown in FIG. 15 is displayed. The region setting screen 404 shown in FIG. 15 displays an icon group 460 for selecting the shape of the region to be extracted as the reference image REF. When the user selects an icon in the icon group 460, the region 416 having the selected shape is displayed overlapping the input image displayed in the image display area 412. The shape of the region 416 to be extracted as the reference image REF may be, basically, only rectangular.

The user sets the region 416 to an appropriate size and position while referencing the image acquired by imaging the reference work displayed in the image display area 412. Specifically, the user performs a mouse operation (e.g., click, drag, etc.) on the region 416 displayed in the image display area 412 to interactively change the size and the position of the region 416. In other words, the region having a size independent from the region having a preset size as the size of the partial image to be extracted from the input image is extracted as the reference image REF according to the user operation.

Further, the region setting screen 404 includes a coordinate value setting area 470 for setting the size and the position of the region 416 by a coordinate value. The coordinate value setting area 470 includes numerical input boxes 471, 472, 474, 475 for accepting the coordinate value (numerical value) of the diagonal vertices of the region 416, and cross-shaped buttons 473, 476 for shifting the position of the region 416.

The region setting screen 404 also displays an assisting message 477 for notifying the user that the reference work needs to be maintained in a stationary state.

In the region setting screen 404, after setting the size and the position of the region 416 to be extracted as the reference image REF, the user selects the "OK" button to return to the setting mode screen 402 shown in FIG. 14. If the region 416 to be extracted as the reference image REF is already set, the indicator indicating the range may be further displayed in the image display area 412.

After the region 416 to be extracted as the reference image REF is set according to the procedures described above, the reference work is imaged a plurality of times according to the exposure condition in the synthesizing process setting, and the region 416 is extracted from each input image acquired by the respective imaging and registered as the reference image REF.

Again referring to FIG. 14, a guide display button 454 accepts a display instruction for a guide indicating the size of a maximum range in which the synthesized image for the target work 2 can be generated. As shown in FIG. 16, when such a guide display button 454 is selected, a guide frame 419 is displayed on the image imaged by the imaging unit 8 displayed in the image display area 412. More specifically, the guide frame 419 is displayed on the monitor 102 when the CPU 105 provides information (internal command) indicating the range of the guide frame 419 to the display screen output unit 108.

As described above, the synthesized image is generated by extracting one part of the input image in the image synthesizing process according to the present embodiment. Thus, from the standpoint of providing a user friendly image processing device, it is important to notify the user up to which range is the target of image synthesizing process under the synthesizing process setting determined beforehand. Thus, in the movement follow-up process according to the present embodiment, the guide frame 419 indicating the maximum range that can be output as the synthesized image is displayed. The size of the guide frame 419 is calculated based on the movement velocity (set by user) of the work 2, which is a measuring article, in the view of the imaging unit 8, and a time length (preliminarily calculated by the user according to the set photographing condition) required to acquire a plurality of input images under the respective exposure conditions contained in the synthesizing process setting. The movement velocity of the work 2 includes the speed at which the work 2 moves (absolute value of speed) and the movement direction. In other words, the guide frame 419 becomes shorter by both ends along the movement direction of the work 2 compared to the size of the input image.

The line speed input box 457, the work size input box 458, and the line movement direction check box group 459 accept parameters for calculating the guide frame 419 shown in FIG. 16. In other words, the user inputs the numerical value of the actually measured line speed (conveying speed) of the conveying line 6 conveying the work 2 to the line speed input box 457. The actually measured lien speed is typically defined in units of [mm/s]. the user inputs the numerical value of the actual dimension (typically, maximum actually measured size at the surface of the work 2) of the region (partial image IMG2) generated as the synthesized image to the work size input box 458. The actual dimension of the region is typically defined in units of [mm]. Further, the user inputs the conveying direction of the work 2 by selecting the corresponding line movement direction check box group 459. FIG. 14 shows an example of a setting when the work 2 moves from the right side to the left side in the plane of drawing, by way of example.

The detailed content of the process of calculating the size of the guide frame 419 will be described later. As shown in FIG. 16, the user can set the region 416 (setting frame 417 indicating the set region 416 is shown in FIG. 16) to be extracted as the reference image REF according to the procedures shown in FIG. 15 with reference to the guide frame 419 displayed on the image imaged by the imaging unit 8 in the image display area 412. Further, a warning message may be notified when attempting to set the region 416 beyond the guide frame 419.

The guide frame 419 shows the maximum size that can be output as the synthesized image, and the display position may be arbitrary as long as it is entirely accommodated in the image display area 412. The guide frame 419, however, is preferably arranged at the center of the image display area 412.

Alternatively, the display position of the guide frame 419 may be updated with the first set point of the region 416 to be extracted as the reference image REF as a reference, according to the procedures shown in FIG. 15.

The region setting for extracting a region as the reference image REF can be easily performed even by a user with little knowledge by displaying such a guide frame 419.

After the synthesizing process setting including the exposure condition is confirmed and the reference image is registered, the mode transitions to the "operation mode".

(Operation Mode)

In the operation mode, the above-described image synthesizing process starts when the work 2 is conveyed by the conveying line 6 to the trigger position where the trigger signal is output from the photoelectric sensor.

FIG. 17 shows one example of an operation mode screen 300 displaying the synthesized image generated at certain timing. The operation mode screen 300 shown in FIG. 17 includes a synthesized image display area 310 for displaying the generated synthesized image 312. The synthesized image display area 310 is set to a size that can display the entire input image, and a black display 314 for interpolation is made at the portion other than the generated synthesized image 312. Optical measurements and tests (not shown) are executed on the synthesized image 312.

E3. Control Structure of Movement Follow-Up Process (Model Registration Type)

Figure 18:
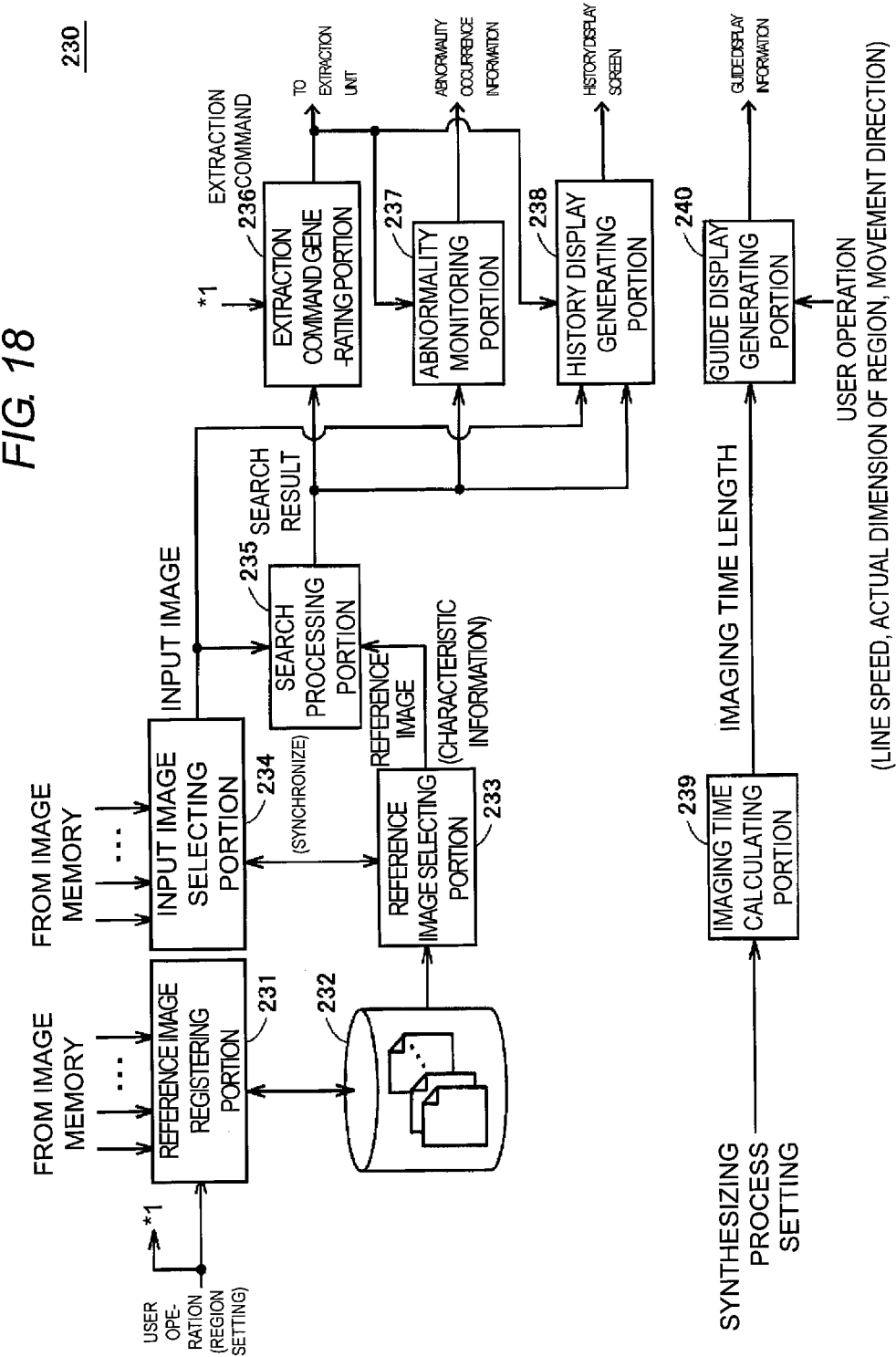
FIG. 18 is a functional block diagram showing a more detailed control structure of a movement follow-up control unit shown in FIG. 5.

FIG. 18 is a functional block diagram showing a more detailed control structure of the movement follow-up control unit 230 shown in FIG. 5. With reference to FIG. 18, the movement follow-up control unit 230 that provides the movement follow-up process (model registration type) includes, as a control structure, a reference image registering portion 231, a reference image storing portion 232, a reference image selecting portion 233, an input image selecting portion 234, a search processing portion 235, an extraction command generating portion 236, an abnormality monitoring portion 237, a history display generating portion 238, an imaging time calculating portion 239, and a guide display generating portion 240. Each control block shown in FIG. 18 will be described below while also referring to FIG. 12.

In the setting mode, the reference image registering portion 231 extracts, as the reference image REF, the region 416 (FIG. 15) to be extracted as the reference image REF from the input image IMG3 (FIG. 12) acquired by imaging the reference work a plurality of times according to the exposure condition contained in the synthesizing process setting determined beforehand. The reference image registering portion 231 then stores the extracted reference image REF in the reference image storing portion 232 in correspondence with the respective exposure condition.

Since the respective input image IMG3 (FIG. 12) acquired in the setting mode is also stored in the corresponding image memory 204, the reference image registering portion 231 selectively reads out the input image IMG3 from the corresponding image memory 204 for every exposure condition.

As shown in FIG. 12, the registration of the reference image REF is executed based on the input image IMG3 acquired by imaging the stationary reference work, and hence the region extracted as the reference image REF is the same in all the input images IMG3. Thus, for the user, the registration process of the reference image REF can be completed with one operation without being conscious of registering a plurality of reference images REF for every exposure condition.

The reference image storing portion 232 stores the reference image REF output from the reference image registering portion 231 in correspondence with the exposure condition thereof. The reference image storing portion 232 typically holds files for the respective exposure conditions, and stores the data of the corresponding reference image REF in each file.

In the operation mode, the reference image selecting portion 233 reads out the reference image REF corresponding to the exposure condition of the input image IMG1 (FIG. 12) to be processed from the reference image storing portion 232 in synchronization with the input image selecting portion 234, to be hereinafter described, and sequentially outputs the same to the search processing portion 235.

In the operation mode, when the input image IMG1 imaged by the imaging unit 8 is stored in the corresponding image memory 204, the input image selecting portion 234 selectively and sequentially reads out the input image IMG1 from the respective image memory 204, and outputs the same to the search processing portion 235 and the history display generating portion 238.

The search processing portion 235 performs a search process on the input image IMG1 from the input image selecting portion 234 based on the reference image REF from the reference image selecting portion 233, and specifies the position corresponding to the reference image REF in the input image IMG1. The position specified by the search processing portion 235 is output to the extraction command generating portion 236, the abnormality monitoring portion 237, and the history display generating portion 238, as a search result.

The extraction command generating portion 236 outputs an extraction command for extracting the partial image IMG2 from the target input image IMG1 based on the search result (information on the position corresponding to the reference image REF) from the search processing portion 235 to the corresponding extraction unit 205 (FIG. 5). In the present embodiment, a configuration in which the size of the partial image IMG2 is handled as being the same as the size of the region extracted as the reference image REF is illustrated, and hence the extraction command generating portion 236 extracts the partial image IMG2 having the same size as the reference image REF from the target input image IMG1.

In the operation mode, the abnormality monitoring portion 237 notifies error (abnormality occurrence information) to the user and the like when the search processing portion 235 fails to specify the position corresponding to the reference image REF in the input image IMG1, when the extraction of the partial image IMG2 from the input image IMG1 by the extraction command generating portion 236 is judged as abnormal, and the like. More specifically, the abnormality monitoring portion 237 determines the presence of abnormality based on the search result output from the search processing portion 235 and the extraction command output from the extraction command generating portion 236. The details on the determination on the presence of abnormality, content of error to be notified, and the like, will be described later.

In cooperation with the abnormality monitoring portion 237, the history display generating portion 238 notifies the user a history (log) such as the position of the respective partial image IMG2 in the relevant process when some kind of abnormality occurs in the operation mode.

The imaging time calculating portion 239 calculates the time length (imaging time length) necessary for imaging a plurality of input images required to generate one synthesized image based on the exposure condition contained in the predetermined synthesizing process setting. The imaging time length is equivalent to the time length required from the start of first exposure to the end of last exposure, and includes a readout time length of the image captured by the imaging element and the like, in addition to the exposure time length required for each imaging.

The guide display generating portion 240 outputs guide display information for performing the guide display shown in FIG. 16 based on the values of the line speed, the actual dimension of the region, the movement direction and the like input by the user operation, in addition to the imaging time length calculated by the imaging time calculating portion 239.

E4. Search Process in Movement Follow-Up Process (Model Registration Type)

The details of the search process in the search processing portion 235 will be described with reference to FIGS. 19A and 19B.

Figure 19A:
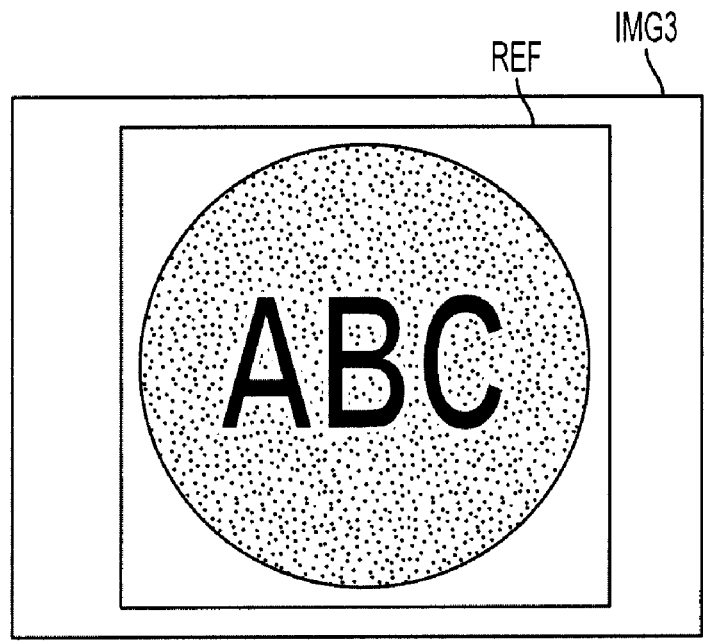
FIGS. 19A and 19B are diagrams for describing details of a search process according to the embodiment of the present invention.
Figure 19B:
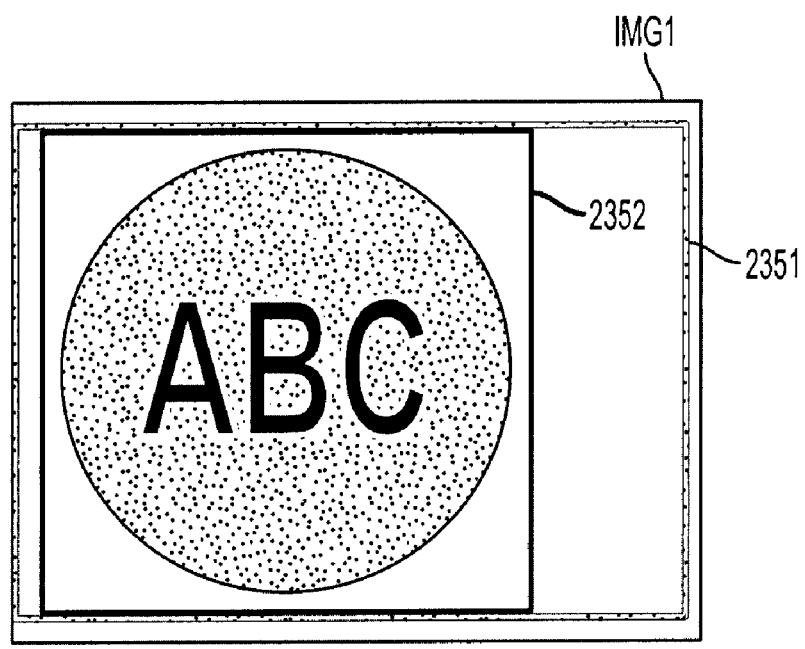

FIGS. 19A and 19B are diagrams for describing the details of the search process according to the embodiment of the present invention. FIG. 19A shows the pre-registered reference image REF, and FIG. 19B shows a specific example of the search process.

As shown in FIG. 19A, a predetermined region of the input image IMG3 acquired by imaging a reference work in a stationary state is registered as the reference image REF in the setting mode. In the operation mode, the search process based on the reference image REF is executed on the input image IMG1 acquired by imaging the work 2.

As shown in FIG. 19B, in the search process, an image same as or similar to the reference image REF of the input image IMG1 is searched. In the example shown in FIG. 19B, a corresponding region 2352 of the reference image REF is specified as a result of the search. Various known methods can be used for such a search process (pattern search or pattern matching). By way of example, a method utilizing a normalizing cross-correlation, an edge code matching method focusing on the edge portion that appears in the image, and the like can be adopted. As an example of the former method, one method is disclosed in "High-speed template matching by monotonic function of normalizing correlation calculation", Ikeda et al., IEICE, D-II, Vol. J83-DII No. 9, pp. 1861 to 1860, September, 2000.

The search region may not be the entire input image IMG1, and may be limited to one part (search region 2351 shown in FIG. 19B). In particular, in the visual sensor system 1 according to the present embodiment, the search region may be limited in view of the movement direction and the movement distance of the work 2 since the work 2 that moves on the conveying line 6 is to be imaged. Specifically, the search region may be limited to a range on the downstream than the position specified by the previous search process with respect to a series of input images IMG1 acquired by successively imaging the same work 2. The speed of the search process thereby increases.

The work 2 is sometimes conveyed while rotating depending on the target conveying line 6, in which case, the search process that takes rotation into consideration is preferably performed. If the search process that takes rotation into consideration is performed, the partial image IMG2 extracted from the input image IMG1 is also assumed to have rotated. Thus, the partial image IMG2 itself is preferably aligned in a predetermined direction before performing the image synthesis.

E5. Guide Display Process in Movement Follow-Up Process (Model Registration Type)

The details of the guide display process in the guide display generating portion 240 will be described with reference to FIGS. 20 and 21.

Figure 20:
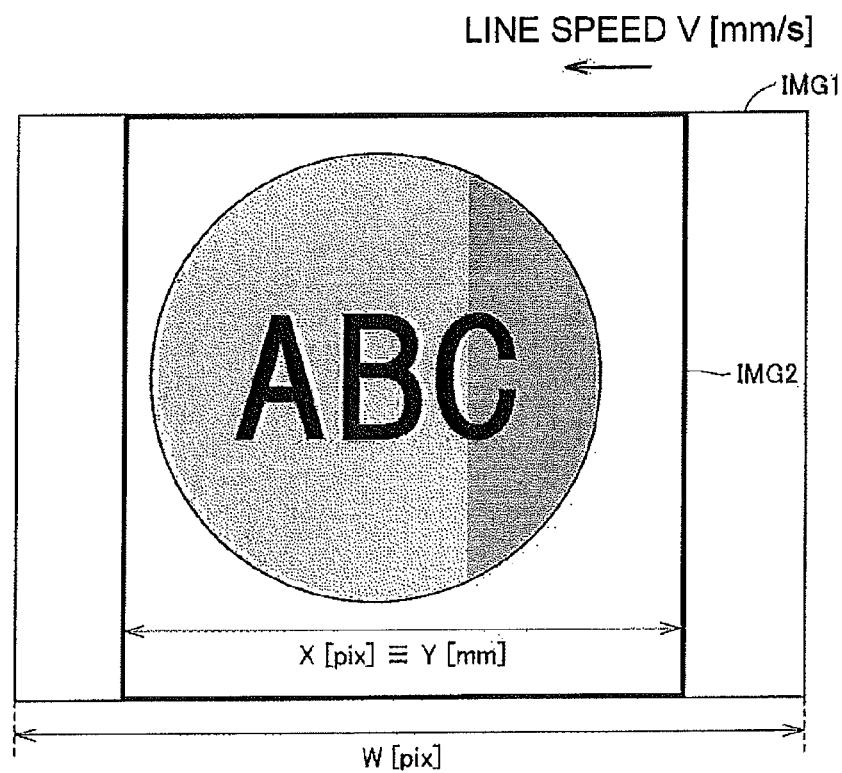
FIG. 20 is a diagram for describing a method of calculating a guide frame according to the embodiment of the present invention.

FIG. 20 is a diagram for describing the method of calculating the guide frame according to the embodiment of the present invention. FIG. 21 is a diagram for describing the processing timings according to the embodiment of the present invention.

The partial image IMG2 needs to be within the view of the imaging unit 8 at before and after the movement of the work 2 in the time length (imaging time length) required to image a plurality of input images for generating one synthesized image to perform the movement follow-up process according to the present embodiment. In other words, the sum of the length in the movement direction of the work 2 of the partial image IMG2 and the movement distance of the work 2 within the imaging time length needs to be smaller than or equal to a length in the movement direction of the work 2 of the view of the imaging unit 8.

Figure 21:
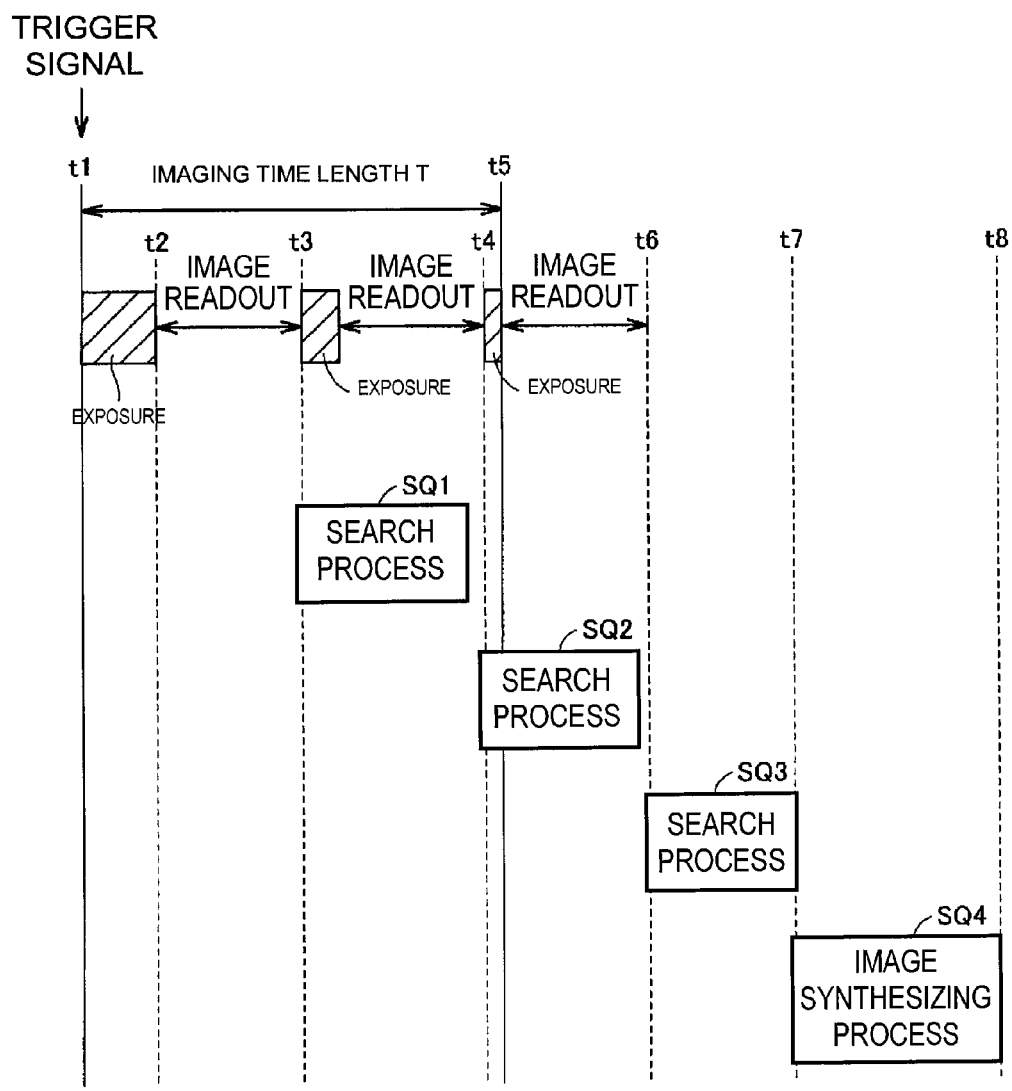
FIG. 21 is a diagram for describing processing timings according to the embodiment of the present invention.

By way of example, the processing timing when one synthesized image is generated based on three input images is as shown in FIG. 21. In FIG. 21, the exposure of the first imaging starts at time t1. This exposure continues during time t1 to t2. Thereafter, the image acquired by the first exposure is read out from the imaging element during time t2 to t3. In other words, the first imaging is performed during time t1 to t3. Similarly, the second imaging is performed during time t3 to t4, and the third imaging is performed during t4 to t6. The imaging time length T required to image a plurality of input images for generating one synthesized image is equivalent to a period of time t1 to t5.

As shown in FIG. 20, assuming the conveying direction of the conveying line 6 is the left and right direction in the plane of drawing, the time length (imaging time length) required to image a plurality of input images for generating one synthesized image is T [s], the line speed is V[mm/s], the size in the conveying direction of the input image IMG1 is W [pix (pixel)], and the maximum size in the conveying direction of the partial image IMG2 is X [pix]=Y [mm], the following equation needs to be met. Here, X is the length in units of pixels in the view of the imaging unit 8, and Y is the actual dimension.

$$(W-X)/W=(V \times T)/(V \times T+Y)$$

Solving the equation for X, X=W×Y/(V×T+Y) is obtained. By way of example, X=427 [pix] if the imaging time length T=0.15 [s], the line speed V=100 [mm/s], and the maximum actual dimension in the conveying direction of the partial image IMG2 is Y=30 [mm].

In the above-described example, a case where the conveying direction is the left and right direction in the plane of drawing has been illustrated, but calculation can be performed through similar procedures for when the conveying direction is the up and down direction in the plane of drawing. Only if the conveying line 6 has the conveying direction in one direction in the view of the imaging unit 8, the direction thereof may be either one. However, in view of efficiently extracting the partial image IMG2, arrangement is preferably such that the conveying direction is parallel to one of the sides of the view (normally square) of the imaging unit 8.

In the above-described example, the maximum actual dimension Y [mm] in the convening direction of the partial image IMG2 is used because the line speed is generally obtained only in units of [mm/s] etc., which is an actually measured value. In other words, the movement velocity of the work 2 in the view of the imaging unit 8, that is, the line speed having a dimension of [pix/s] is calculated by converting the line speed of the actually measured value with the maximum actual dimension in the conveying direction of the partial image IMG2. In place of a method of inputting the maximum actual dimension in the conveying direction of the partial image IMG2, the necessary actual dimension may be measured from the input image acquired through imaging by arranging a ruler with a scale and the like lined with the work 2 in the view of the imaging unit 8.

If the line speed having a dimension of [pix/s] can be acquired, the maximum actual dimension in the conveying direction of the partial image IMG2 does not need to be input.

The maximum length X in the conveying direction of the partial image IMG2 calculated by such a calculation process is used as the length of the guide frame shown in FIG. 16.

E6. Parallel Process in Movement Follow-Up Process (Model Registration Type)

With reference again to FIG. 21, the imaging process and the search process are preferably executed in parallel to reduce the time length required to generate one synthesized image in the image synthesizing process according to the present embodiment.

More specifically, as shown in FIG. 21, the search process (SQ1) on the input image acquired by the first imaging starts at time t3 when the input image is acquired by the first imaging. At time t3, the second imaging by the imaging unit 8 also starts. If the time length required for the search process is shorter than the time length required for one imaging process in the imaging unit 8, the search process (SQ2) on the input image acquired by the second imaging can be executed in parallel at time t4, which is the start timing of the third imaging.

Thereafter, following the finish of the third imaging process, the search process (SQ3) on the input image acquired by the third imaging and the image synthesizing process (SQ4) are executed.

Thus, the time length required for the process can be reduced by the time length required for the search process, as a whole, by parallel executing the imaging process and the search process.

E7. Abnormality Monitoring Process (I) in Movement Follow-Up Process (Model Registration Type)

The details of the abnormality monitoring (error notifying) process in the operation mode will be described with reference to FIGS. 22 and 23.

Figure 22:
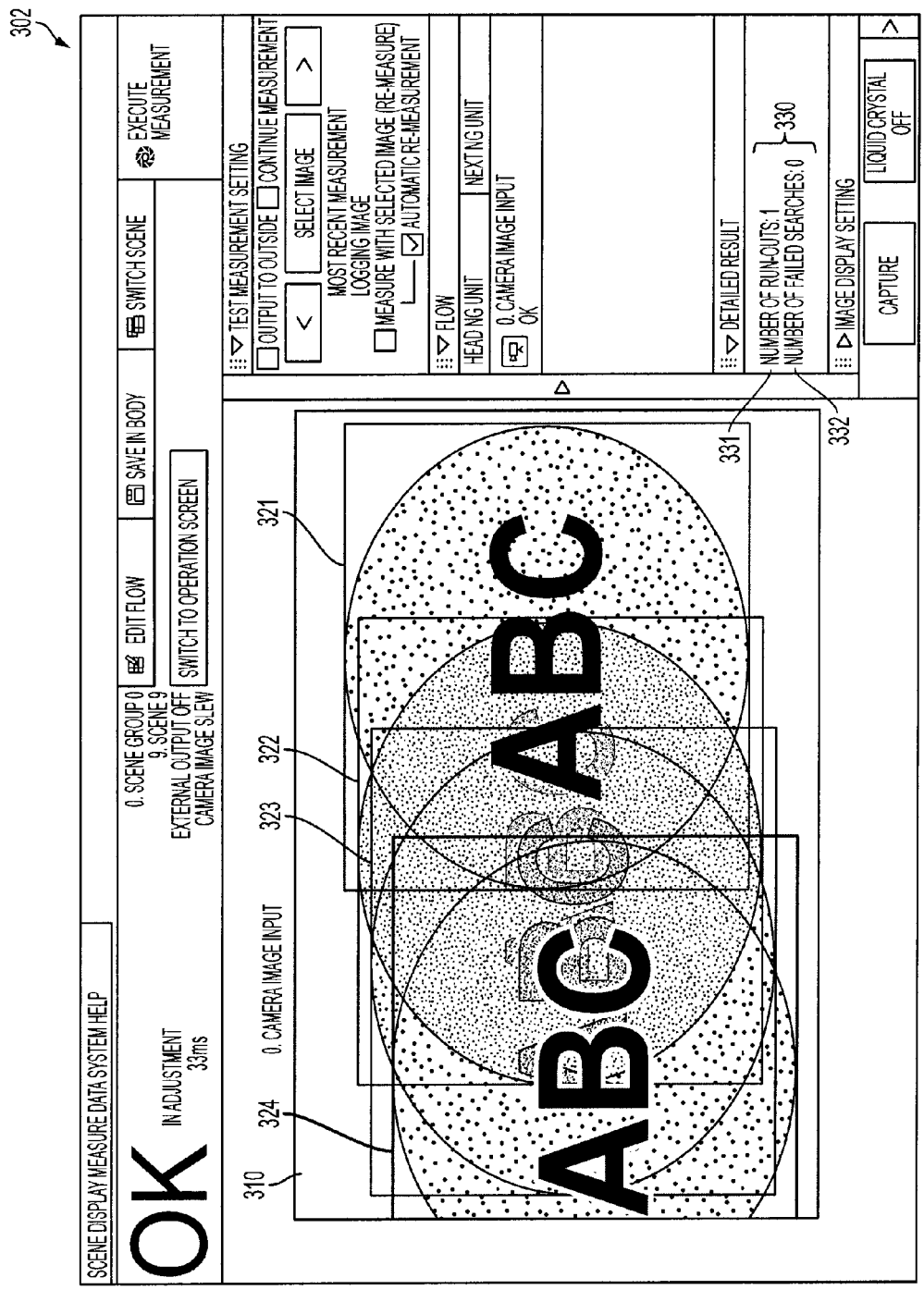
FIG. 22 is a diagram showing a screen display example of an error notification in the "operation mode" displayed on the monitor of the image processing device according to the embodiment of the present invention.

FIG. 22 is a diagram showing a screen display example of an error notification in the "operation mode" displayed on the monitor 102 of the image processing device according to the embodiment of the present invention. In an operation mode screen 302 shown in FIG. 22, a history showing a state when abnormality occurred is displayed in the synthesized image display area 310. Specifically, when monitoring a specific abnormality of the position corresponding to the reference image in a plurality of input images, each region of the partial image IMG2 extracted in the course of generating one synthesized image is displayed in correspondence with the view of the imaging unit 8 in the synthesized image display area 310.

In other words, in the example shown in FIG. 22, the partial image IMG2 extracted from the input image IMG1 acquired by the first imaging and the frame 321 indicating the region thereof are displayed. Similarly, the partial images IMG2 extracted from the input images IMG1 acquired by the second to the fourth imaging and the frames 322 to 324 indicating the region thereof are displayed. The display shown in FIG. 22 is realized by the data output from the history display generating portion 238 (FIG. 18). The plurality of input images IMG1 is displayed like a multiplex exposure image.

In the example shown in FIG. 22, it can be seen that the partial image IMG2 extracted from the input image IMG1 acquired by the fourth imaging runs out of the view of the imaging unit 8. In other words, the extraction of the partial image from the input image acquired by the fourth imaging is determined as abnormal. This means that the movement follow-up process failed.

In such a case, the display mode (typically, display color, flashing display, etc.) of the frame 324 showing the region of the partial image corresponding to the input image acquired by the fourth imaging is differed from the other frame display modes in which abnormality has not occurred to notify error to the user.

Thus, a series of positions of the region of the partial image IMG2 extracted in the course of generating one synthesized image is displayed on the same screen, and hence how the region of the partial image IMG2 is changing in time-series can be grasped at a glance.

Further, a message 330 notifying the content of abnormality occurrence to the user is also displayed in the operation mode screen 302 shown in FIG. 22. the message 330 distinctively notifies error by type of abnormality that occurred. More specifically, a case where the extraction of the partial image IMG2 from the input image IMG1 is abnormal (the number of run-outs) and a case where the specification (search process) of the position corresponding to the reference image REF in the input image IMG1 is abnormal (the number of failed searches) are distinguished, and the numerical values showing the number of times the respective abnormality occurred (the number of partial images) is displayed.

In the case shown in FIG. 22, detection is made as run-out if the region corresponding to the model image is searched.

Figure 23A:
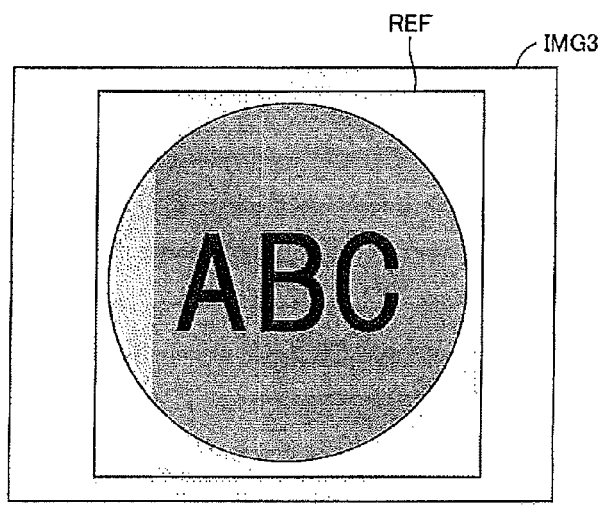
FIGS. 23A and 23B are diagrams for describing a case where extraction of a partial image from an input image according to the embodiment of the present invention is abnormal.
Figure 23B:
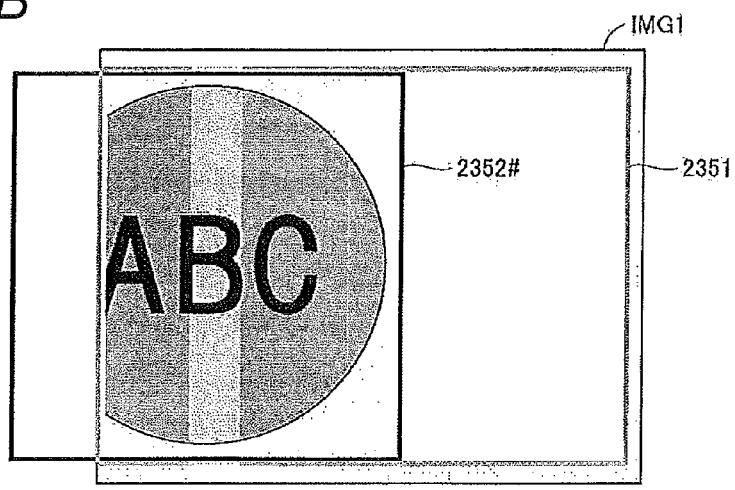

FIGS. 23A and 23B are diagrams for describing a case where the extraction of the partial image IMG2 from the input image IMG1 is abnormal according to the embodiment of the present invention.

As shown in FIG. 23A, the reference image REF similar to FIG. 19A is assumed to be pre-registered, and one example of the result of executing the search process on the input image IMG1 imaged under one of the exposure conditions is shown in FIG. 23B. In the example shown in FIG. 23B, the corresponding region 2352# of the reference image REF is specified, but the region of one part of the region 2352# runs out to the outside of the range of the input image IMG1, as opposed to the example shown in FIG. 19B. The run-out portion of the region 2352# does not have image information, and thus the synthesized image that satisfies the preset synthesizing process setting cannot be generated. The error notification is thus performed in such a case as a process abnormality.

Since the synthesized image that satisfies the preset synthesizing process setting cannot be generated when the corresponding region of the reference image REF cannot be specified by the search process, that is, when the input image IMG1 does not include an image same as or similar to the reference image REF, and thus the error notification is performed as a process abnormality.

E8. Abnormality Monitoring Process (II) in Movement Follow-Up Process (Model Registration Type)

As another mode of the abnormality monitoring process, the presence of abnormality may be determined according to whether or not the temporal position change of the region of the extracted partial image IMG1 indicates the original change. Such an original change is typically estimated from the conveying speed of the work 2. Another mode of the abnormality monitoring process in the operation mode will be described below with reference to FIGS. 24 and 25.

Figure 24A:
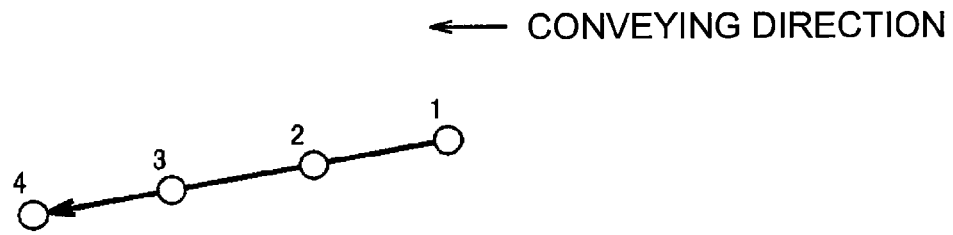
FIGS. 24A and 24B are diagrams for describing another mode of the abnormality monitoring process according to the embodiment of the present invention.
Figure 24B:
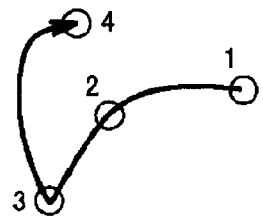
Figure 25:
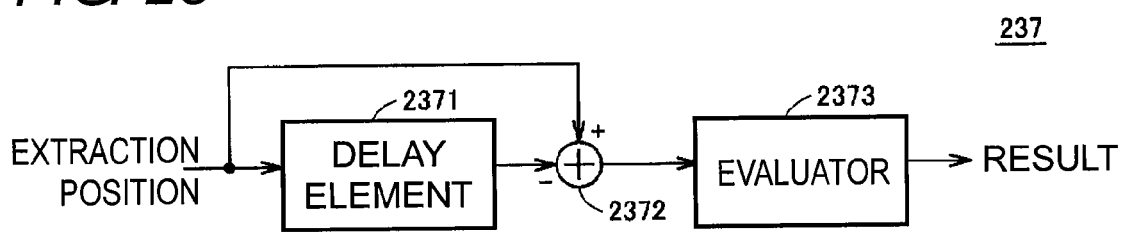
FIG. 25 is a diagram showing one example of a control structure in an abnormality monitoring portion for realizing the processes shown in FIGS. 24A and 24B.

FIGS. 24A and 24B are diagrams for describing another mode of the abnormality monitoring process according to the embodiment of the present invention. FIG. 25 is a diagram showing one example of a control structure in the abnormality monitoring portion 237 for realizing the processes shown in FIGS. 24A and 24B.

With reference to FIGS. 24A and 24B, if the conveying direction of the conveying line 6 is from the right side to the left side in the plane of drawing, the position of the partial image IMG2 that follows the movement of the work 2, which is the measuring article, should temporally change along the conveying direction. In other words, as shown in FIG. 24A, the position of the partial image IMG2 should essentially move in time-series from the right side to the left side in the plane of drawing such as the position (reference number 1) of the partial image IMG2 extracted from the input image IMG1 acquired by the first imaging, and the position (reference number 2) of the partial image IMG2 extracted from the input image IMG1 acquired by the second imaging.

However, as shown in FIG. 24B, if the position (reference number 4) of the partial image IMG2 extracted from the input image IMG1 acquired by the fourth imaging is changed in the direction opposite to the conveying direction compared to the position (reference number 3) of the partial image IMG2 extracted from the input image IMG1 acquired by the third imaging, determination is made as abnormal. Thus, the presence of abnormality can also be determined based on the temporal position change of the region of the extracted partial image IMG2.

As a control structure for determining the presence of such abnormality, the abnormality monitoring portion 237 includes a delay element 2371, a vector subtractor 2372, and an evaluator 2373, as shown in FIG. 25.

The delay element 2371 is input with an extraction command (extraction position) output from the extraction command generating portion 236, and delays the information on the extraction position by the time length required for one image synthesizing process. This is to compare the extraction positions of the partial images IMG2 between the temporally adjacent image synthesizing processes.

The vector subtractor calculates a vector difference between the output from the delay element 2371 and the extraction position from the extraction command generating portion 236. Since the two-dimensional coordinate value of the input image IMG1 is at least input to the vector subtractor 2372 as the extraction position, the vector difference is calculated by calculating the difference between the components contained in the respective coordinate values.

The evaluator 2373 determines the presence of abnormality based on the vector difference calculated by the vector subtractor 2372. Typically, determination is made as abnormal if one of the components of the vector difference calculated in the vector subtractor 2372 takes a "negative" value.

E9. Adjustment of Imaging Unit in Movement Follow-Up Process (Model Registration Type)

As shown in FIG. 16, a method for the user to easily set the region 416 to be extracted as the reference image REF (same as size extracted as the partial image IMG2 in the present embodiment) with reference to the guide frame 419 displayed on the image imaged by the imaging unit 8 has been described, but the view adjustment of the imaging unit 8 is also facilitated by referencing the guide frame 419.

Figure 26A:
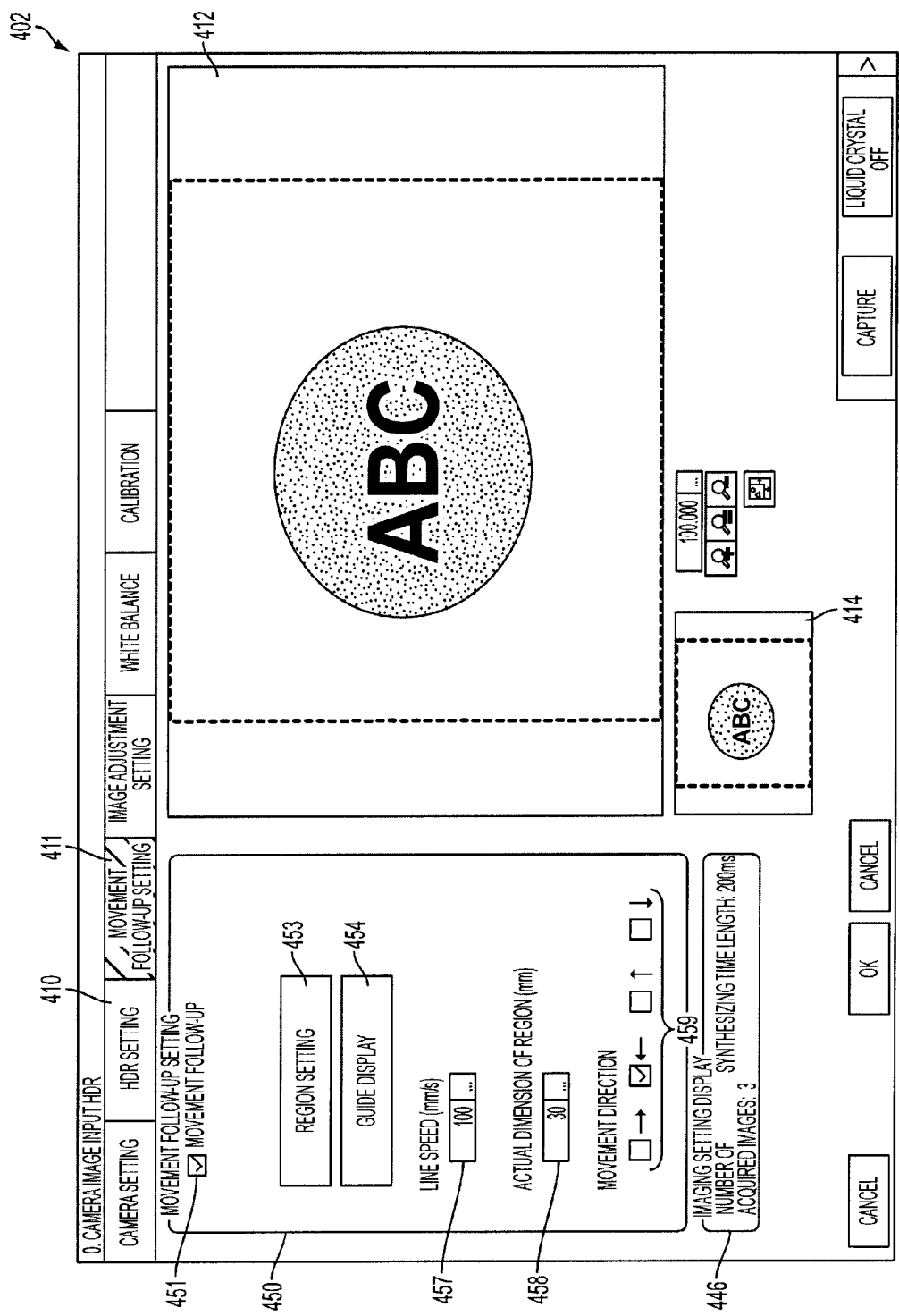
FIGS. 26A to 26C are diagrams showing a screen display example during view adjustment according to the embodiment of the present invention.
Figure 26B:
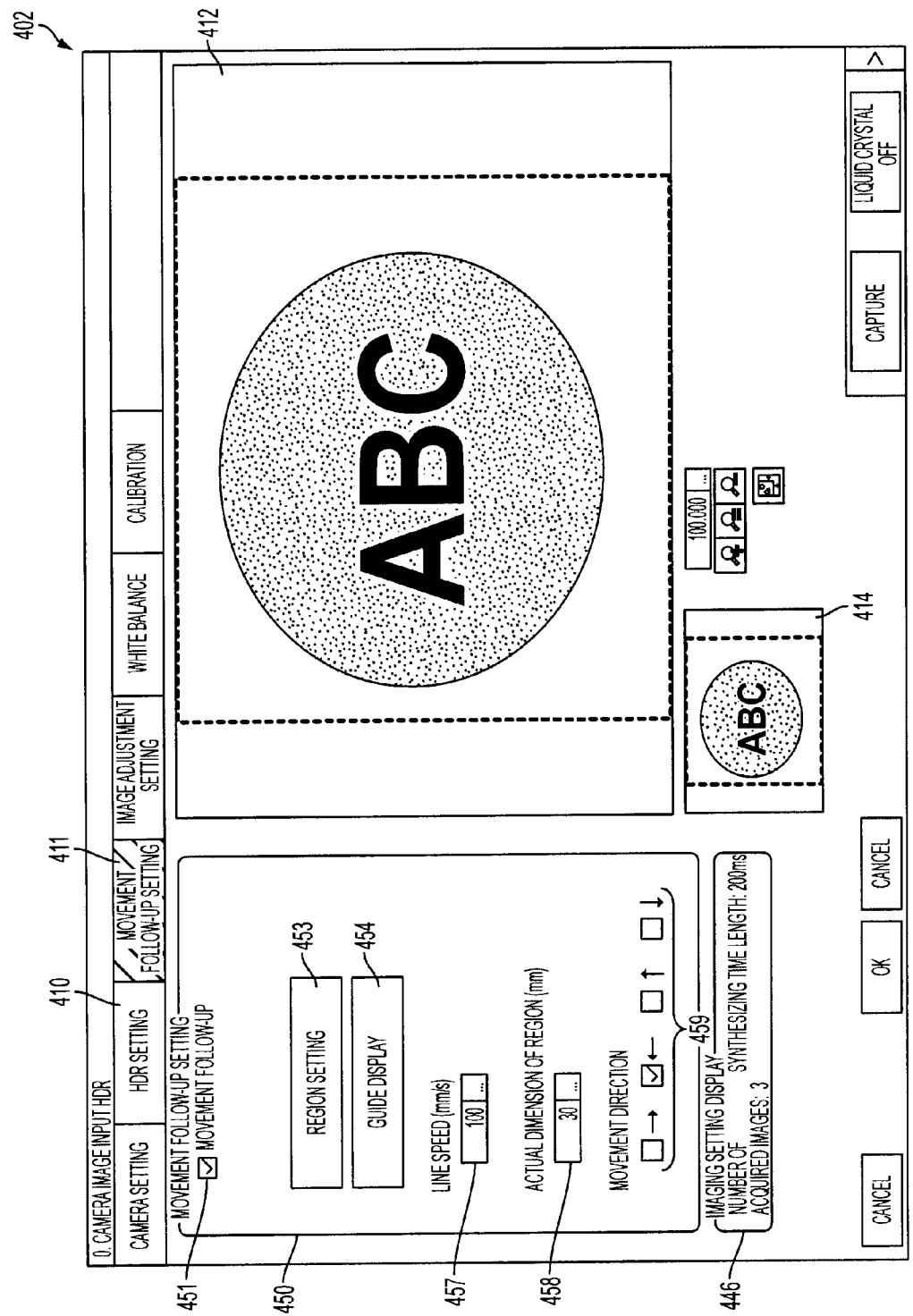
Figure 26C:
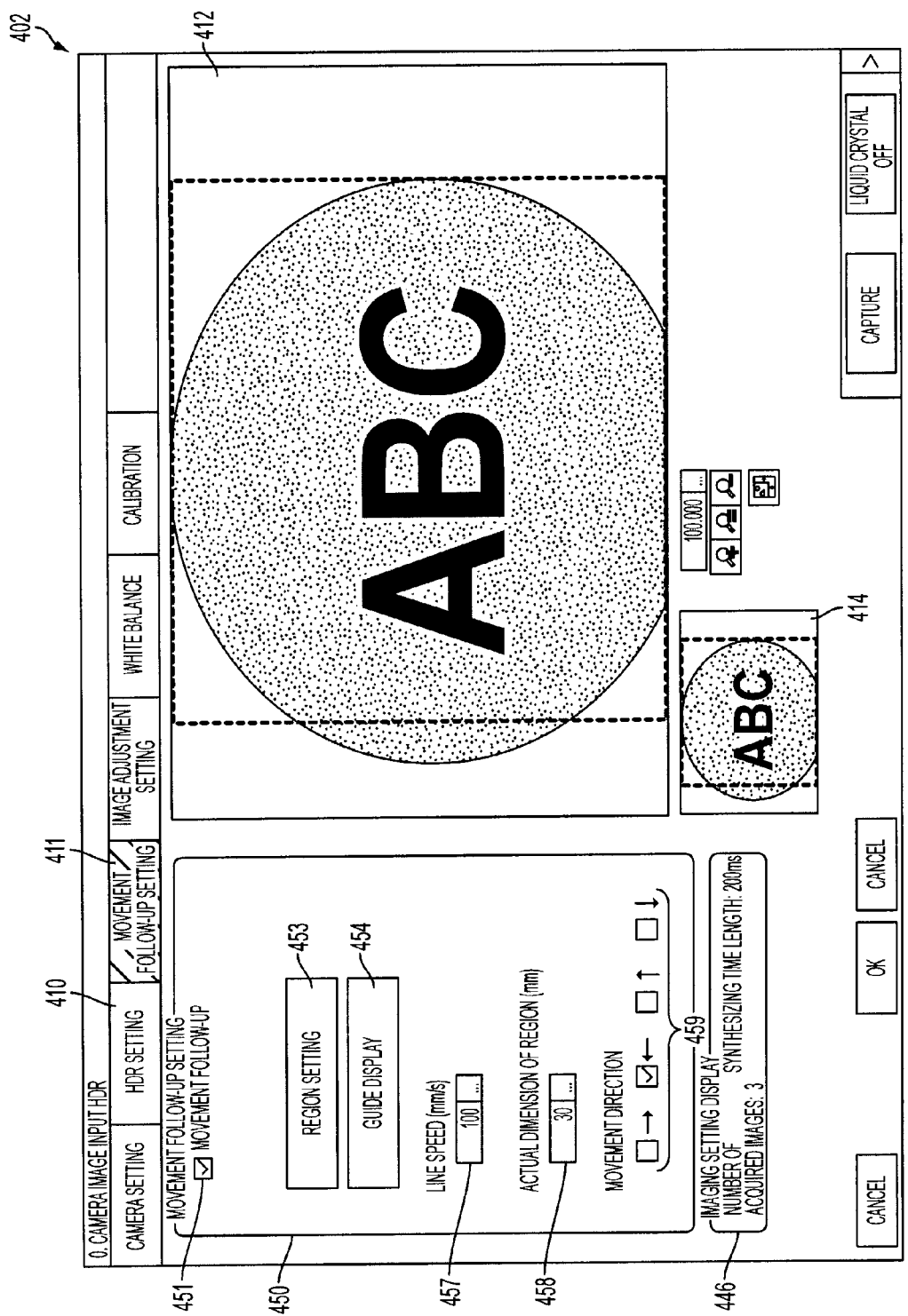
Figure 27A:
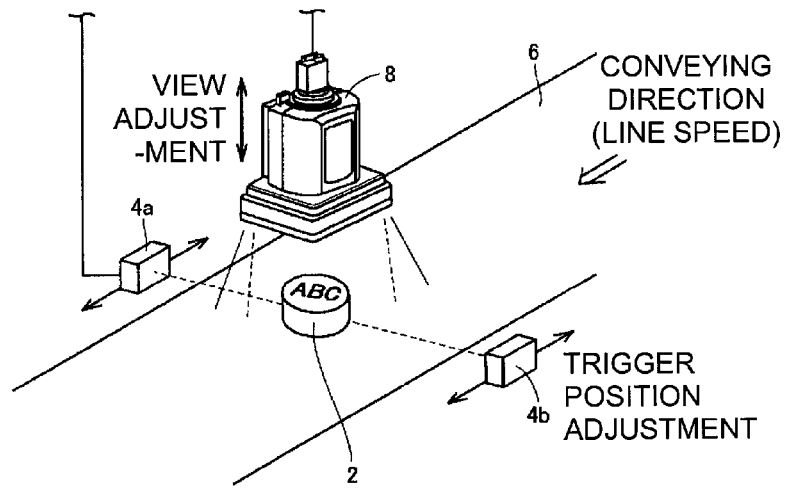
FIGS. 27A and 27B are diagrams for describing various adjustment operations according to the embodiment of the present invention.
Figure 27B:
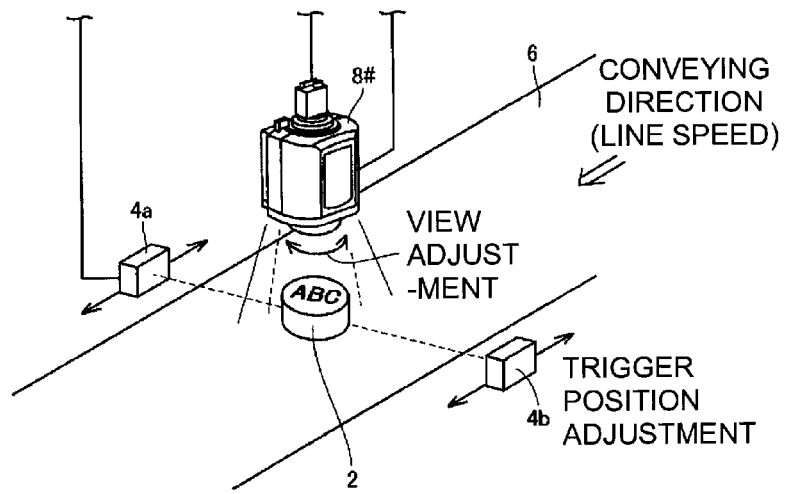

FIGS. 26A to 26C are diagrams showing a screen display example during view adjustment according to the embodiment of the present invention. FIGS. 27A and 27B are diagrams for describing various adjustment operations according to the embodiment of the present invention.

When performing the view adjustment of the imaging unit 8, the position and the like of the imaging unit 8 are adjusted such that the guide frame 419 is displayed in the image display area 412 and the size of the work 2 of the measuring article displayed in the image display area 412 is appropriate compared to the size of the guide frame 419. In this case, the image display area 412 preferably displays in real time the images successively imaged by the imaging unit 8 under a predetermined exposure condition.

At a certain setting, when the image imaged by the imaging unit 8 is displayed as FIG. 26A, the view of the imaging unit 8 becomes narrower since the size of the work 2 is too small with respect to the guide frame 419. When the work 2 is displayed running out from the guide frame 419 as in FIG. 26C, the view of the imaging unit 8 becomes wider since the size of the work 2 is too large with respect to the guide frame 419.

The view of the imaging unit 8 is adjusted until the work 2 is displayed at an appropriate size with respect to the guide frame 419, as shown in FIG. 26B.

If the imaging unit 8 is a fixed focal length lens, the view adjustment is performed by adjusting the distance of the imaging unit 8 with respect to the work 2, as shown in FIG. 27A, for the method of adjusting the view of the imaging unit 8. When using the imaging unit 8# having a zoom lens, the view adjustment is performed by giving a command to drive the zoom lens to the imaging unit 8#, as shown in FIG. 27B.

As shown in FIGS. 27A and 27B, the attachment position of the photoelectric sensor may be adjusted to adjust the generation timing of the trigger signal, as necessary.

E.10 Overall Processing Procedure in Movement Follow-Up Process (Model Registration Type)

Figure 28:
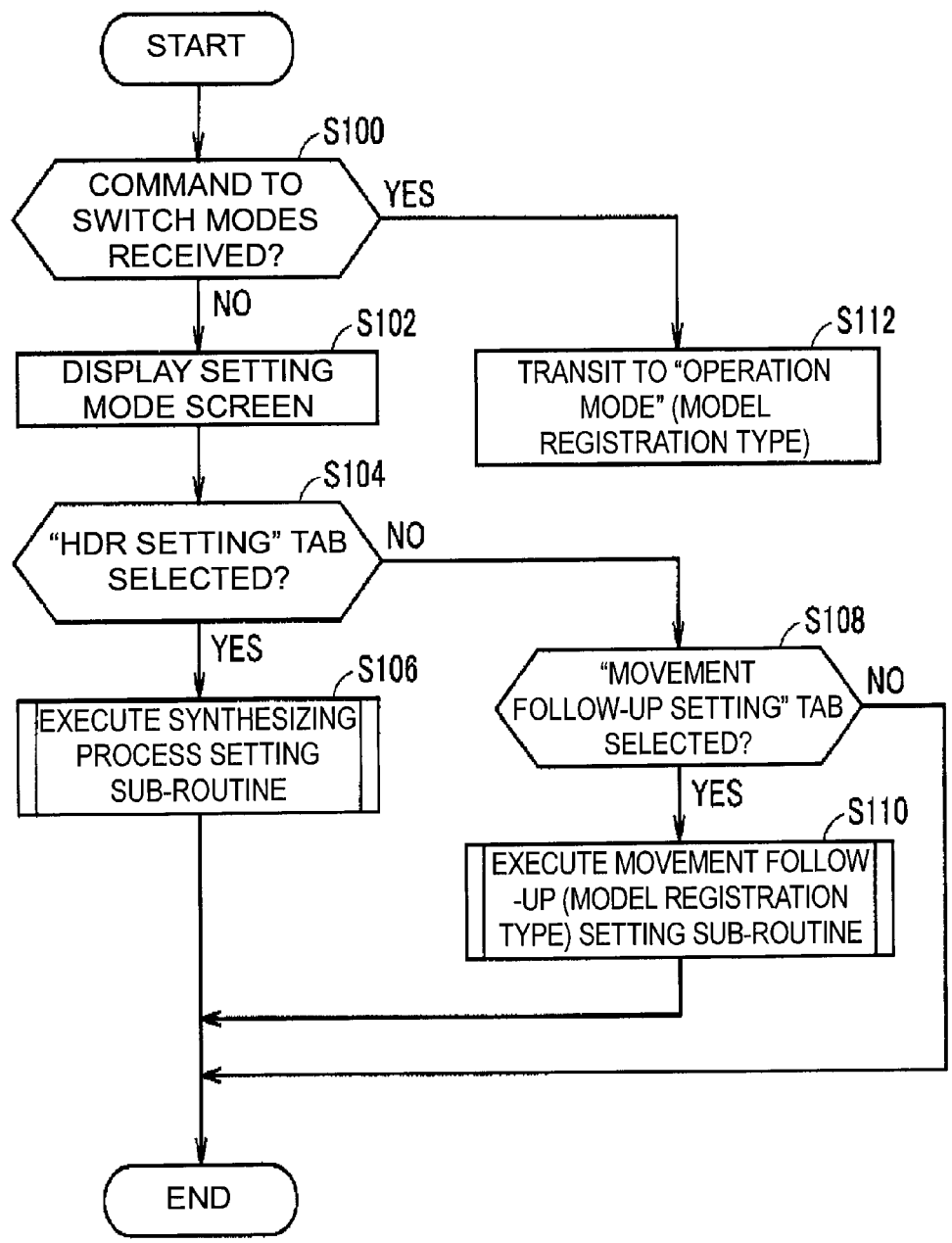
FIG. 28 is a flowchart showing overall processes (model registration type) in the image processing device according to the embodiment of the present invention.

FIG. 28 is a flowchart showing overall processes (model registration type) in the image processing device according to the embodiment of the present invention. The flowchart shown in FIG. 28 is implemented when the CPU 105 reads out the program preliminarily stored in the fixed disk 107 and the like to the memory 106 and executes the program. The initial mode is the "setting mode".

With reference to FIG. 28, the CPU 105 determines whether or not a command to switch modes is provided (step S100). If the command to switch modes is not provided (NO in step S100), the CPU 105 displays a setting mode screen (step S102). Whether or no the "HDR setting" tab 410 of the setting mode screen is selected is then determined (step S104). If the "HDR setting" tab 410 of the setting mode screen is selected (YES in step S104), the CPU 105 executes a synthesizing process setting sub-routine (step S106).

If the "HDR setting" tab 410 of the setting mode screen is not selected (NO in step S104), the CPU 105 determines whether or not the "movement follow-up setting" tab 411 of the setting mode screen is selected (step S108). If the "movement follow-up setting" tab 411 of the setting mode screen is selected (YES in step S108), the CPU 105 executes the movement follow-up (model registration type) setting sub-routine (step S110). The process then returns.

Figure 32:
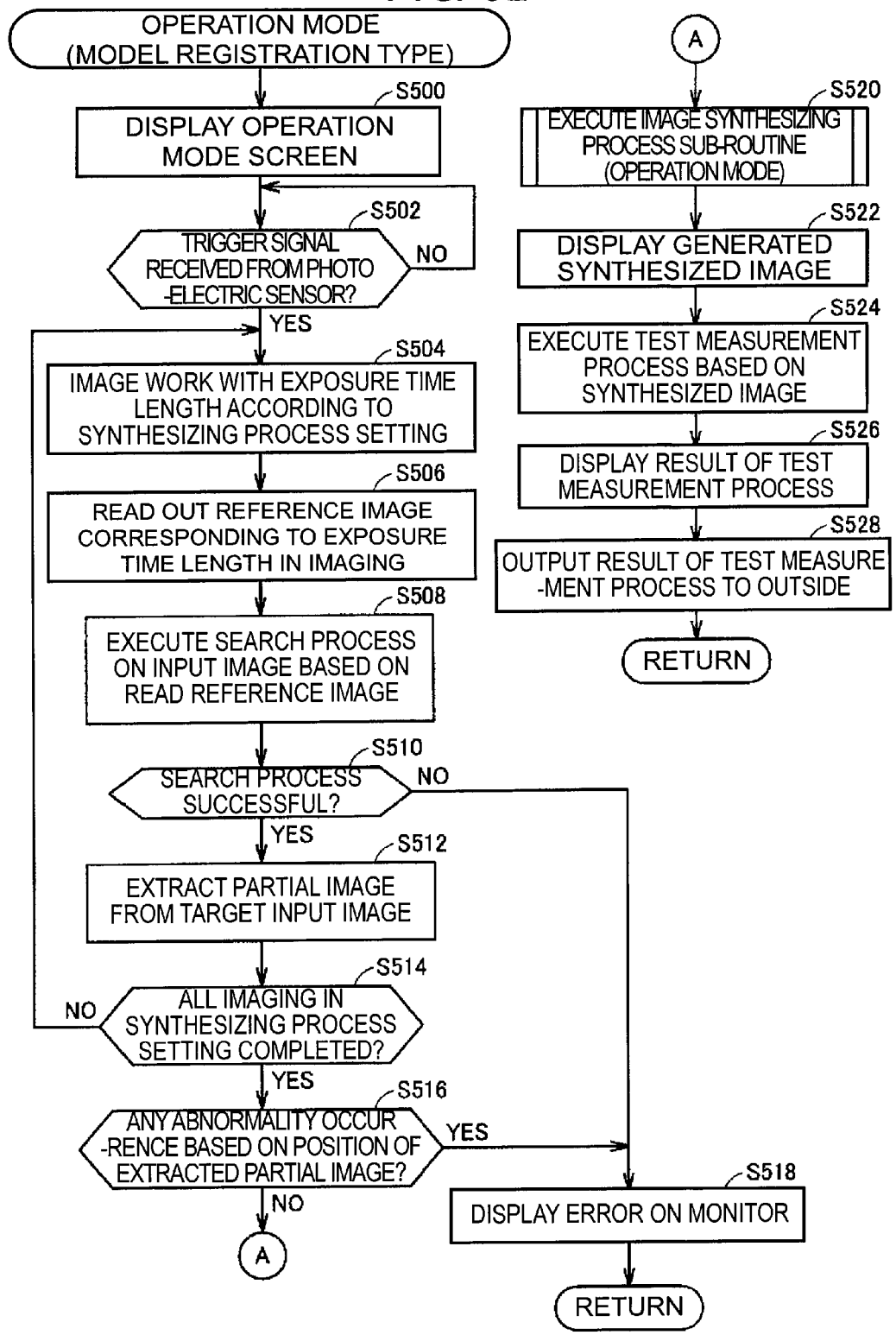
FIG. 32 is a flowchart showing a process in the "operation mode" (model registration type) in the image processing device according to the embodiment of the present invention.

If the command to switch modes is provided (YES in step S100), the CPU 105 transitions to the "operation mode" (model registration type) (step S112). The process shown in FIG. 32 is then executed.

(Synthesizing Process Setting Sub-Routine)

Figure 29:
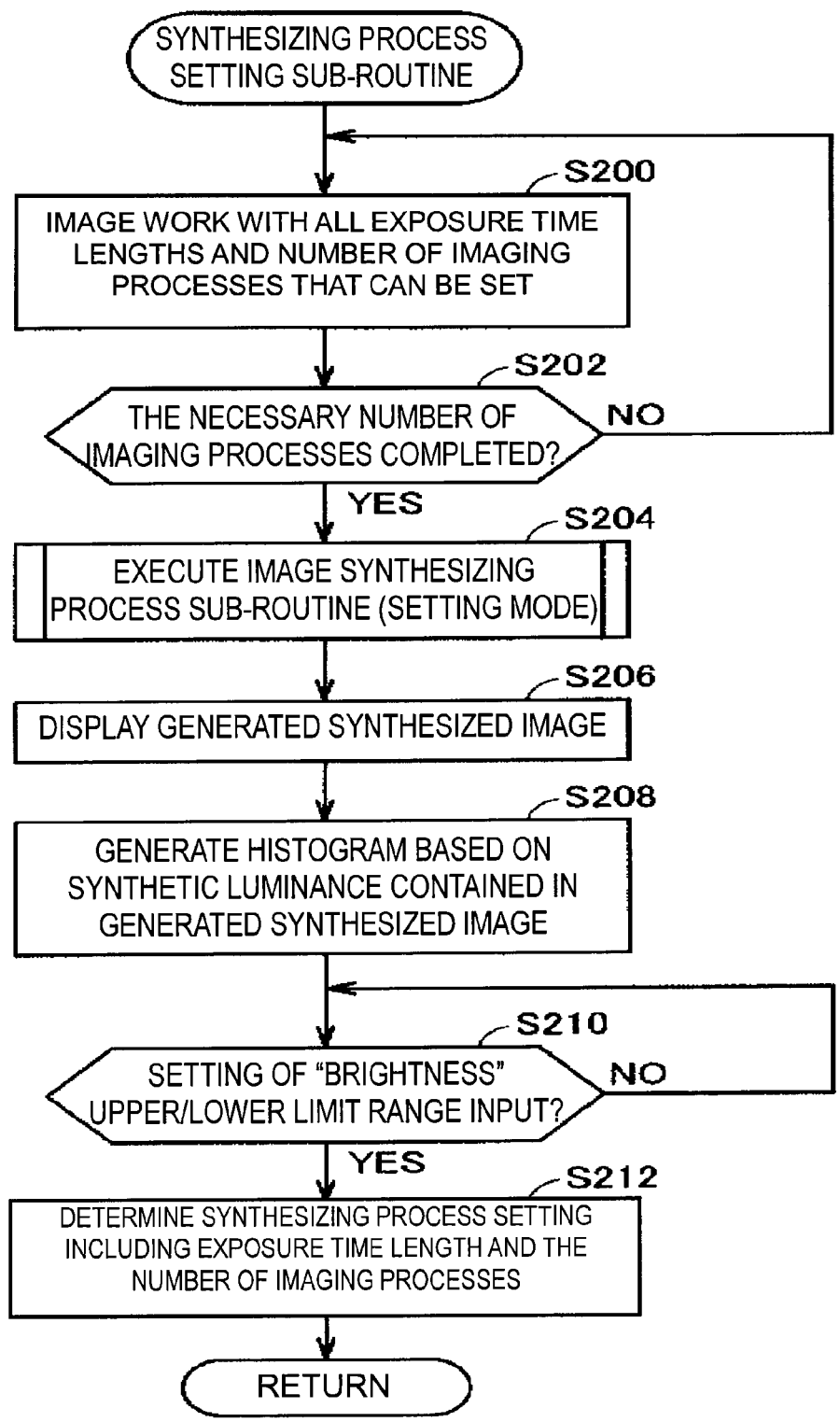
FIG. 29 is a flowchart showing a process in the synthesizing process setting sub-routine shown in FIG. 28.

FIG. 29 is a flowchart showing a process in the synthesizing process setting sub-routine shown in FIG. 28. The flowchart shown in FIG. 29 is implemented when the CPU 105 reads out the program preliminarily stored in the fixed disk 107 and the like to the memory 106, and executes the program.

With reference to FIG. 29, the CPU 105 images the work 2 with all the exposure time lengths and the number of imaging processes that can be set to the imaging unit 8 (step S200). The CPU 105 determines whether or not the necessary number of imaging processes is completed (step S202). If the necessary number of imaging processes is not completed (NO in step S202), the CPU 105 repeats the process of step S200.

If the necessary number of imaging processes is completed (YES in step S202), the CPU 105 executes the image synthesizing process sub-routine (setting mode) (step S204). The synthesized image is generated from a plurality of input images acquired by imaging through execution of the image synthesizing process sub-routine (setting mode). The CPU 105 then displays the generated synthesized image on the monitor 102 and the like (step S206).

Thereafter, the CPU 105 generates a histogram based on the synthetic luminance Ei contained in the generated synthesized image (step S208).

The CPU 105 then determines whether or not the setting of the "brightness" upper/lower limit range is input by the user (step S210). If the setting of the "brightness" upper/lower limit range is not input (NO in step S210), the CPU 105 waits until being input.

If the setting of the "brightness" upper/lower limit range is input (YES in step S210), the CPU 105 determines the synthesizing process setting including the exposure time length and the number of imaging processes by the imaging unit 8 so as to cover the input "brightness" upper/lower limit range (step S212). The process then returns to the main flow of FIG. 28.

(Image Synthesizing Process Sub-Routine (Setting Mode))

Figure 30:
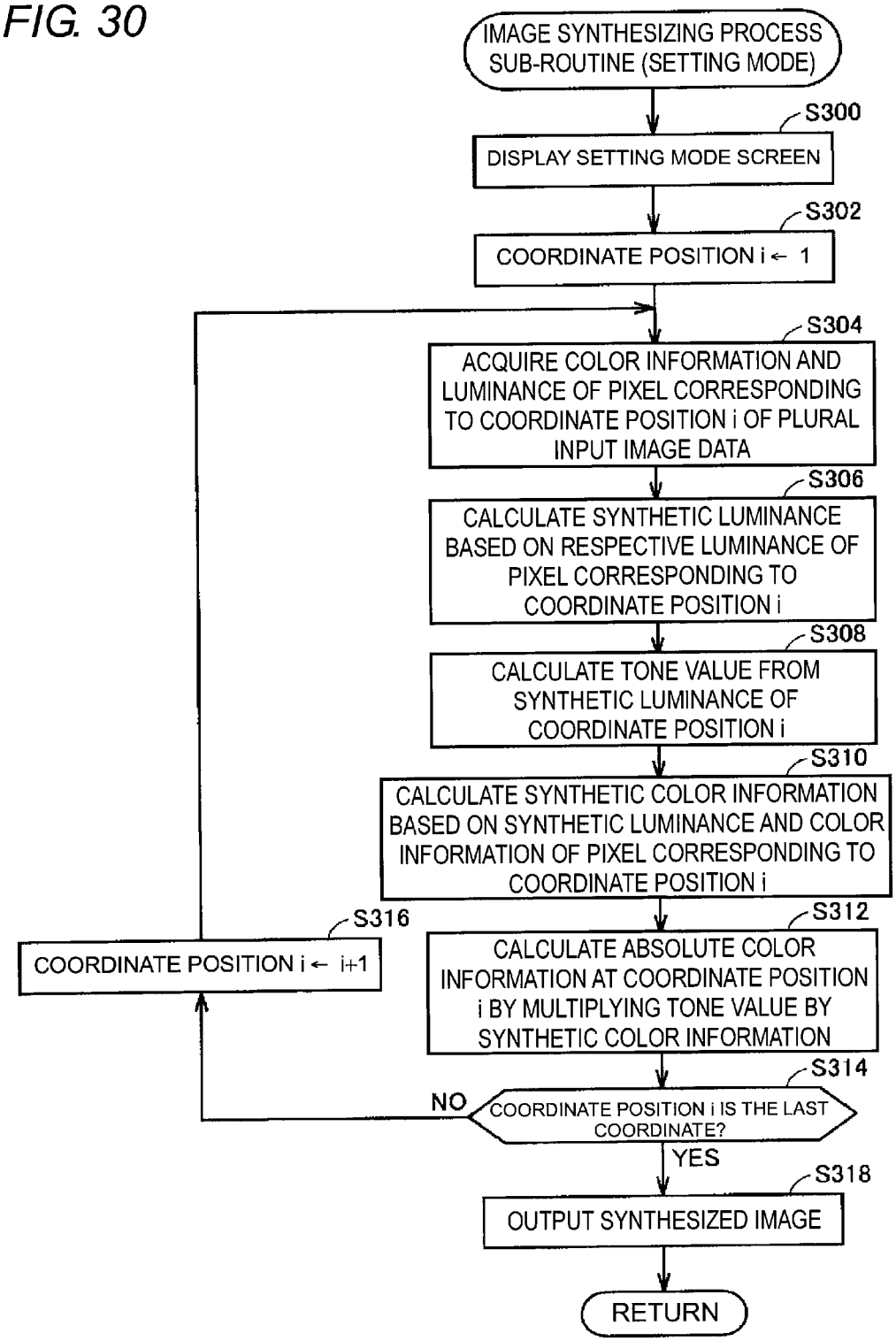
FIG. 30 is a flowchart showing a process in the image synthesizing process sub-routine (setting mode) shown in FIG. 29.

FIG. 30 is a flowchart showing a process in the image synthesizing process sub-routine (setting mode) in FIG. 29. The flowchart shown in FIG. 30 is implemented when the CPU 105 reads out the program preliminarily stored in the fixed disk 107 and the like to the memory 106, and executes the program.

With reference to FIG. 30, the CPU 105 displays the setting mode screen 400 shown in FIG. 13 (step S300). The CPU 105 then sets a coordinate position i to an initial value (o=1) (step S302), and acquires the color information and the luminance of the respective pixels corresponding to the coordinate position i of the plurality of imaged input images (step S304).

The CPU 105 then calculates the synthetic luminance Ei of the coordinate position i based on the luminance of the respective pixels corresponding to the coordinate position i of the plurality of input images (step S306), and calculates the tone value Yi from the synthetic luminance Ei based on the user set "brightness" upper/lower limit range (step S308).

Similarly, the CPU 105 calculates the synthetic color information (ri, gi, bi) at the coordinate position i based on the luminance and the color information of the respective pixels corresponding to the coordinate position i of the plurality of input images (step S310).

The processes of steps S306 and S308 may be executed in parallel to the process of step S310.

Further, the CPU 105 calculates the absolute color information (Ri, Gi, Bi) at the coordinate of the coordinate position i of the synthesized image by multiplying the calculated tone value Yi to the synthetic color information (ri, gi, bi) at the coordinate position i (step S312).

The CPU 105 determines whether or not the coordinate position i is the last coordinate contained in the input image (step S314). If the coordinate position i is not the last coordinate contained in the input image (NO in step S314), the CPU 105 adds "1" to the current coordinate position i (step S316), and repeats the processes after step S304.

If the coordinate position i is the last coordinate contained in the input image (YES in step S314), the CPU 105 outputs the synthesized image including the absolute color information (Ri, Gi, Bi) at each coordinate position (step S318). The process then returns.

(Movement Follow-Up Setting Sub-Routine)

Figure 31:
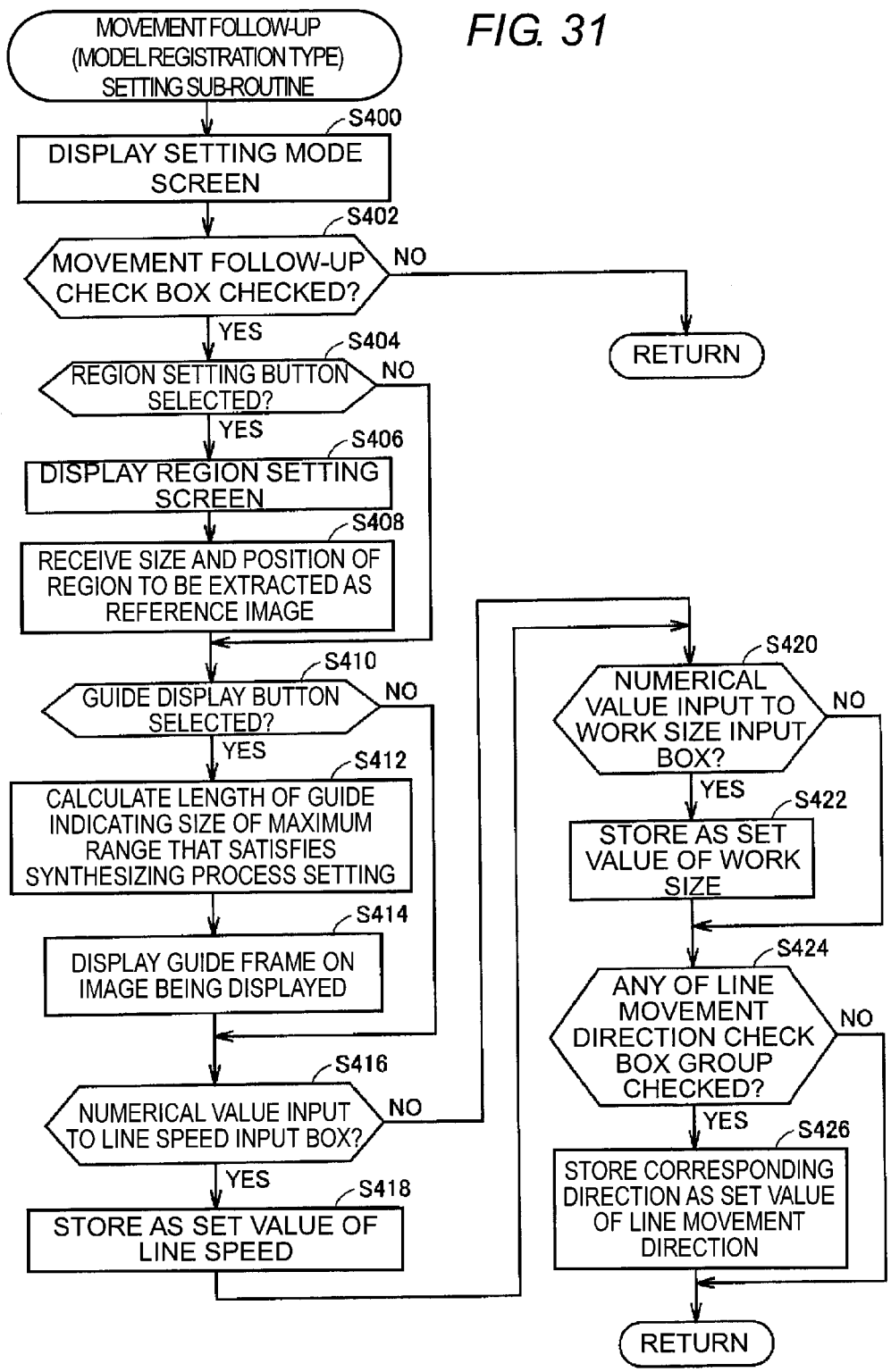
FIG. 31 is a flowchart showing a process in the movement follow-up setting sub-routine (model registration type) shown in FIG. 28.

FIG. 31 is a flowchart showing a process in the movement follow-up setting (model registration type) sub-routine shown in FIG. 28. The flowchart shown in FIG. 31 is implemented when the CPU 105 reads out the program preliminarily stored in the fixed disk 107 and the like to the memory 106 and executes the program.

With reference to FIG. 31, the CPU 105 displays the setting mode screen 402 shown in FIG. 14 (step S400). The CPU 105 then determines whether or not the movement follow-up check box 451 is checked (step S402). If the movement follow-up check box 451 is not checked (NO in step S402), the process returns to the main flow of FIG. 28.

If the movement follow-up check box 451 is checked (YES in step S402), the CPU 105 determines whether or not the region setting button 453 is selected (step S404). If the region setting button 453 is selected (YES in step S404), the CPU 105 displays the region setting screen 404 shown in FIG. 15 (step S406). The CPU 105 receives the size and the position of the region 416 to be extracted as the reference image REF (step S408).

If the region setting button 453 is not selected (NO in step S404), or after step S408 is executed, the CPU 105 determines whether or not the guide display button 454 is selected (step S410). If the guide display button 454 is selected (YES in step S410), the CPU 105 calculates the length of the guide that indicates the size of the maximum range that can satisfy the synthesizing process setting based on the imaging time length in the synthesizing process setting determined in step S212 shown in FIG. 29, and the values of the line speed, the actual dimension of the region, and the movement direction input by the user (step S412). The CPU 105 also displays the guide frame 419 on the image being displayed according to the calculated guide length (step S414).

If the guide display button 454 is not selected (NO in step S410), or after step S414 is executed, the CPU 105 determines whether or not a numerical value is input to the line speed input box 457 (step S416). If a numerical value is input to the line speed input box 457 (YES in step S416), the CPU 105 verifies the validity of the input numerical value, and then stores the same as a set value of the line speed (step S418).

If a numerical value is not input to the line speed input box 457 (NO in step S416), or after step S418 is executed, the CPU 105 determines whether or not a numerical value is input to the work size input box 458 (step S420). If a numerical value is input to the work size input box 458 (YES in step S420), the CPU 105 verifies the validity of the input numerical value, and then stores the same as a set value of the work size (step S422).

If a numerical value is not input to the work size input box 458 (NO in step S420), or after step S422 is executed, the CPU 105 determines whether or not one of the line movement direction check box group 459 is checked (step S424). If one of the line movement direction check box group 459 is checked (Yes in step S424), the CPU 105 stores the direction corresponding to the checked check box as a set value of the line movement direction (step S426).

If none of the line movement direction check box group 459 is checked (NO in step S424), or after step S426 is executed, the process returns to the main flow of FIG. 28.

(Operation Mode)

FIG. 32 is a flowchart showing a process in the "operation mode" (model registration type) in the image processing device according to the embodiment of the present invention. The flowchart shown in FIG. 32 is implemented when the CPU 105 reads out the program preliminarily stored in the fixed disk 107 and the like to the memory 106 and executes the program.

With reference to FIG. 32, the CPU 105 displays the operation mode screen 300 shown in FIG. 17 (step S500). The CPU 105 determines whether or not a trigger signal is received from the photoelectric sensor (step S502). In other words, whether or not the target work 2 arrived in the view of the imaging unit 8 is determined. If the trigger signal is not received from the photoelectric sensor (NO in step S502), the process of step S502 is repeated.

If the trigger signal is received from the photoelectric sensor (YES in step S502), the CPU 105 images the work 2 with the exposure time length according to the synthesizing process setting determined in step S212 shown in FIG. 29 (step S504). The CPU 105 then reads out the reference image corresponding to the exposure time length in imaging (step S506), and performs the search process on the input image based on the readout reference image (step S508).

The CPU 105 also determines whether or not the search process is successful (step S510). If the search process is not successful (NO in step S510), the subsequent processes are interrupted and the process proceeds to step S518.

If the search process is successful (YES in step S510), the CPU 105 extracts the partial image from the target input image based on the position of the reference image specified by the search process (step S512). The CPU 105 also determines whether or not all imaging in the synthesizing process setting is finished (step S514). If all imaging in the synthesizing process setting is not finished (NO in step S514), the processes after step S504 are repeated. As described using FIG. 21, the process of step S504 and the processes of steps S506 to S512 may be executed in parallel.

If all imaging in the synthesizing process setting is finished (YES in step S514), the presence of abnormality occurrence is determined based on the position of the respective extracted partial image (step S516). If determined that abnormality occurrence is present (YES in step S516), the CPU 105 displays an error on the monitor 102 (step S518). The process then returns to the main flow of FIG. 28.

If determined that abnormality occurrence is not present (NO in step S516), the CPU 105 executes the image synthesizing process sub-routine (operation mode) (step S520). With the execution of the image synthesizing process sub-routine (operation mode), the synthesized image based on a plurality of partial images extracted from a plurality of input images is generated. The CPU 105 also displays the generated synthesized image on the monitor 102 (step S522).

The CPU 105 thereafter executes the test measurement process based on the generated synthesized image (step S524). Examples of the test measurement process include the search process for searching the portion that matches the pre-registered image pattern, and the edge scan process of detecting the edge of the work and measuring the distance between the edges.

Lastly, the CPU 105 displays the result of the test measurement process on the monitor 102 and the like (step S526), and also outputs the result to the external device such as the PLC (step S528). The process then returns to the main flow of FIG. 28.

(Image Synthesizing Process Sub-Routine (Operation Mode))

Figure 33:
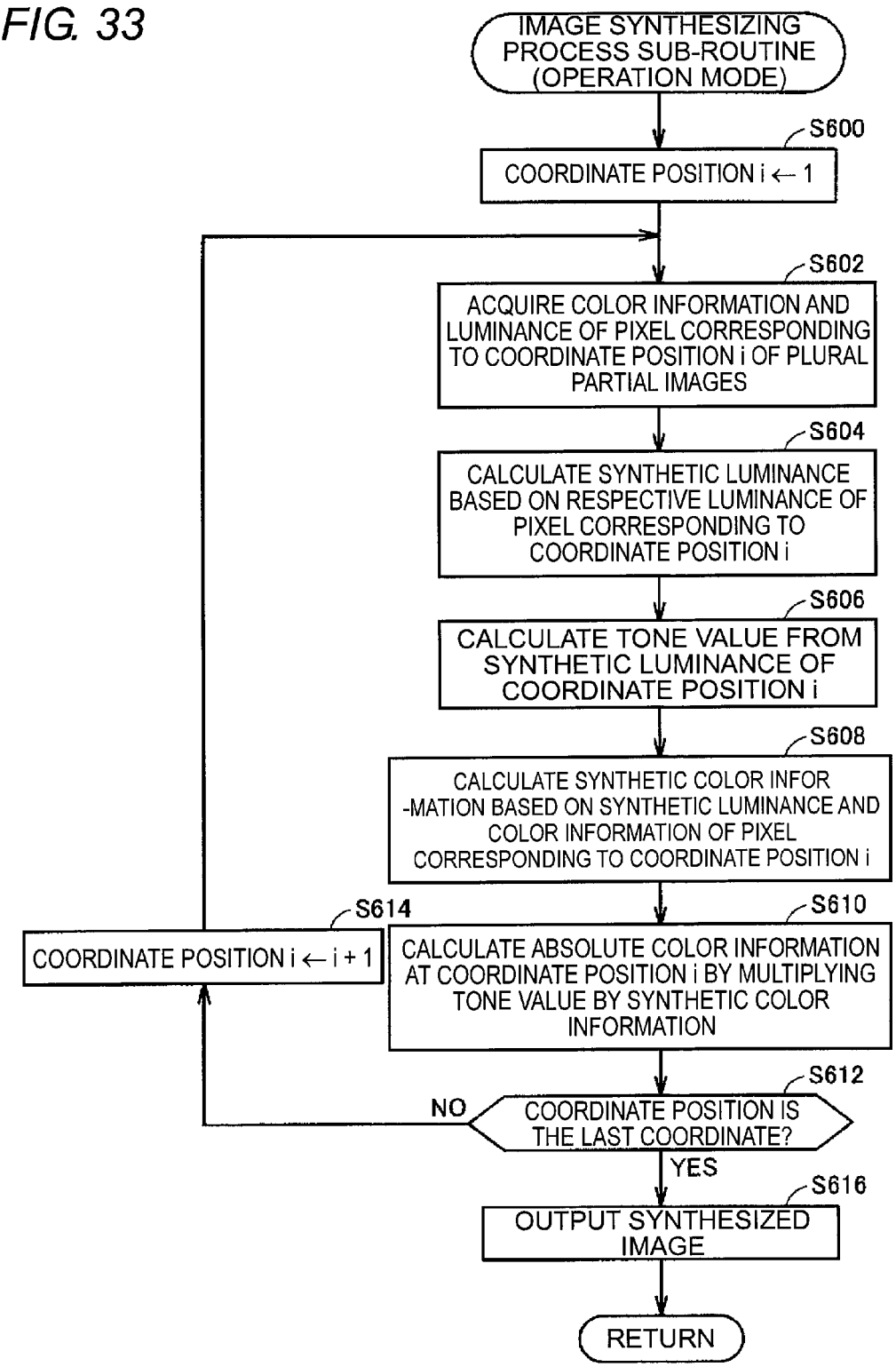
FIG. 33 is a flowchart showing a process in the image synthesizing process sub-routine (operation mode) shown in FIG. 32.

FIG. 33 is a flowchart showing a process in the image synthesizing process sub-routine (operation mode) shown in FIG. 32. The flowchart shown in FIG. 33 is implemented when the CPU 105 reads out the program preliminarily stored in the fixed disk 107 or the like to the memory 106 and executes the program.

With reference to FIG. 33, the CPU 105 sets the coordinate position i to an initial value (i=1) (step S600), and acquires the color information and the luminance of each pixel corresponding to the coordinate position i of a plurality of imaged partial images (step S602).

Thereafter, the CPU 105 calculates the synthetic luminance Ei at the coordinate position i based on each of the luminance of the pixels corresponding to the coordinate position i of a plurality of partial images (step S604), and also calculates the tone value Yi from the synthetic luminance Ei based on the user set "brightness" upper/lower limit range (step S606).

Similarly, the CPU 105 calculates the synthetic color information (ri, gi, bi) at the coordinate position i based on the luminance and the color information of the respective pixels corresponding to the coordinate position i of a plurality of partial images (step S608).

The CPU 105 then calculates the absolute color information (Ri, Gi, Bi) at the coordinate of the coordinate position i of the synthesized image by multiplying the calculated tone value Yi to the synthetic color information (ri, gi, bi) at the coordinate position i (step S610).

The CPU 105 determines whether or not the coordinate position i is the last coordinate contained in the partial image (step S612). If the coordinate position i is not the last coordinate contained in the partial images (NO in step S612), the CPU 105 adds "1" to the current coordinate position i (step S614), and repeats the processes after step S602.

If the coordinate position i is the last coordinate contained in the partial images (YES in step S612), the CPU 105 outputs the synthesized image containing the absolute color information (Ri, Gi, Bi) at each coordinate position (step S616). The process then returns.

E11. Effects of Adopting Movement Follow-Up Process (Model Registration Type)

According to the embodiment of the present invention, when generating the synthesized image with enlarged dynamic ranges acquired by imaging the work or the measuring article a plurality of times, the region corresponding to the movement of the work is extracted from the respectively acquired input image, and the synthesized image is generated. Thus, the occurrence of the image shift in the generated synthesized image can be suppressed even in a case where the work moves on the conveying line.

According to the embodiment of the present invention, the guide frame is displayed on the image of the reference work and the like imaged by the imaging unit when performing various types of setting including the arrangement position of each portion of the visual sensor system 1 directed towards the movement follow-up process. The guide frame indicates the maximum range that can be output as the synthesized image. The size of the partial image used for the generation of the synthesized image, the view of the imaging unit, and the like can be easily and appropriately set even by users with little knowledge by performing such a user friendly display.

According to the embodiment of the present invention, the reference image (or reference information) for performing the movement follow-up process (search process) on the respective input images acquired by imaging the work under a plurality of different exposure conditions is registered for the respective exposure conditions. Between the input images imaged under the respective exposure conditions, the features that appear in each input image also differs, and thus a more efficient search process can be performed by registering the reference information for the respective exposure condition according to the present embodiment.

The registration of the reference image (or reference information) for the respective exposure condition is completed by specifying the region to be the reference image only once on the input image acquired by having the user image the reference work, and thus the burden is not imposed on the user.

E12. First Variant of Movement Follow-Up Process (Model Registration Type)

In the image processing device according to the embodiment described above, a configuration of pre-registering the image acquired by imaging the reference work as the reference image REF has been described. The characteristic information of the reference work may be registered in place of such a reference image itself, or in addition to the reference image. The time length required for the search process can be further reduced by performing the search process based on such characteristic information.

Figure 34:
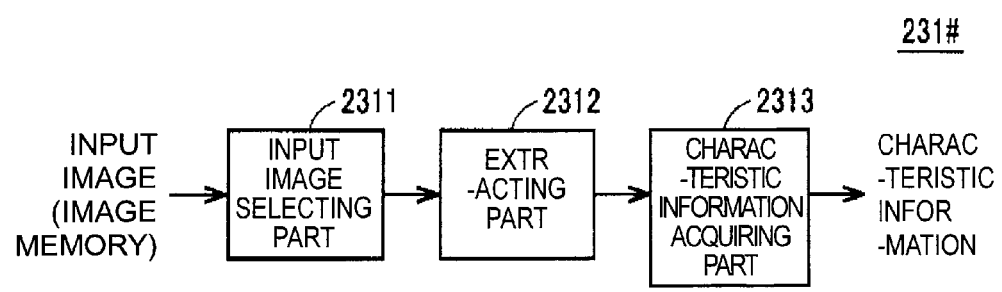
FIG. 34 is a functional block diagram showing a more detailed control structure of a reference image registering portion corresponding to a first variant of the movement follow-up process (model registration type) according to the embodiment of the present invention.

FIG. 34 is a functional block diagram showing a more detailed control structure of a reference image registering portion 231# corresponding to a first variant of the movement follow-up process (model registration type) according to the embodiment of the present invention. The reference image registering portion 231# corresponds to the reference image registering portion 231 shown in FIG. 18.

With reference to FIG. 34, the reference image registering portion 231# includes an input image selecting part 2311, an extracting part 2312, and a characteristic information acquiring part 2313.

The input image selecting part 2311 selectively reads out the input image IMG3 acquired by imaging the reference work stored in the image memories 204a to 204h, and outputs the same to the extracting part 2312. The extraction unit 2312 extracts the region (correspond to region 416 of FIG. 16) to be extracted as the reference image REF specified by the user from the input image IMG3 received from the input image selecting part 2311. The extracting part 2312 outputs the image of the extracted region to the characteristic information acquiring part 2313.

The characteristic information acquiring part 2313 acquires the characteristic information to be used in the search process from the image received from the extracting part 2312. The characteristic information includes edge pattern, edge position, and the like. The characteristic information acquiring part 2313 stores the acquired characteristic information in correspondence with the corresponding exposure condition.

In the operation mode, the characteristic information stored in correspondence with the exposure condition is read out, and the search process is executed based on the read characteristic information.

Other structures and control structures are similar to the above-described embodiment, and thus the detailed description will not be repeated.

In the above-described embodiment, a configuration of having the user se the region to be extracted as the reference image REF of the input image acquired by imaging the reference work has been described, but the extraction of the reference image REF itself may be automatically carried out based on the characteristic information and the like, similar to the first variant.

According to the first variant, the search process can be performed more efficiently in a short period of time.

E13. Second Variant of Movement Follow-Up Process (Model Registration Type)

In the above-described embodiment, a case where the size of the region to be registered as the reference image REF of the input image IMG3 acquired by imaging the reference work is the same as the size of the partial image IMG2 used in the image synthesizing process has been described. However, the size and the position of the reference image REF used in the search process and the size and the position of the synthesized image to be actually output may not necessarily match.

For instance, considering a case of performing a scratch test of the work surface and the like, the portion to be tested may be a matte mirror surface. In such a case, the search process based on the reference image of the portion to be tested may not be satisfactorily executed. Thus, it is sometimes preferably to register patterns and the like given to other portions that are not the test target as the reference image, and then perform the movement follow-up process.

Therefore, a configuration in which the region to be extracted as the reference image REF from the input image IMG3 acquired by imaging the reference work and the size of the partial image IMG2 extracted from the input image IMG1 to generate the synthesized image can be independently set will be described.

Figure 35:
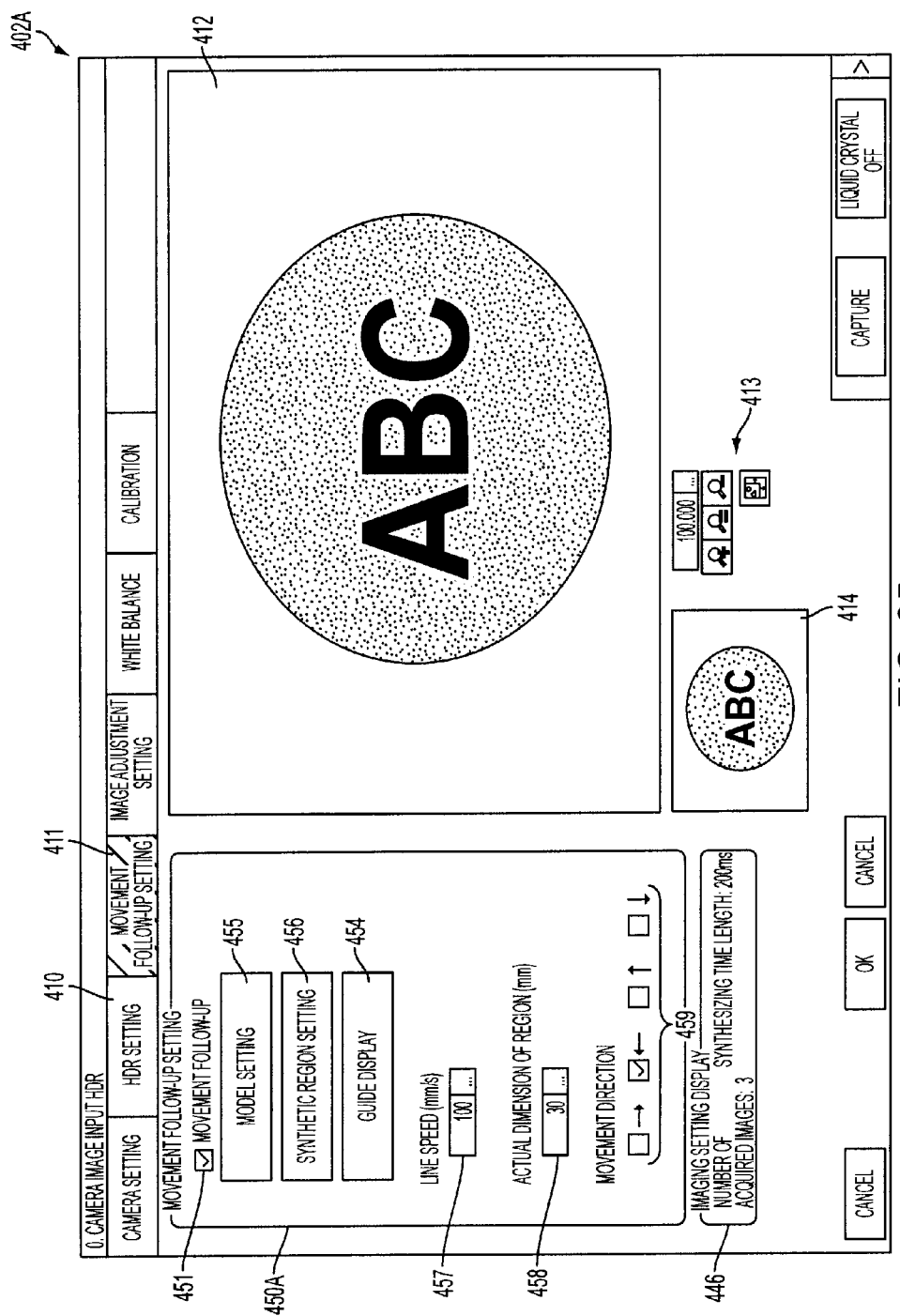
FIG. 35 is a diagram showing a setting mode screen for performing setting according to a second variant of the movement follow-up process (model registration type) according to the embodiment of the present invention.

FIG. 35 is a diagram showing a setting mode screen 402A for performing the setting according to a second variant of the movement follow-up process (model registration type) according to the embodiment of the present invention.

The setting mode screen 402A shown in FIG. 35 is equivalent to that in which a movement follow-up setting input area 450A is displayed in place of the movement follow-up setting input area 450 in the setting mode screen 402 shown in FIG. 14. The movement follow-up setting input area 450A includes a model setting button 455 and a synthesizing region setting button 456 in place of the region setting button 453 in the movement follow-up input area 450. The array of other buttons and the like are similar to the setting mode screen 402 shown in FIG. 14, and thus the detailed description will not be repeated.

Figure 36:
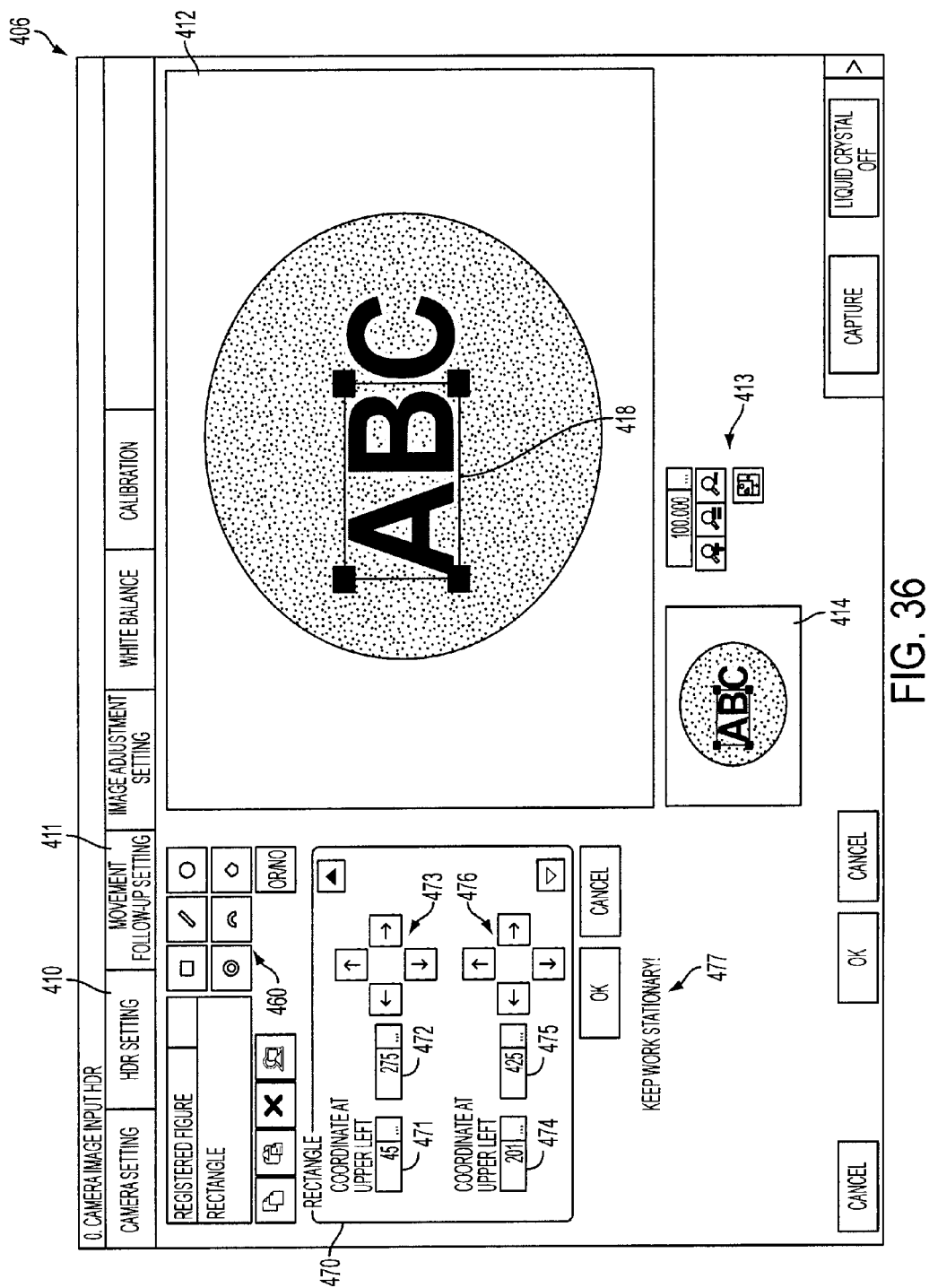
FIG. 36 is a diagram showing a region setting screen according to the second variant of the movement follow-up process (model registration type) according to the embodiment of the present invention.

The model setting button 455 accepts the setting of the region to be extracted as the reference image REF from the input image IMG3 acquired by imaging the reference work. More specifically, when the model setting button 455 is selected, the region setting screen 406 shown in FIG. 36 is displayed. In the region setting screen 406, the user sets the region 418 to be extracted as the reference image REF from the input image IMG3 acquired by imaging the reference work according to the procedures similar to the region setting screen 404 shown in FIG. 15.

With reference again to FIG. 35, when the synthesizing region setting button 456 is selected, the setting mode screen 402 similar to FIG. 15 is displayed, and the user sets the size of the partial image IMG2 extracted from the input image IMG1 to generate the synthesized image.

Furthermore, when the respective regions are set, the relative positional relationship among the regions is also registered. Such relative positional relationship is used to determine which region to extract to generate the synthesized image after the position corresponding to the reference image REF in the input image IMG1 is specified by the search process.

Other structures and control structures are similar to the above-described embodiment, and thus the detailed description thereof will not be repeated.

According to the second variant, tests and measurements on a wide variety of works can be conducted.

F1. Outline of Movement Follow-Up Process (Sequential Extraction Type)

In the movement follow-up process (sequential extraction type) according to the present embodiment, a preset region in a certain input image is extracted as a reference image showing the target work 2 (specific measuring article) with respect to a set of input images acquired by carrying out imaging a plurality of times under a plurality of exposure conditions, and the extracted reference image is searched in the subsequently acquired input images to specific the position of the target work 2 in the subsequent input images. In other words, in the movement follow-up process (sequential extraction type) according to the present embodiment, model extraction and model search are sequentially executed dynamically on the images acquired through sequential imaging by the imaging unit 8.

Figure 37A:
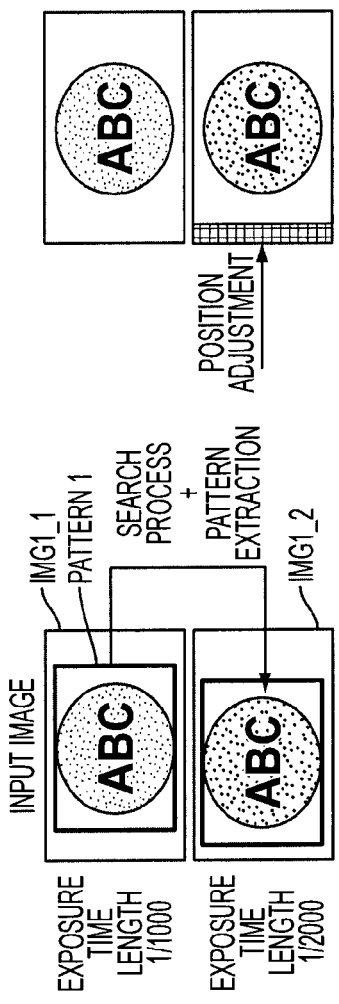
FIGS. 37A and 37B are diagrams for describing the outline of a movement follow-up process (sequential extraction type) according to the embodiment of the present invention.
Figure 37B:
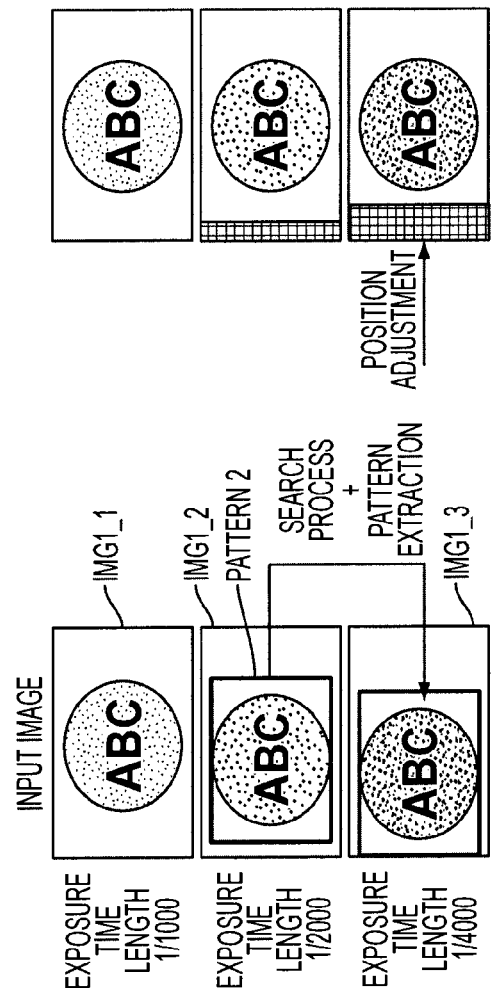

FIGS. 37A and 37B are diagrams for describing the outline of the movement follow-up process (sequential extraction type) according to the embodiment of the present invention. In FIGS. 37A and 37B, a case of generating one synthesized image based on three input images will be described for the sake of simplifying the description. In this example, assume that the images are acquired in the order of input images IMG1_1, IMG1_2, and IMG1_3 through a series of imaging. The input images IMG1_1, IMG1_2, and IMG1_3 have the exposure condition set such that the exposure time length monotonously becomes shorter.

With reference to FIG. 37A, a preset region is extracted as a reference image (pattern 1) with respect to the input image IMG1_1. in other words, the relevant region is set as the reference image showing the target work 2. With the performing of the search process in the input image IMG1_2 using the extracted pattern 1, the position of the target work 2 in the input image IMG1_2 is specified, and a new reference image (pattern 2) is extracted from the input image IMG1_2 according to the position of the specified work 2.

In this case, as a pre-process of the image synthesizing process of post stage, alignment is performed on the subsequent input images with the position of the target work 2 in the input image acquired first as a reference for the set of input images acquired by performing a series of imaging a plurality of times. In other words, the relative positional relationship between the input image IMG1_1 and the input image IMG1_2 is determined according to the position of the target work 2 in the input image IMG1_2. Typically, the positional adjustment (relative to the input image IMG1_1) of the input image IMG1_2 is carried out with the input image IMG1_1 as a reference, as shown in FIG. 37A.

With reference to FIG. 37B, when the subsequent input image IMG1_3 is thereafter acquired, the search process is performed using the model extracted recently (pattern 2 extracted from input image IMG1_2 in this case) on the subsequent input image IMG1_3, so that the position of the target work 2 in the input image IMG1_3 is specified. Similar to the input image IMG1_2, the positional adjustment (relative to the input image IMG1_1) of the input image IMG1_3 is carried out with the input image IMG1_1 as a reference.

Similar process is sequentially executed on the set of input images acquired by a series of imaging.

Since the search process is dynamically repeated on the input images sequentially acquired by the imaging of the imaging unit 8, the reference image (pattern) showing the target work 2 or the characteristic information of the target work 2 does not need to be pre-registered.

In other words, in the movement follow-up process (sequential extraction type), a preset region in the input image acquired first is extracted as a first reference image (pattern) showing the target work 2 in a series of imaging carried out a plurality of times. The range to extract as the reference image (pattern) showing the target work 2 from the input image acquired first is set by the user, as hereinafter described. The position of the target work 2 in the input image acquired second is specified by searching for the first pattern in the input image acquired second. Furthermore, the region corresponding to the position of the first pattern searched in the input image acquired second is extracted as the second pattern showing the target work 2. The position of the target work 2 in the input image acquired third is specified by searching for the second pattern in the input image acquired third.

As described above, the pattern extraction and the search process using the extracted pattern are sequentially executed on the set of input images acquired by a series of imaging. The pattern showing the target work 2 extracted from the input image preliminarily acquired needs to be approximate to the image of the target work 2 contained in the subsequent input image with respect to the parameter used in image processing such as brightness. Thus, in the movement follow-up process (sequential extraction type) according to the present embodiment, the series of imaging is performed so as to reduce the difference amount among the plurality of exposure conditions as much as possible. Typically, for an exposure time length, which is a typical example of the exposure condition, a series of exposure conditions is preferably set so that the exposure time length monotonously decreases as in "$1/1000$ sec.",→"$1/2000$ sec."→"$1/4000$ sec.", as shown in FIGS. 37A and 37B. Alternatively, a series of exposure conditions may be set so that the exposure time length monotonously increases as in "$1/4000$ sec.",→"$1/2000$ sec."→"$1/1000$ sec."

In other words, if the exposure condition is set as in "$1/1000$ sec.",→"$1/4000$ sec."→"$1/2000$ sec.", the "brightness" contained in the image relatively greatly differs between the input image acquired by imaging with the exposure time length of "$1/1000$ sec." and the input image acquired by imaging with the exposure time length of "$1/4000$ sec.". Thus, if search is performed in the input image acquired by imaging with the exposure time length of "$1/4000$ sec." using the pattern extracted from the input image acquired by imaging with the exposure time length of "$1/1000$ sec.", the search accuracy (alignment accuracy between input images) lowers.

Therefore, the series of imaging is preferably performed in the order of the exposure time lengths lined according to the order of the magnitude of the relevant value. The search accuracy (alignment accuracy between input images) can be enhanced by setting the exposure condition in such a manner.

Figure 38:
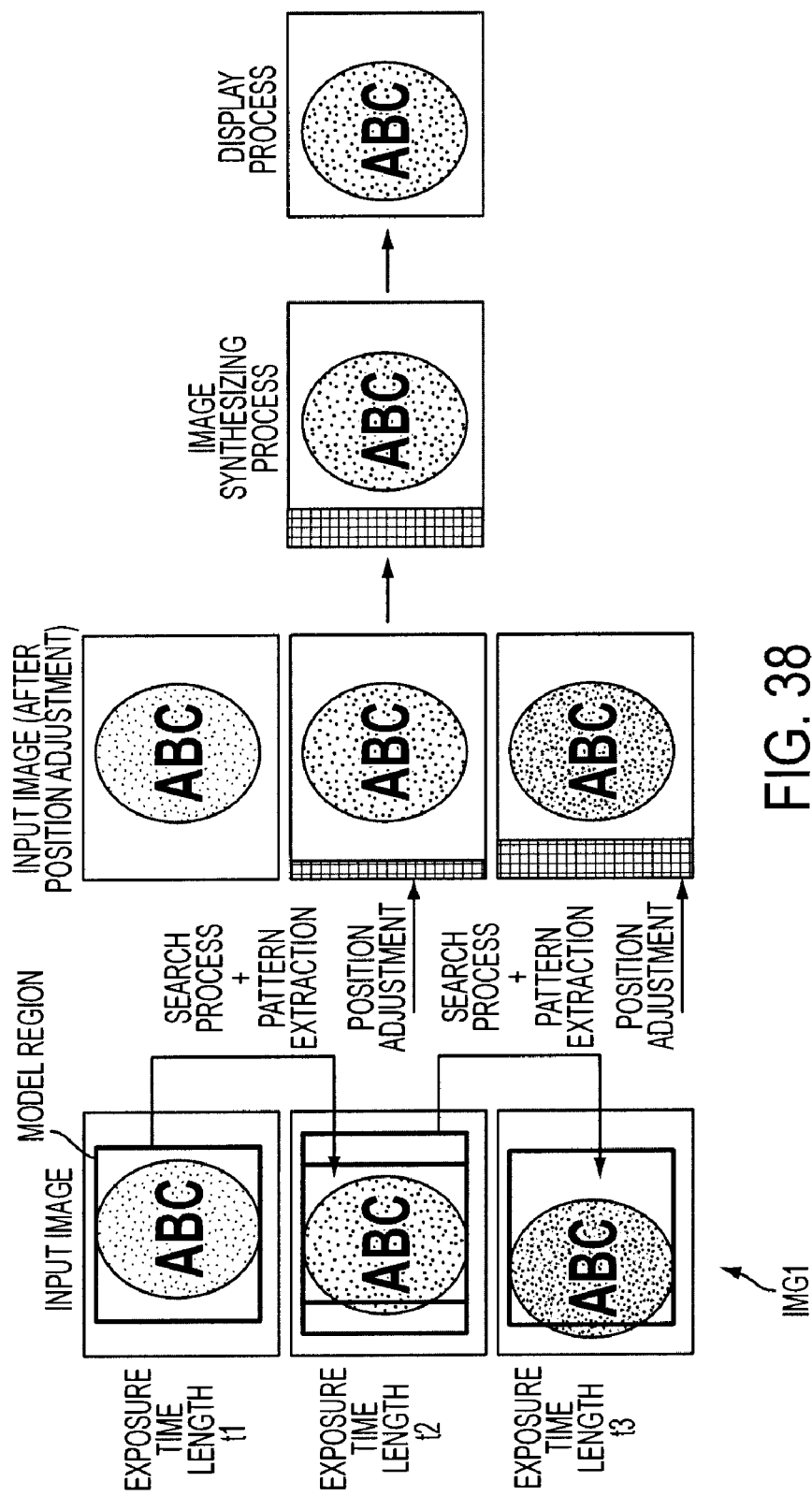
FIG. 38 is a diagram for describing the overall outline of the movement follow-up process (sequential extraction type) according to the embodiment of the present invention.

FIG. 38 is a diagram for describing the overall outline of the movement follow-up process (sequential extraction type) according to the embodiment of the present invention.

With reference to FIG. 38, a model region preset by the user is extracted as a pattern with respect to the input image (first input image) acquired when the imaging unit 8 performs imaging with an exposure time length t1. The search process is executed on the input image (second input image) acquired when the imaging unit 8 performs imaging with an exposure time length t2 using the extracted pattern. According to the result of the search process, a new pattern is extracted from the second input image (update of pattern), and position adjustment with respect to the second input image is performed.

Similarly, a set of input images after the position adjustment is acquired when the search process and the pattern extraction are sequentially executed on a set of input images acquired by a series of imaging.

Thereafter, the image synthesizing process is executed on the set of input images after the position adjustment. Since a relative position adjustment is performed between the input images, a range that cannot be used in the image synthesizing process (black range of FIG. 38) creates, as shown in FIG. 38. In other words, the image (partial image) of the range used in the image synthesizing process is substantially extracted from the set of input images.

Then executed is the display process based on the synthesized image acquired by the image synthesizing process.

F2. Reduction of Image Synthesizing Region in Movement Follow-Up Process (Sequential Extraction Type)

As shown in FIG. 38 described above, the length along the movement direction of the target work with respect to the view range of the imaging unit 8 is reduced to a range defined according to the relationship between the time length required for carrying out a series of imaging a plurality of times and the movement velocity of the work 2. Since position adjustment of the input images is not performed in a direction orthogonal to the movement direction of the work 2, it becomes the target of image synthesizing process.

In the image processing device according to the present embodiment, the function for limiting a region that is the generation target of the synthesized image of the input image to the direction and the region set by the user may be implemented. In other words, the time length required for the image synthesizing process can be reduced by limiting the region that is the generation target of the synthesized image of the input image to the region that can generate the synthesized image including the target work 2. The time length required to generate one synthesized image thus can be reduced, and enhancement of tact time etc. can be realized. The function for reducing such an image synthesizing region will be described below with reference to FIGS. 39 to 42.

Figure 41:
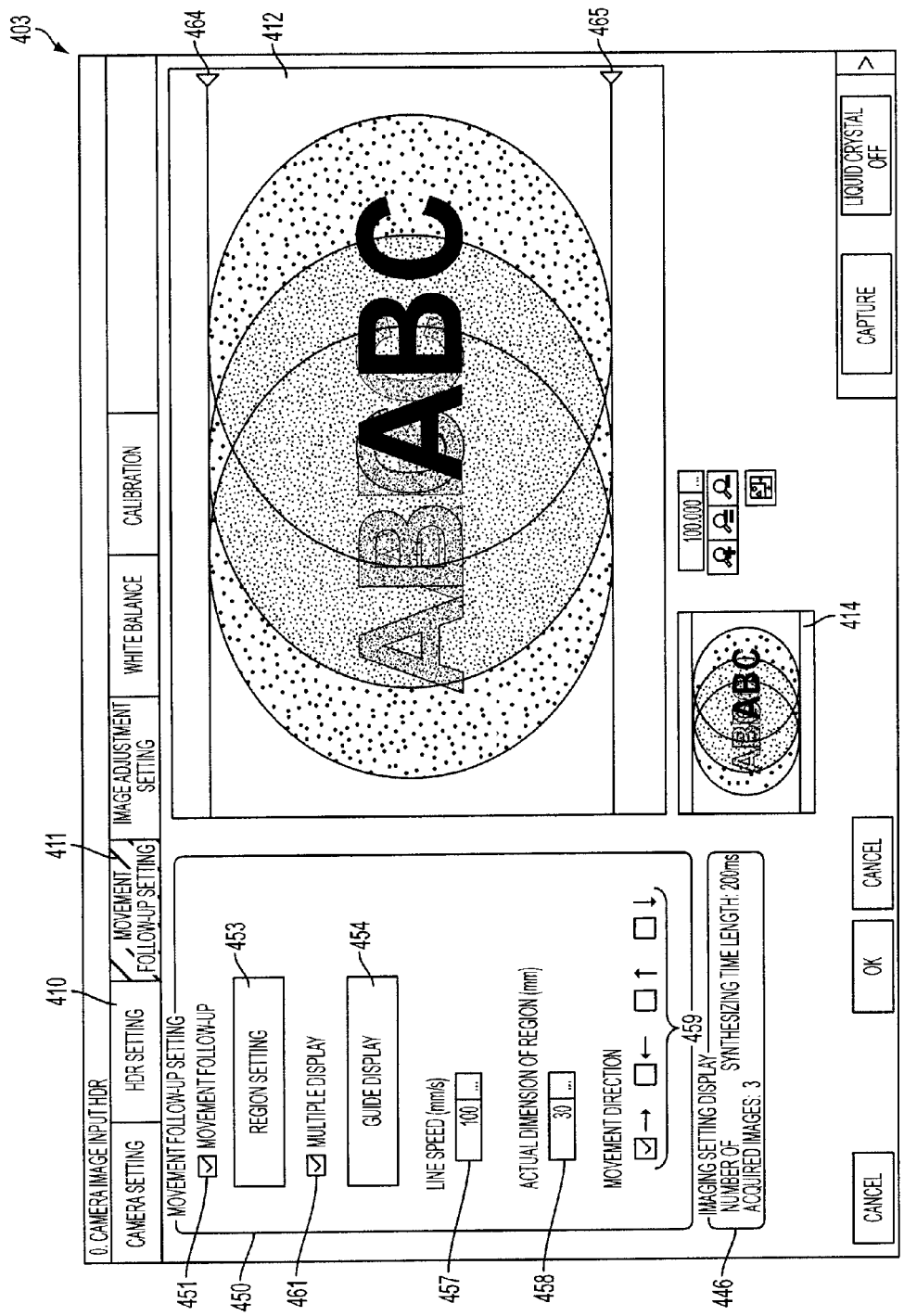
FIG. 41 is a diagram showing a screen display example during setting the image synthesizing region in the movement follow-up process (sequential extraction type) according to the embodiment of the present invention.
Figure 42:
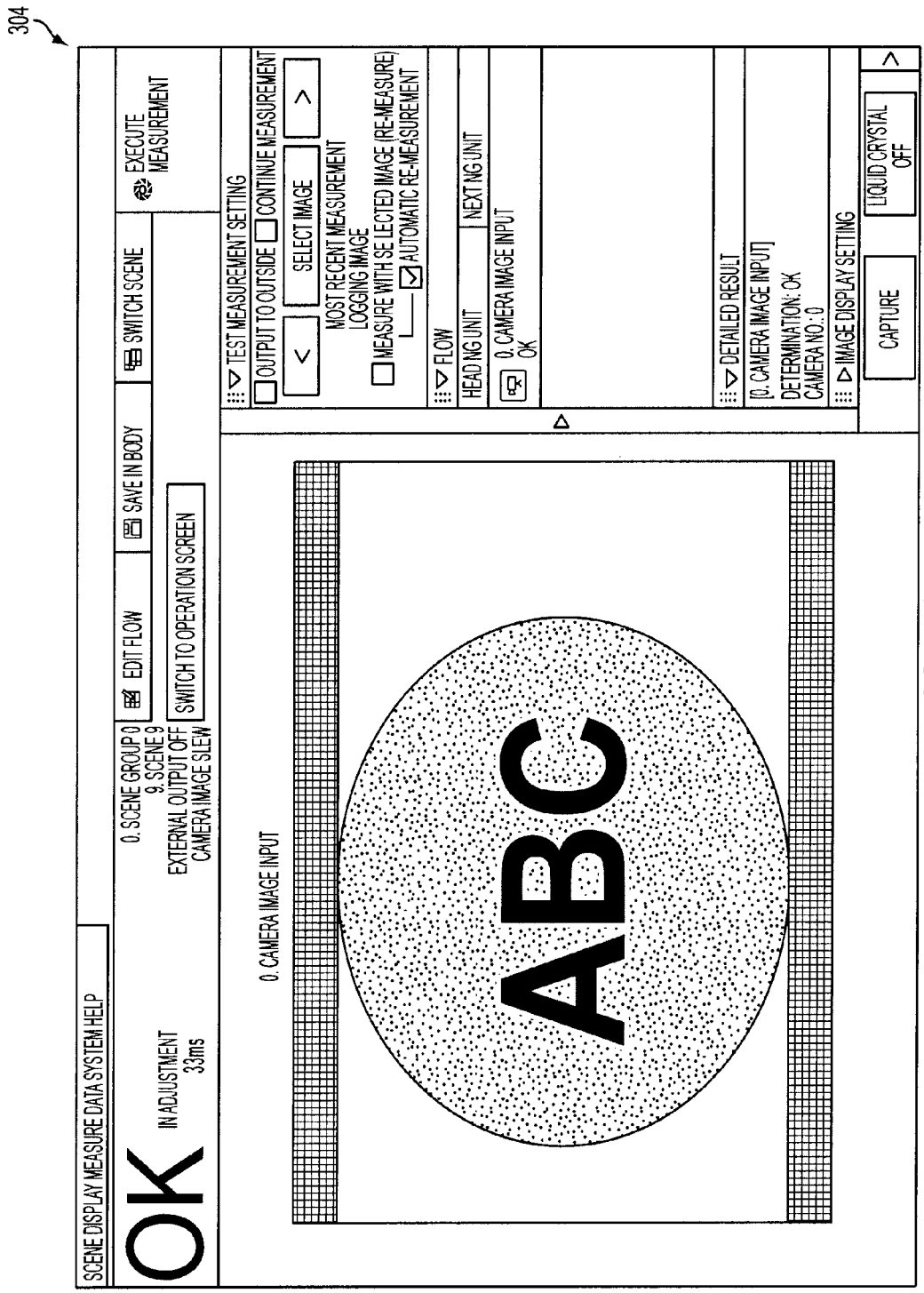
FIG. 42 is a diagram showing a screen display example in the "operation mode" displayed in a case where the image synthesizing region is reduced in the movement follow-up process (sequential extraction type) according to the embodiment of the present invention.

FIGS. 39A, 39B and 40A, 40B are diagrams showing a screen display example providing a reduction process of the image synthesizing region in the movement follow-up process (sequential extraction type) according to the embodiment of the present invention. FIG. 41 is a diagram showing a screen display example during the setting operation of the image synthesizing region in the movement follow-up process (sequential extraction type) according to the embodiment of the present invention. FIG. 42 is a diagram showing a screen display example in the "operation mode" displayed in a case where the image synthesizing region is reduced in the movement follow-up process (sequential extraction type) according to the embodiment of the present invention.

A setting mode screen 403 as shown in FIGS. 39A, 39B and 40A, 40B is provided as an user interface related to the reduction process of the image synthesizing region in the movement follow-up process (sequential extraction type). The setting mode screen 403 corresponds to that in which a multiple display check box 461 is added in the setting mode screen 402 shown in FIG. 14. More specifically, when the multiple display check box 461 is checked, a region adjustment bar is displayed in the image display area 412 in a direction corresponding to the check content in the line movement direction check box group 459. In other words, as a general rule, the region adjustment bar is displayed so that the region can be adjusted along the direction orthogonal to the movement direction of the work 2 set when the user checks the line movement direction check box group 459.

Figure 39A:
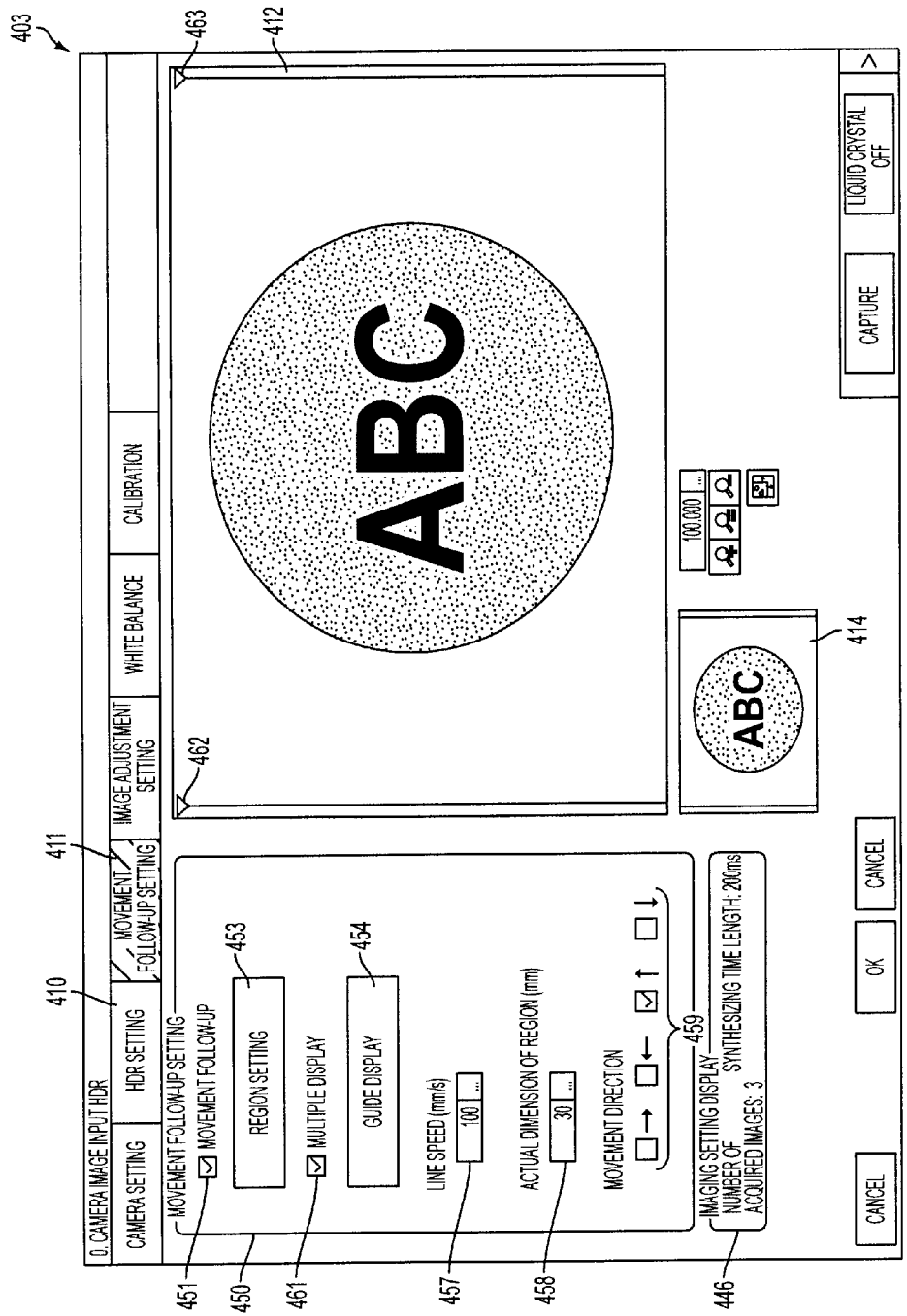
FIGS. 39A and 39B are diagrams showing a screen display example (I) providing a reduction process of an image synthesizing region in the movement follow-up process (sequential extraction type) according to the embodiment of the present invention.
Figure 39B:
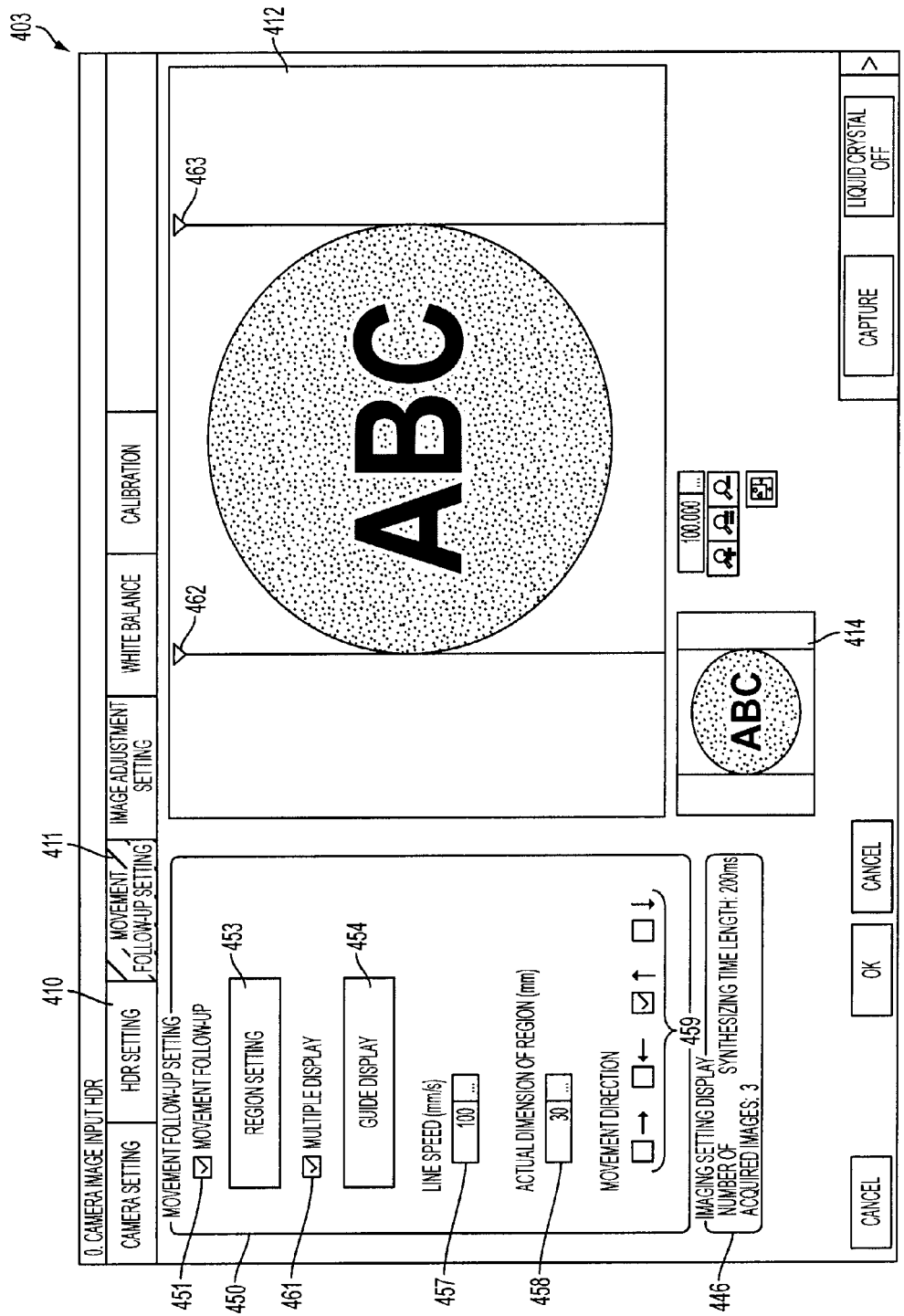

In the example shown in FIG. 39A, movement of the work 2 towards the upper direction in the plane of drawing is set of the four check boxes included in the line movement direction check box group 459, and thus region adjustment bars 462 and 463 are overlay displayed on the image display area 412 to adjust the image synthesizing region in the left and right direction in the plane of drawing. The position of such region adjustment bars 462 and 463 can be changed in the left and right direction in the plane of drawing according to the user operation, and the range surrounded by the region adjustment bar 462 and the region adjustment bar 463 becomes the image synthesizing region. In other words, the user can set the image synthesizing region as shown in FIG. 39B by arbitrarily operating the region adjustment bar 462 and/or the region adjustment bar 463 by mouse operation and the like.

Figure 40A:
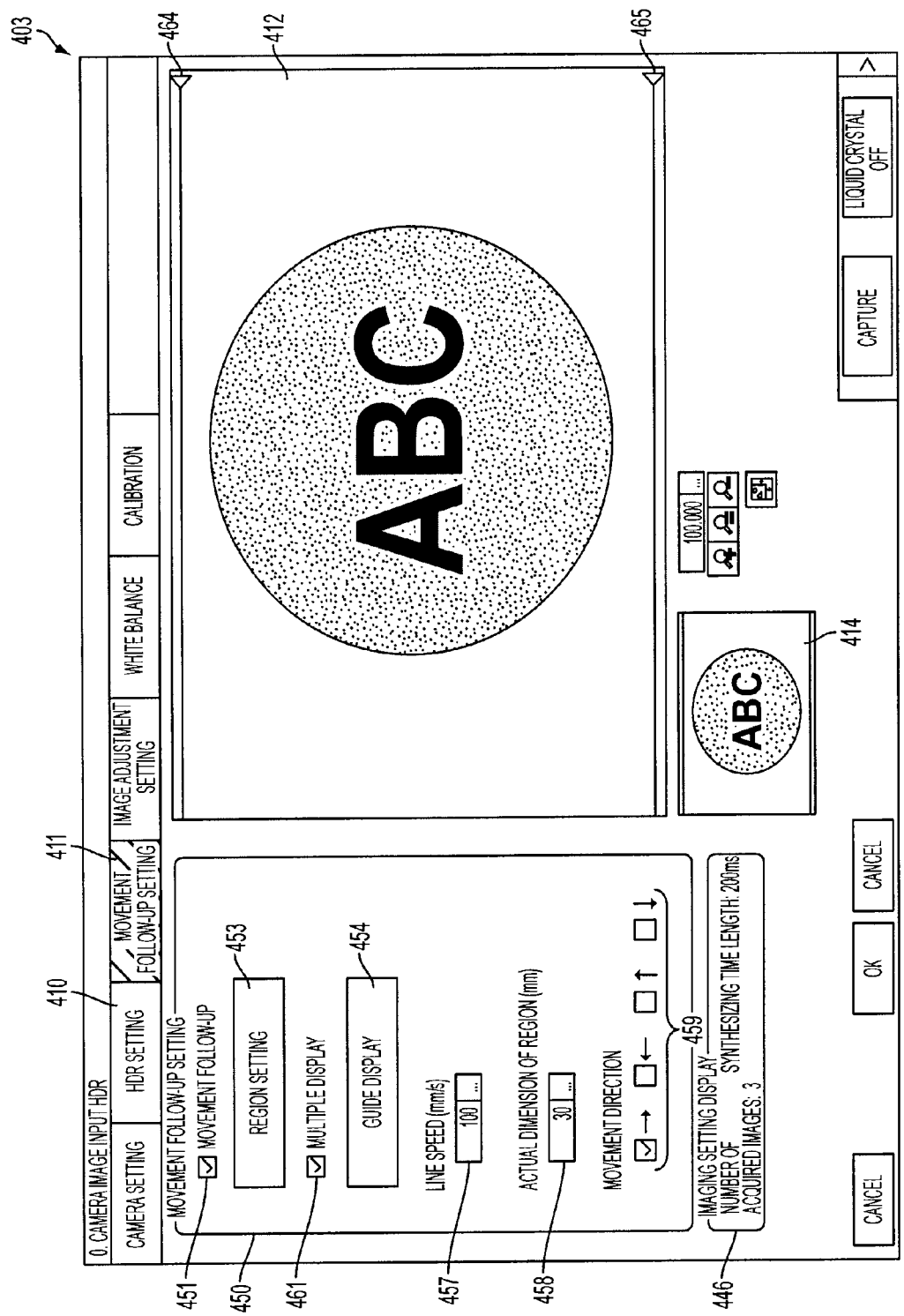
FIGS. 40A and 40B are diagrams showing a screen display example (II) providing the reduction process of the image synthesizing region in the movement follow-up process (sequential extraction type) according to the embodiment of the present invention.
Figure 40B:
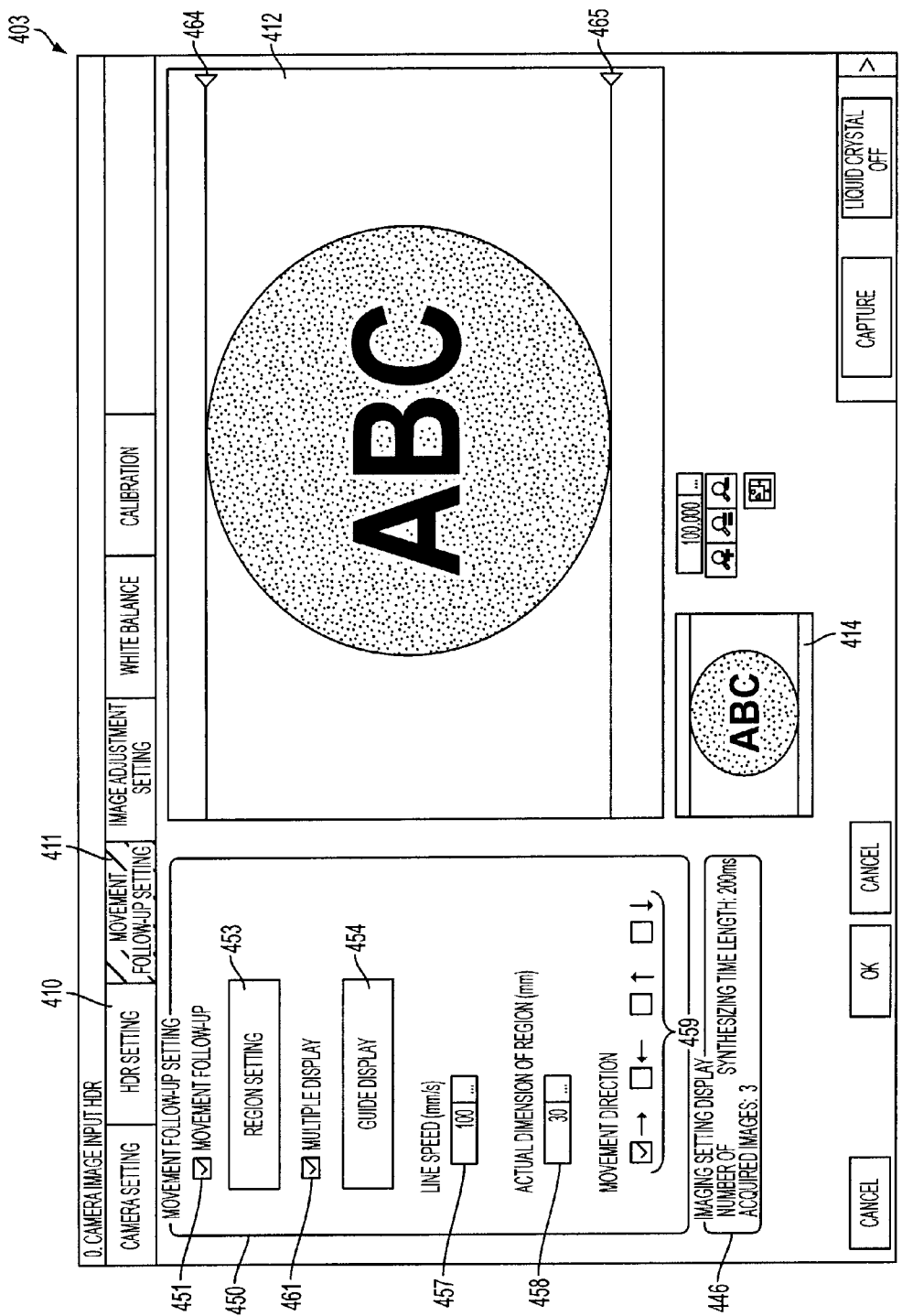

Similarly, in the example shown in FIG. 40A, movement of the work 2 towards the right direction in the plane of drawing is set of the four check boxes included in the line movement direction check box group 459, and thus region adjustment bars 464 and 465 are overlay displayed on the image display area 412 to adjust the image synthesizing region in the up and down direction in the plane of drawing. The position of such region adjustment bars 464 and 465 can be changed in the up and down direction in the plane of drawing according to the user operation, and the range surrounded by the region adjustment bar 464 and the region adjustment bar 465 becomes the image synthesizing region. In other words, the user can set the image synthesizing region as shown in FIG. 40B by arbitrarily operating the region adjustment bar 464 and/or the region adjustment bar 465 by mouse operation and the like.

As shown in FIGS. 39 and 40, after the user sets the image synthesizing region by operating the region adjustment bar, the validity on the work 2 can be evaluated by performing the series of imaging on a trial basis (test run).

In other words, if the multiple display check box 461 is added in the setting mode screen 403 shown in FIG. 39A, 39B or 40A, 40B, the set of input images acquired by the series of imaging can be displayed in a superimposed manner in the image display area 412, as shown in FIG. 41. The user can set the necessary range where the target work 2 is shown as the image synthesizing region by setting the region adjustment bar to an appropriate position with reference to the superimposed display of the input images as shown in FIG. 41.

As apparent from FIG. 41, the distance the work 2 moves in the series of successive imaging fluctuates depending on the movement velocity and/or the imaging interval of the work. Thus, a region including the entire length along the movement direction of the work 2, as shown in FIGS. 39 and 40, is preferably set for the image synthesizing region instead of a rectangular shape set to one part of the input image.

When the image synthesizing region is set in the above manner, the screen shown in FIG. 42 is displayed in the "operation mode". In other words, in the operation mode screen 304 shown in FIG. 42, the synthesized image on the region set by the region adjustment bar is displayed, and other ranges are displayed as invalid regions that are not the target of image synthesizing process. Typically, the region outside the image synthesizing region is displayed in a state painted to black or white preliminarily defined.

The data amount of the image to be the target of image synthesizing process is reduced by reducing the image synthesizing region, and the processing amount (calculation amount) is reduced therewith, and thus the speed of the entire process increases.

In FIGS. 39 to 41, a case where the work 2 moves in one of either the vertical direction in the plane of drawing or the horizontal direction in the plane of drawing has been described, but when moving in a diagonal direction in the plane of drawing, the set of region adjustment bars may be displayed in a direction corresponding to the movement direction of the work 2 by checking two directions (e.g., left direction in plane of drawing and upper direction in plane of direction) showing the movement direction of the work 2 of the four check boxes included in the line movement direction check box group 459.

F3. Model Region Setting in Movement Follow-Up Process (Sequential Extraction Type)

The pattern from the input image acquired first of the series of imaging shown in FIG. 38 is extracted according to a preset model region with respect to the input image. The user setting of such a pattern region is performed using the region setting screen 404 shown in FIG. 15. In this case, if the image synthesizing region is reduced by the function for reducing the image synthesizing region, a range larger than the image synthesizing region does not need to be set for the model region. In other words, since the image synthesizing region is set to a range sufficient to generate the synthesized image on the target work 2, the necessity to set the range greater than the image synthesizing region preset as the model region, that is, as the range where the target work 2 is low in most cases.

The image processing device according to the present embodiment may be mounted with the function for setting the model region in cooperation with the reduction process of the image synthesizing region described above. From the standpoint of the user, the setting of the model region can be more efficiently carried out. The function for setting the model region in cooperation with the image synthesizing region will be described below with reference to FIGS. 43 and 44.

Figure 43A:
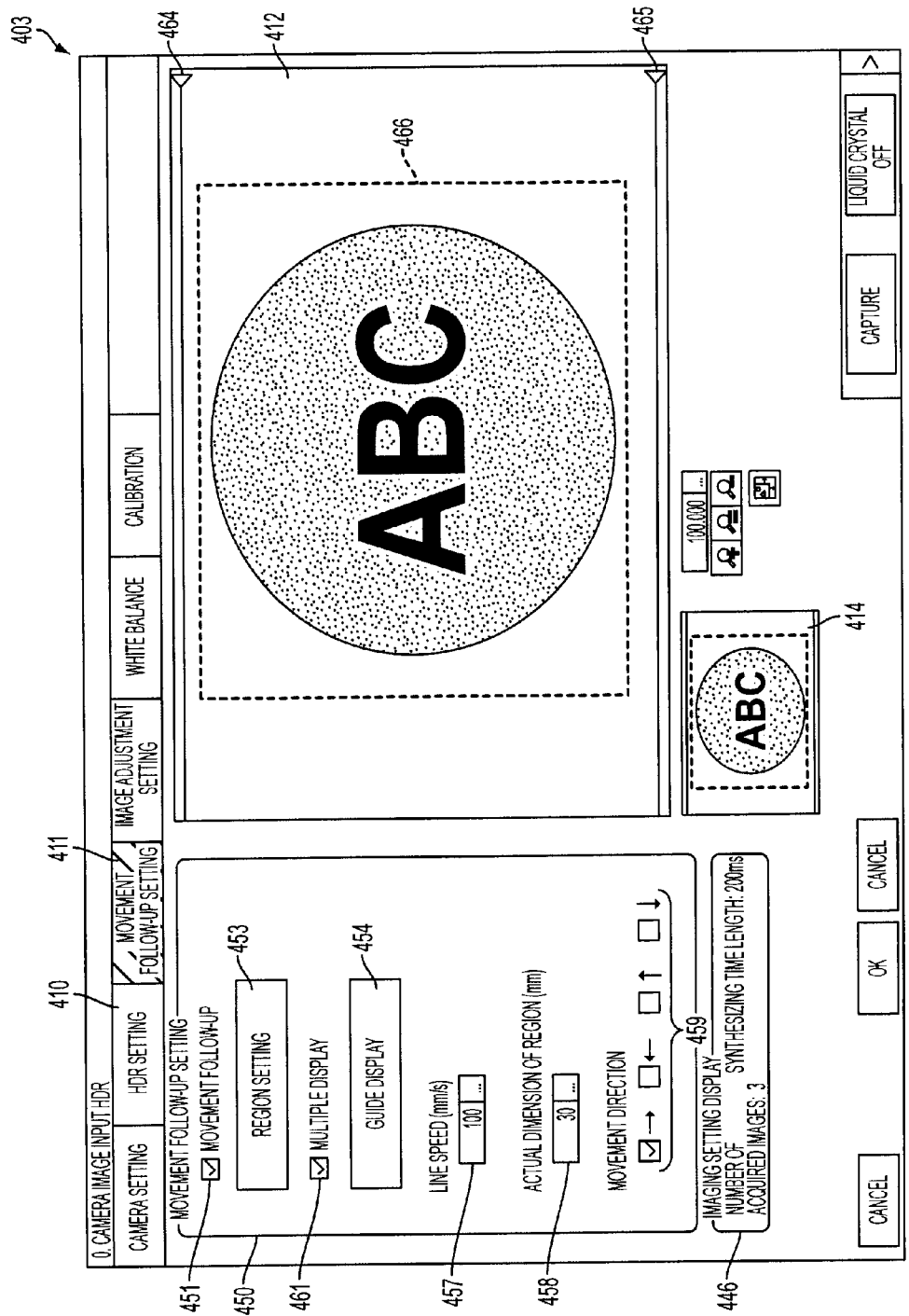
FIGS. 43A and 43B are diagrams showing a screen display example providing a setting function for the model region in the movement follow-up process (sequential extraction type) according to the present embodiment.
Figure 43B:
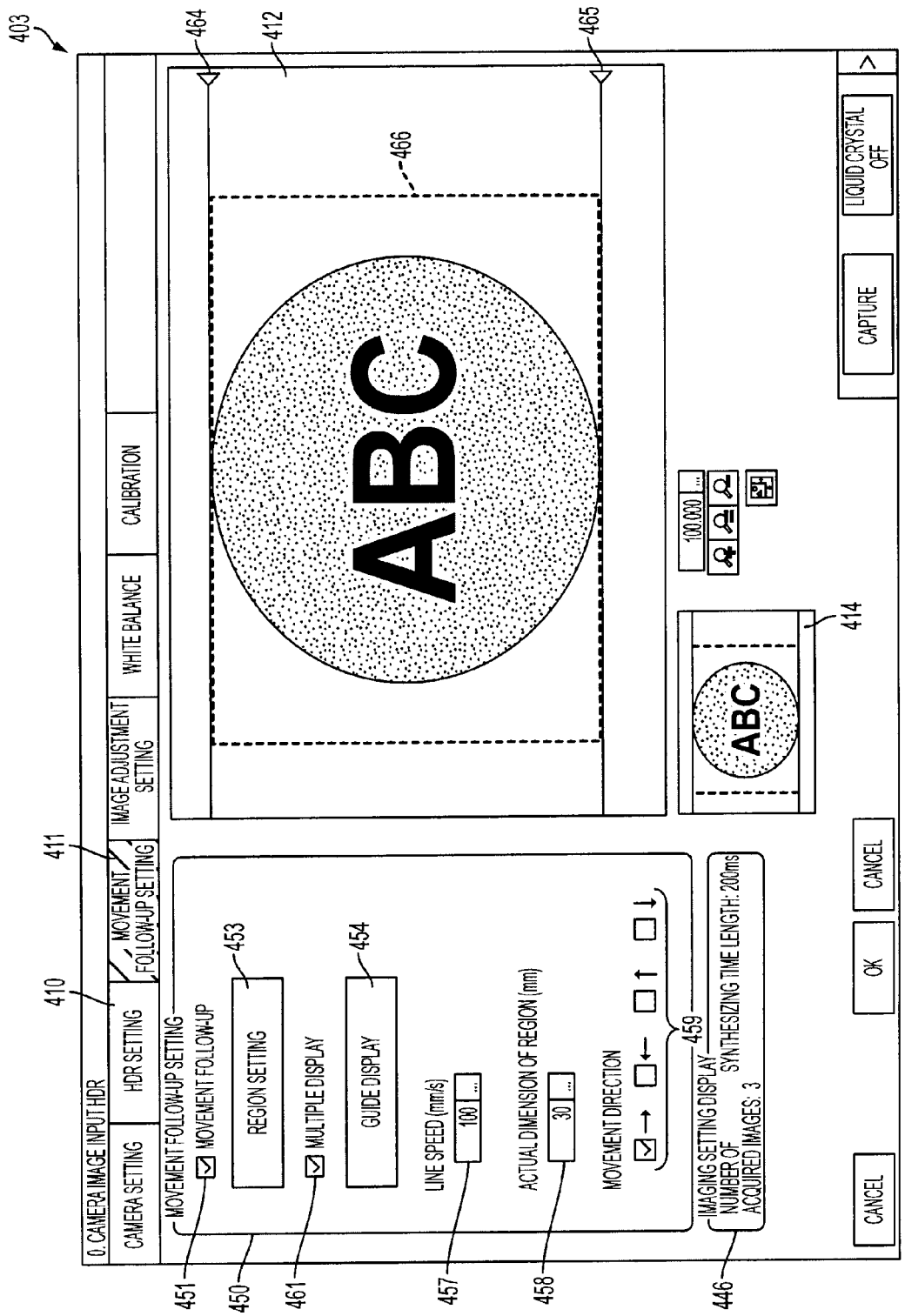
Figure 44A:
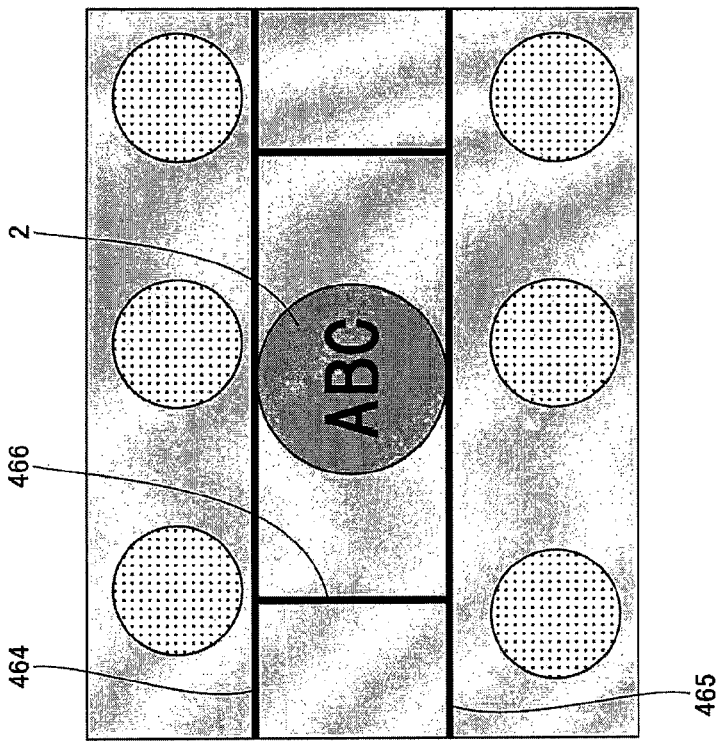
FIGS. 44A and 44B are diagrams for describing effects of the setting function for the model region in the movement follow-up process (sequential extraction type) according to the embodiment of the present invention.
Figure 44B:
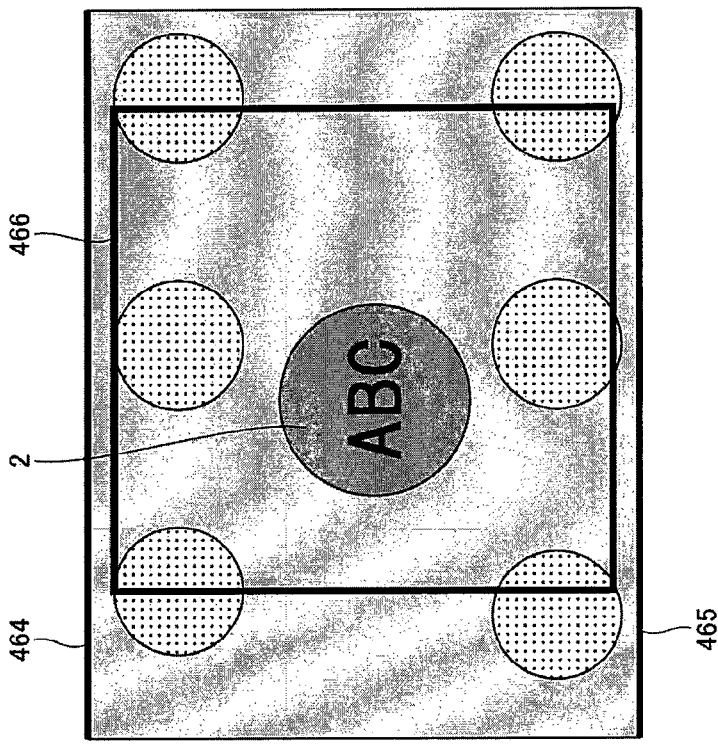

FIGS. 43A and 43B are diagrams showing a screen display example providing a setting function for the model region in the movement follow-up process (sequential extraction type) according to the present embodiment. FIGS. 44A and 44B are diagrams for describing the effects of the setting function for the model region in the movement follow-up process (sequential extraction type) according to the embodiment of the present invention.

FIG. 43A shows a case where a model region 466 is preset in the setting mode screen 403 shown in FIGS. 40A and 40B. In other words, the user sets the model region 466 with respect to the input image displayed in the image display area 412 by performing the operation on the region setting screen 404 shown in FIG. 15. Thereafter, the region adjustment bars 464 and 465 are displayed to reduce the image synthesizing region described above.

In the state shown in FIG. 43A, assume that the user operates the region adjustment bar 464 and/or the region adjustment bar 465 to reduce the image synthesizing region. The length of the model region 466 in the up and down direction in the plane of drawing also reduces with the reduction of the length in the up and down direction in the plane of drawing of the image synthesizing region. The range that is larger than necessary is suppressed from being extracted as the model region 466.

In other words, as shown in FIG. 44A, when the range of the work 2 that occupies the input image is relatively small, the synthesized image region defined by the region adjustment bras 464 and 465 can be corresponding to the range of the work 2 to achieve higher speed of the process. In FIG. 44B, a case where the synthesized image region is set in correspondence with the width in the up and down direction in the plane of drawing of the work 2 is shown.

In this case, if a range relatively larger than the range indicated by the work 2 is set to the model region 466, the size of the model region 466 can be changed to that corresponding to the synthesized image region after the change.

In FIGS. 43 and 44, a case where one of the lengths of the synthesized image region (range defined by the region adjustment bars) and the length of the corresponding side of the model region 466 coincide has been described, but the model region 466 may be automatically set to a range narrower than or a range wider than the synthesized image region.

As described above, unnecessary information other than the target work 2 is suppressed from mixing in the pattern to be extracted by limiting the model region to the range corresponding to the target work, so that the accuracy of the search process can be enhanced. Further, the speed of the entire process can be increased since the amount of information on the pattern to be extracted reduces.

From the standpoint of the user, the setting of the model region can be carried out more efficiently.

F4. Efficient Setting of Search Region in Movement Follow-Up Process (Sequential Extraction Type)

As described above, the search process is performed in the subsequent input image using the pattern extracted from the preceding input image in the movement follow-up process (sequential extraction type) according to the present embodiment. Since the work 2 is moving, the position of the work 2 that appears in the subsequent input image is shifted with respect to the position of the work 2 that appears in the subsequent input image along the movement direction of the work 2. The time length required for the search process can be reduced and the search accuracy can be enhanced by reducing the region (search region) to be the target of the search process according to the position change of the target work 2 in the input images. The function for efficiently setting the search region will be described below with reference to FIGS. 45 and 46.

Figure 45:
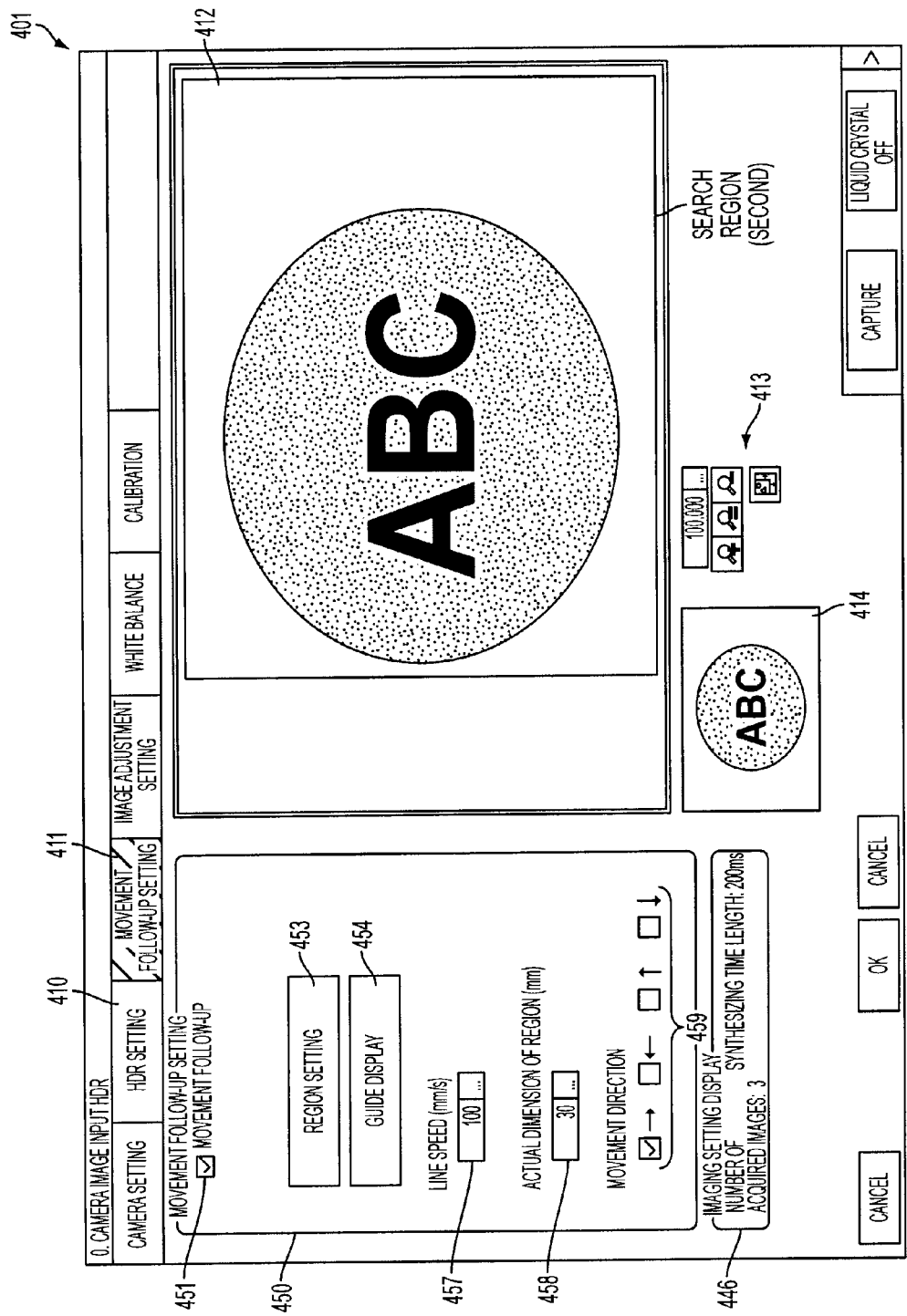
FIG. 45 is a diagram showing a screen display example providing an efficient setting function for a search region in the movement follow-up process (sequential extraction type) according to the embodiment of the present invention.

FIG. 45 is a diagram showing a screen display example providing an efficient setting function for the search region in the movement follow-up process (sequential extraction type) according to the embodiment of the present invention. FIGS. 46A and 46A are diagrams for describing the effects of the efficient setting function for the search region in the movement follow-up process (sequential extraction type) according to the embodiment of the present invention.

FIG. 45 shows the setting mode screen 401 in which the search region is set on the image display area 412. In the setting mode screen 401, the search region for the input image acquired first is set to the entire input image, and the search region for the input image acquired second or subsequently is dynamically set according to the movement amount of the work 2 between the successive imaging timing. In other words, in the present function, the search process on the subsequently acquired input image is performed limiting to a region corresponding to the movement amount calculated by the product of the movement velocity of the work in the view of the imaging unit 8 set according to the operation by the user and the time length required to acquire a series of input images under the exposure condition set by the user.

More specifically, the user sets the movement velocity of the work with respect to the line speed input box 457 of the setting mode screen 401. The user inputs the actually measured line speed (conveying speed) of the conveying line 6 for conveying the work 2 and the like as the movement velocity. Typically, the unit of [mm/s], which is a physical movement velocity, is used for the actually measured line speed.

Alternatively, the line speed in the view of the imaging unit 8 may be used. Specifically, the unit of [pix/s], which is number of pixels the work 2 moves per unit time, may be used in the view of the imaging unit 8. In the limiting process of the search process according to the present function to be described later, the movement velocity of the work 2 in units of [pix/s] can be calculated from the relationship between the physical length corresponding to the view range of the preset imaging unit 8 and the number of pixels included in the view range even in a case where the user inputs the line speed (conveying speed) in units of [mm/s] etc. since the number of pixels that moves per unit time is required.

Furthermore, the user checks the directions corresponding to the movement direction of the work 2 in the view of the imaging unit 8 of the four check boxes included in the line movement direction check box group 459.

The image processing device according to the present embodiment then calculates the imaging interval (difference between preceding imaging timing and subsequent imaging timing) related to series of successive imaging based on the preset imaging conditions, and multiplies the imaging interval to the movement velocity of the work 2 set by the user to calculate the movement amount of the work 2. The image processing device according to the present embodiment also dynamically determines region, reduced by the calculated movement amount along the movement direction of the work from the original search region (first), as the search region (second) on the subsequent input image. Similarly, the search region is similarly dynamically determined for the third and subsequently acquired input images.

In other words, as shown in FIG. 46A, if the range of the work 2 occupying the input image is relatively small and/or other works etc. that may cause false search are appearing, the search accuracy can be enhanced by limiting the search region to an appropriate range, as shown in FIG. 46B. The search process itself becomes high speed as the image (amount of information) to be the target of the search process can be reduced.

The efficient determining function for the search region is also applicable to the movement follow-up process (model registration type) according to the embodiment of the present invention. Even when applied to the movement follow-up process (model registration type), the user can calculate the movement amount of the work 2 between the successive imaging in the image processing device by simply setting the movement velocity of the work 2 and the movement direction of the work 2, so that an appropriate range can be set as the search region for the set of input images acquired by the series of imaging.

F5. Relationship Among Synthesized Image Region, Model Region, and Search Region The synthesized image region, the model region, and the search region described above can be basically set independently from each other.

FIGS. 47A and 47B are diagrams for describing each region in the movement follow-up process (sequential extraction type) according to the embodiment of the present invention.

In FIG. 47A, an example in which the model region and the synthesized image region are set with respect to the input image is shown. As described above, the model region is set linked with the setting of the synthesized image region, but such relationship may not always be satisfied.

For instance, when testing a specific portion on a certain work, a usage mode of giving a movement follow-up process mark (tracking mark) to a portion different from the portion to be tested can be considered to enhance the accuracy of the movement follow-up process according to the present embodiment. In this case, the model region is set to the portion with the tracking mark and the synthesized image region is set to the portion to be tested.

In FIG. 47B, an example in which the model region and the search region are set with respect to the input image is shown. The model region and the search region can be set independent from each other, but in theory, the search region is set to a range larger than the model region. If the movement direction of the work 2 is defined to a specific direction, the search region may be set linked with the range of the synthesized image region.

F6. Position Shift Correction in Movement Follow-Up Process (Sequential Extraction Type)

As described above, alignment is performed with the target work 2 in the input image as a reference, as shown in FIGS. 37A and 37B, in the movement follow-up process (sequential extraction type) according to the present embodiment. With such alignment, the monitoring of the false detection and/or the correction of the error can be performed based on the movement amount (theoretical value) of the work 2 between the successive imaging timing.

The image processing device according to the present embodiment may be implemented with the function for correcting the position shift in the movement follow-up process (sequential extraction type). With this, the synthesized image can be more stably generated. The correction function for the position shift will be described with reference to FIGS. 48A, 48B, 48C to FIGS. 50A, 50B.

Figure 50A:
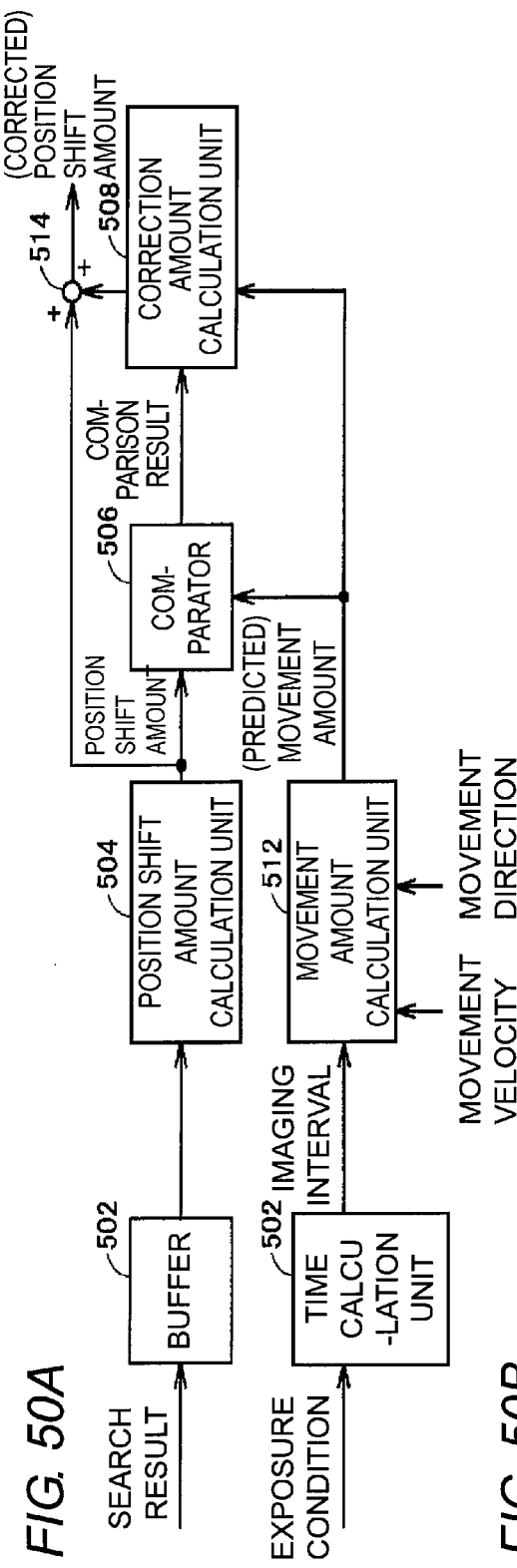
FIGS. 50A and 50B are functional block diagrams related to the correction function for the position shift in the movement follow-up process (sequential extraction type) according to the embodiment of the present invention.
Figure 50B:
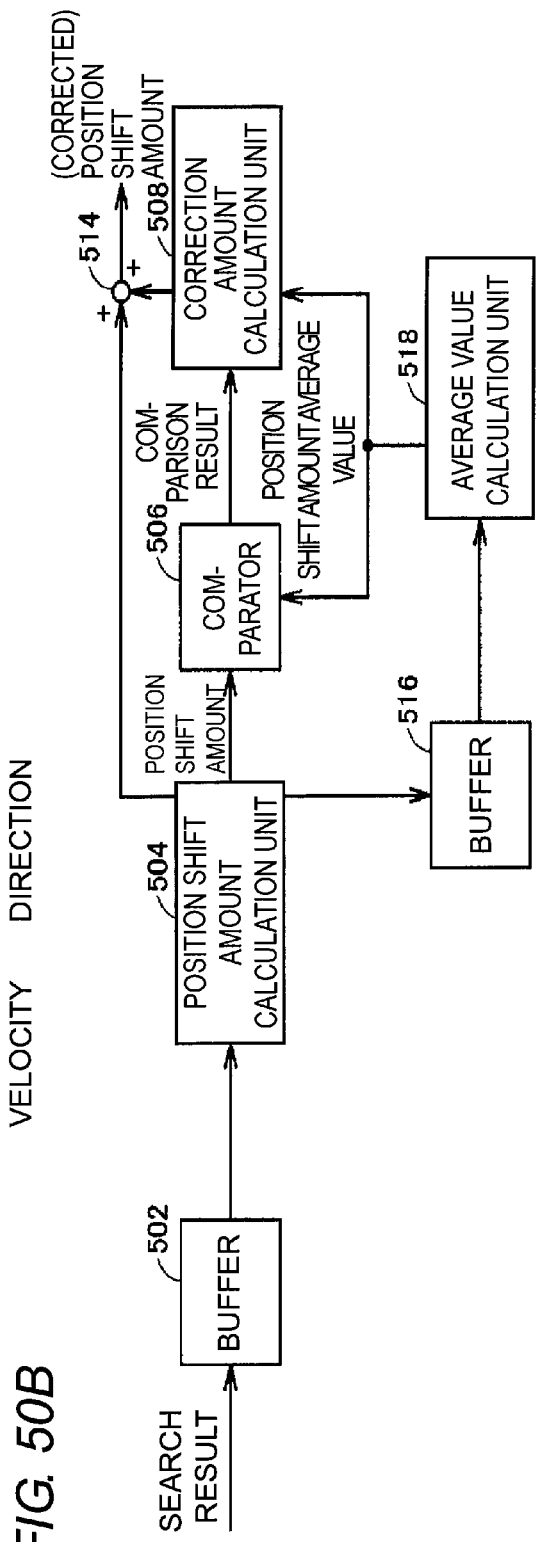

FIGS. 48A to 48C are diagrams for describing the content of the correction function for the position shift in the movement follow-up process (sequential extraction type) according to the embodiment of the present invention. FIGS. 49A and 49B are diagrams showing one example of the movement amount corresponding to FIGS. 48A to 48C. FIGS. 50A and 50B are functional block diagrams related to the correction function for the position shift in the movement follow-up process (sequential extraction type) according to the embodiment of the present invention.

With reference to FIG. 48A, assume that four input images IMG1 are sequentially acquired by a series of imaging of a plurality of times. After the search process is executed on the input image IMG1 to specify the position of the work 2, alignment is performed with the work 2 as the reference, as shown in FIG. 48B. In the following description, the relative position shift amount (vector quantity) between two input images adjacent in the acquiring order will be focused.

In other words, as shown in FIG. 48B, with the first input image as a reference (in FIG. 48B, a vertex position at the upper left of the first input image is reference point O1), the position shift amount (reference number 521) of the second input image is calculated. Similarly, with the second input image as a reference (in FIG. 48B, a vertex position at the upper left of the second input image is reference point O2), the position shift amount (reference number 522) of the third input image is calculated. Further, with the third input image as a reference (in FIG. 48B, a vertex position at the upper left of the third input image is reference point O3), the position shift amount (reference number 523) of the fourth input image is calculated. Hereinafter, the position shift amount between the input images contained in the acquired set is similarly calculated.

Each position shift amount calculated in such a manner corresponds to the movement amount of the work 2 corresponding to the time difference in the corresponding imaging timing. In other words, the movement obtained by multiplying the movement velocity of the work 2 to the time difference of the imaging timing at which the first input image is acquired and the imaging timing at which the second input image is acquired corresponds to the position shift amount between the first input image and the second input image. Thus, determination can be made that the search process failed if each position shift amount deviates from the predicted movement amount of the work 2. In such a case, the position shift amount (adjustment position of target input image) can be corrected according to the predicted movement amount of the work 2.

In other words, the correction function for the position shift corrects the relative positional relationship between the preceding input image and the subsequent input image so as to correspond to the movement amount when the relative position shift amount of the preceding input image and the subsequent input image upon performing alignment with the target work 2 in the input image as the reference in the series of imaging of a plurality of times by the imaging unit 8 is deviated from the movement amount calculated by the product of the movement velocity of the work 2 in the view of the imaging unit 8 set by the user and the time length required to acquire the preceding and subsequent input images under the exposure condition set by the user. Typically, the positional relationship is corrected based on whether or not the calculated movement amount is apart by greater than or equal to a predefined value.

For instance, in FIG. 48C, the position shift amount of the third input image with respect to the second input image is greater than other position shift amounts, and determination can be made as false detection. The value of the position shift amount corresponding to FIG. 48C is shown in FIG. 49A.

With reference to FIG. 49A, the position shift amount (x, y) of the third input image (2→3) with respect to the second input image is (x, y)=(40, 20), which is deviated compared to the position shift amount between other input images (x, y)=(24, 0), (23, 1), (24, 0).

The correction function for the position shift detects failure of the search process based on such deviance and corrects the position shift amount determined as false detection to the value shown in FIG. 49B.

As a method of embodying the correction function for the position shift, (1) method using the movement amount of the work 2, and (2) method using statistical value on other position shift amounts will be described.

(1. Method Using Movement Amount of Work)

In the present method, the movement amount of the work 2 at each imaging timing is estimated assuming the work 2 performs a constant speed linear movement from the movement amount and the movement direction of the work 2 set by the user. The failure of the search process is determined and the position shift amount after the correction is calculated using the estimated movement amount of the work 2.

FIG. 50A shows one example of a specific processing block. In this processing block, a buffer 502 sequentially stores the search result (include information for specifying the position of the work 2) on each input image. A position shift amount calculation unit 504 then calculates a relative position shift amount between the input images based on the search result stored in the buffer 502. The calculated position shift amount is sequentially input to a comparator 506. A time calculation unit 510 calculates a time difference (imaging interval) between each imaging timing based on the exposure condition set by the user. A movement amount calculation unit 512 then calculates an absolute value of the movement amount by multiplying the movement velocity of the work 2 set by the user and the imaging interval calculated by the time calculation unit 510, and calculates a calculated movement amount (vector) according to the movement direction of the work 2 set by the user. In other words, the movement amount of the work 2 is calculated according to the relationship expressed as movement amount (absolute value)=(movement velocity of work 2)×(imaging interval). The calculated movement amount (vector) is input to the comparator 506 and the movement amount calculation unit 512 as (predicted) movement amount.

The comparator 506 compares the position shift amount sequentially input from the position shift amount calculation unit 504 and the corresponding (predicted) movement amount, and determines whether or not the respective movement amounts are deviated. If the movement amounts are not deviated, the position shift amount calculated in the position shift amount calculation unit 504 is output as is. If the movement amounts are deviated, a correction amount calculation unit 508 calculates a correction amount using the (predicted) movement amount. Then, an adder 514 adds the correction amount to the position shift amount calculated by the position shift amount calculation unit 504, and outputs the corrected position shift amount.

(2. Method Using Statistical Value on Another Position Shift Amount)

In this method, the failure of the search process is determined and the corrected position shift amount is calculated using the statistical value (typically, average value) of the position shift amount calculated for a plurality of input images acquired by a series of imaging of a plurality of times, or using the statistical value of the performance value in a series of imaging of a plurality of times executed in the past.

FIG. 50B shows one example of a specific processing block. In this processing block, a buffer 516 for storing the sequentially calculated position shift amount and an average value calculation unit 518 are arranged in place of the time calculation unit 510 and the movement amount calculation unit 512, compared to the block diagram shown in FIG. 50A. The buffer 516 sequentially stores the position shift amount calculated every time a series of imaging of a plurality of times is executed.

The average value calculation unit 518 calculates the average value of the position shift amount calculated in a series of imaging of a plurality of times and/or the average value of the position shift amount for between the same input images executed for a plurality of times. In other words, the former average value means the average value of the position shift amount between the first input image and the second input image, the position shift amount between the second input image and the third input image, the position shift amount between the third input image and the fourth input image, . . . for a series of imaging carried out a plurality of times. The latter average value, on the other hand, means the average value for the position shift amount between the first input image and the second input image when a series of imaging of a plurality of times is repeatedly executed.

The average value calculated by the average value calculation unit 518 is used as the (predicted) movement amount for the work 2.

Other processes are similar to FIG. 50A, and thus the detailed description thereof will not be repeated.

F7. Overall Processing Procedure in Movement Follow-Up Process (Sequential Extraction Type)

Figure 51:
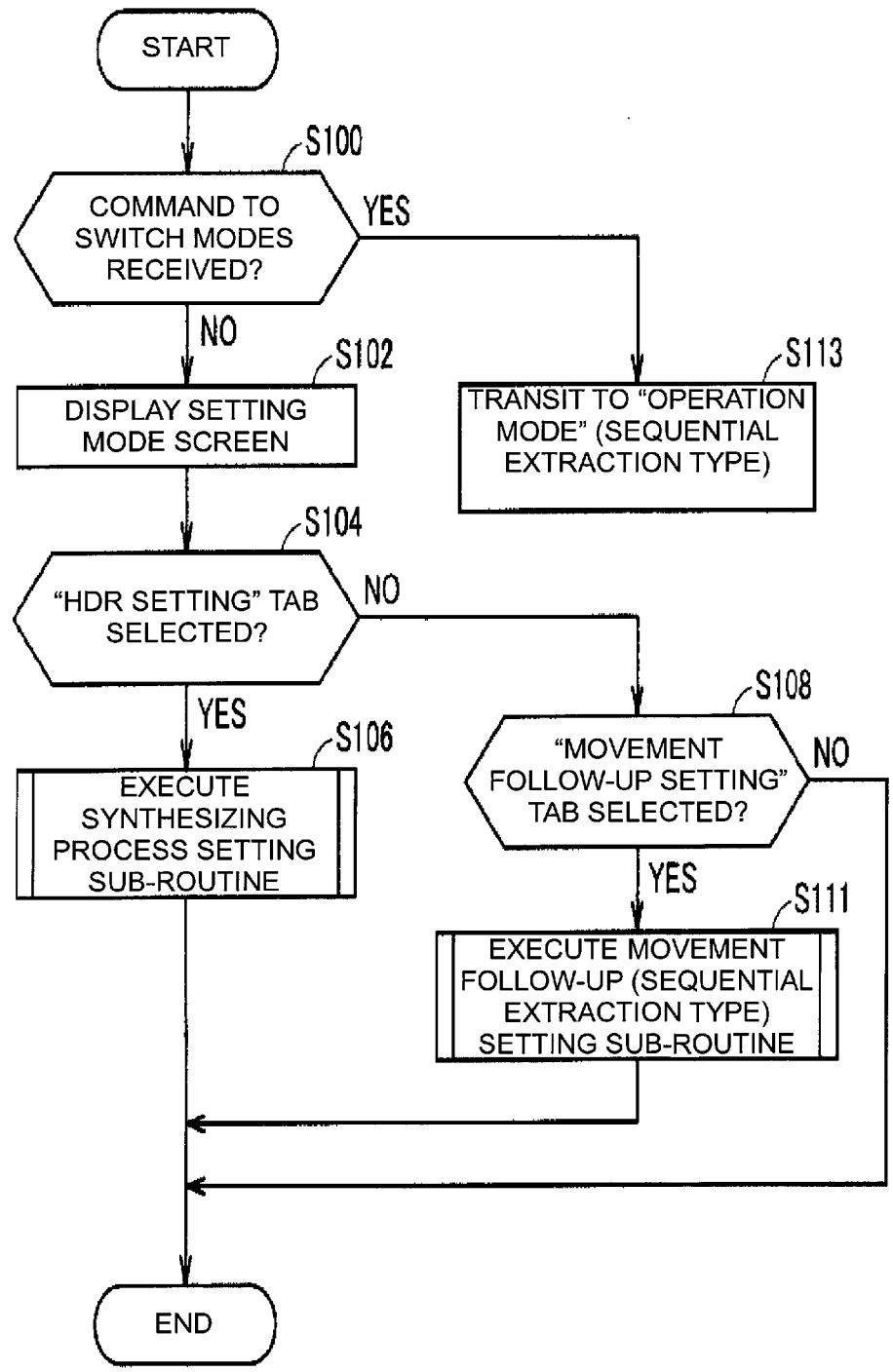
FIG. 51 is a flowchart showing overall processes (sequential extraction type) in the image processing device according to the embodiment of the present invention.

FIG. 51 is a flowchart showing overall processes (sequential extraction type) in the image processing device according to the embodiment of the present invention. The flowchart shown in FIG. 51 is implemented when the CPU 105 reads out the program preliminarily stored in the fixed disk 107 and the like to the memory 106 and executes the program. The initial mode is the "setting mode".

Compared to the flowchart showing the overall processes related to the model registration type shown in FIG. 28, the flowchart shown in FIG. 51 executes step S113 instead of S112, and executes step S111 instead of step S110. In other words, in step S111, the CPU 105 executes the movement follow-up (model registration type) setting sub-routine shown in FIG. 52. In step S113, the CPU 105 proceeds to the "operation mode" (sequential extraction type). The processes shown in a flowchart of FIG. 53, to be hereinafter described, are then executed. Other steps are similar to FIG. 28, and thus the detailed description will not be repeated.

(Movement Follow-Up Setting Sub-Routine)

Figure 52:
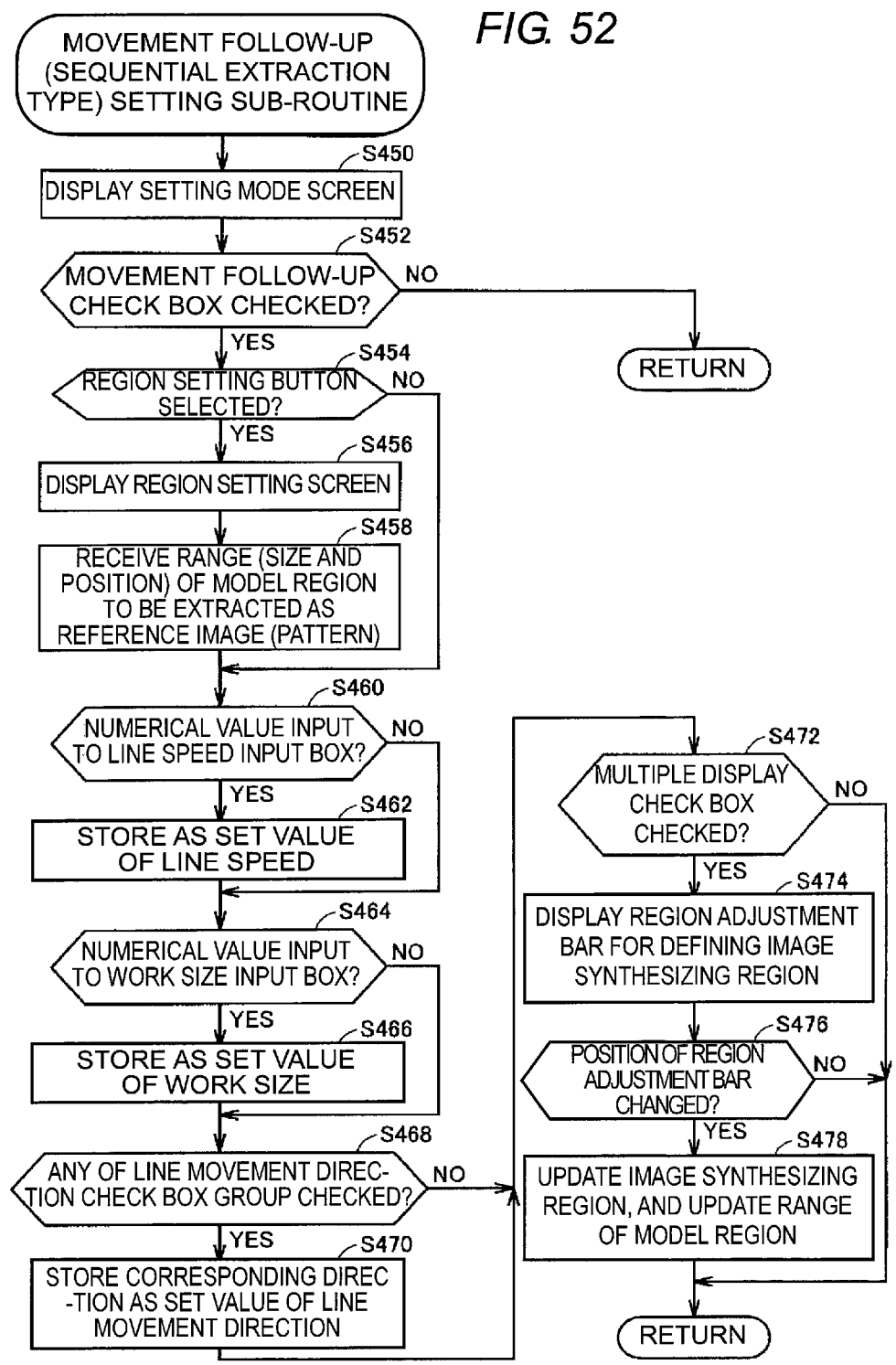
FIG. 52 is a flowchart showing a process in the movement follow-up setting sub-routine (sequential extraction type) shown in FIG. 51.

FIG. 52 is a flowchart showing a process in the movement follow-up (sequential extraction type) setting sub-routine shown in FIG. 51. The flowchart shown in FIG. 52 is implemented when the CPU 105 reads out the program preliminarily stored in the fixed disk 107 and the like to the memory 106 and executes the program.

With reference to FIG. 52, the CPU 105 displays the setting mode screen 403 shown in FIGS. 39A, 39B and 40A, 40B (step S450). The CPU 105 then determines whether or not the movement follow-up check box 451 is checked (step S452). If the movement follow-up check box 451 is not checked (NO in step S452), the process returns to the main flow of FIG. 51.

If the movement follow-up check box 451 is checked (YES in step S452), the CPU 105 determines whether or not the region setting button 453 is selected (step S454). If the region setting button 453 is selected (YES in step S454), the CPU 105 displays the setting mode screen 403 shown in FIGS. 43A, 43B, and the like (step S456). The CPU 105 receives the range (size and the position) of the model region 466 to be extracted as the reference image (pattern) from the first image (step S458).

If the region setting button 453 is not selected (NO in step S454), or after step S458 is executed, the CPU 105 determines whether or not a numerical value is input to the line speed input box 457 (step S460). If a numerical value is input to the line speed input box 457 (YES in step S460), the CPU 105 verifies the validity of the input numerical value, and then stores the same as a set value of the line speed (step S462).

If a numerical value is not input to the line speed input box 457 (NO in step S460), or after step S462 is executed, the CPU 105 determines whether or not a numerical value is input to the work size input box 458 (step S464). If a numerical value is input to the work size input box 458 (YES in step S464), the CPU 105 verifies the validity of the input numerical value, and then stores the same as a set value of the work size (step S466).

If a numerical value is not input to the work size input box 458 (NO in step S464), or after step S466 is executed, the CPU 105 determines whether or not one of the line movement direction check box group 459 is checked (step S468). If one of the line movement direction check box group 459 is checked (Yes in step S468), the CPU 105 stores the direction corresponding to the checked check box as a set value of the line movement direction (step S470).

If none of the line movement direction check box group 459 is checked (NO in step S468), or after step S470 is executed, whether or not the multiple display check box 461 is checked is determined (step S472). If the multiple display check box 461 is not checked (NO in step S472), the process returns to the main flow of FIG. 51.

If the multiple display check box 461 is checked (YES in step S472), the CPU 105 displays the region adjustment bar for defining the image synthesizing region on the image display area 412 of the setting mode screen 403 according to the check state of the line movement direction check box group 459 (step S474). The CPU 105 then determines whether or not the position of the region adjustment bar is changed by the user (step S476). If the position of the region adjustment bar is changed by the user (YES in step S476), the CPU 105 updates the image synthesizing region and updates the range of the model region accompanied therewith according to the position of the region adjustment bar after the change (step S478). If the position of the region adjustment bar is not changed by the user (NO in step S476), or after step S478 is executed, the process return to the main flow of FIG. 51.

(Operation Mode)

Figure 53:
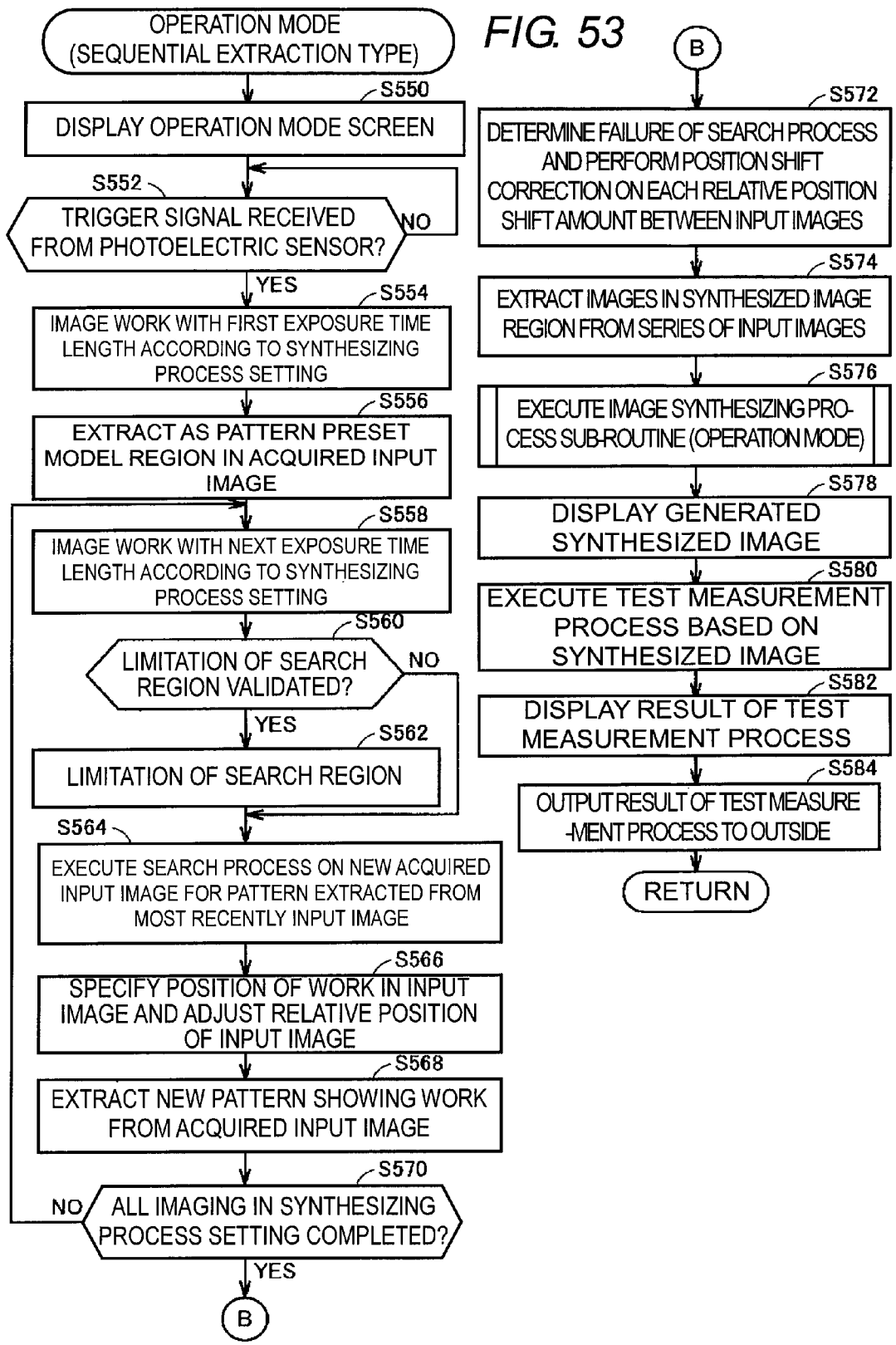
FIG. 53 is a flowchart showing a process in the "operation mode" (sequential extraction type) in the image processing device according to the embodiment of the present invention.

FIG. 53 is a flowchart showing a process in the "operation mode" (sequential extraction type) in the image processing device according to the embodiment of the present invention. The flowchart shown in FIG. 53 is implemented when the CPU 105 reads out the program preliminarily stored in the fixed disk 107 and the like to the memory 106 and executes the program.

With reference to FIG. 53, the CPU 105 displays the operation mode screen 304 shown in FIG. 42 (step S550). The CPU 105 determines whether or not a trigger signal is received from the photoelectric sensor (step S552). In other words, whether or not the target work 2 arrived in the view of the imaging unit 8 is determined. If the trigger signal is not received from the photoelectric sensor (NO in step S552), the process of step S552 is repeated.

If the trigger signal is received from the photoelectric sensor (YES in step S552), the CPU 105 images the work 2 with the first exposure time length according to the synthesizing process setting determined in step S212 shown in FIG. 29 (step S554). The CPU 105 then extracts as a pattern the preset model region in the input image acquired by imaging (step S556).

The CPU 105 then images the work 2 with the next exposure time length according to the synthesizing process setting determined in step S212 shown in FIG. 29 (step S558). The CPU 105 then determines whether or not limitation of the search region is validated (step S560). If the limitation of the search region is validated (YES in step S560), the CPU 105 limits the search region to a range determined based on the movement velocity of the work, the imaging interval, and the like set by the user (step S562).

If the limitation of the search region is not validated (NO in step S560), or after step S562 is executed, the CPU 105 performs the search process on the new acquired input image for the pattern extracted from the input image acquired by the recent imaging (step S564). The CPU 105 specifies the position of the work 2 in the input image from the search result, and adjusts the relative position of the acquired input images so that alignment with the target work 2 as a reference can be carried out (step S566). The CPU 105 then extracts a new pattern showing the work 2 from the acquired input image according to the search result (step S568).

The CPU 105 thereafter determines whether or not all imaging in the synthesizing process setting is finished (step S570). If all imaging in the synthesizing process setting is not finished (NO in step S570), the processes after step S558 are repeated.

If all imaging in the synthesizing process setting is finished (YES in step S570), the CPU 105 performs the determination on the failure of the search process and the position shift correction for each relative position shift amount between two input images adjacent in the acquired order (step S572). The CPU 105 then extracts each image in the synthesized image region set by the user from a series of input images after the position adjustment (step S574), and executes the image synthesizing process sub-routine (operation mode) on the set of extracted images (step S576). With the execution of the image synthesizing process sub-routine (operation mode), the synthesized image based on the respective images extracted from a plurality of input images is generated. The CPU 105 also displays the generated synthesized image on the monitor 102 (step S578).

The CPU 105 thereafter executes the test measurement process based on the generated synthesized image (step S580). Examples of the test measurement process include the search process for searching the portion that matches the pre-registered image pattern, and the edge scan process of detecting the edge of the work and measuring the distance between the edges.

Lastly, the CPU 105 displays the result of the test measurement process on the monitor 102 and the like (step S582), and also outputs the result to the external device such as the PLC (step S584). The process then returns to the main flow of FIG. 51.

F8. Effects of Adopting Movement Follow-Up Process (Sequential Extraction Type)

The reference image (pattern) showing the target work 2 or the characteristic information of the target work 2 does not need to be pre-registered since the search process is dynamically repeated on the input image sequentially acquired by imaging of the imaging unit 8.

In particular, the resistance property with respect to change in illumination environment and the like can be enhanced since the model is dynamically extracted even in a case where a shift occurs between the registered model and the current state of the target work.

Similar to the model registration type, in the movement follow-up process of the sequential processing type, the time length required for processing can be shortened by the time length required for the search process by executing the imaging process and the search process in parallel. Furthermore, in the movement follow-up process of the sequential extraction type, not only the search process but the pattern extraction process for the search can also be executed in parallel with the imaging process.

G1. User Assisting Function

In the image synthesizing process including the movement follow-up process described above, numerous parameters such as the view of the imaging unit 8, the detection position (trigger position) of the photoelectric sensor, the number of imaging processes, the line speed, and the size of the work 2 need to be adjusted to set to an appropriate imaging state. As described above, the guide display in the setting mode shown in FIG. 16 and FIGS. 26A to 26C, the error notification in the operation mode shown in FIG. 22, and the like are provided as functions for assisting such adjustment by the user. In addition to such functions, there is also a need to adjust the parameters on a trial and error basis by flowing the actual work 2 on the conveying line 6. A function for assisting such trial and error adjustment may be added to the image processing device according to the embodiment of the present invention.

Summarizing such an assisting function, a plurality of input images, which are acquired by starting the imaging of a plurality of times according to a plurality of different imaging conditions in the synthesizing process setting predetermined at the timing the work 2, which is the measuring article, passes the trigger position (reference position) of the conveying line 6, is displayed with the direction and the reduction scale in the movement direction (conveying direction) of the work 2 in the view of the imaging unit 8 coincided.

Figure 54:
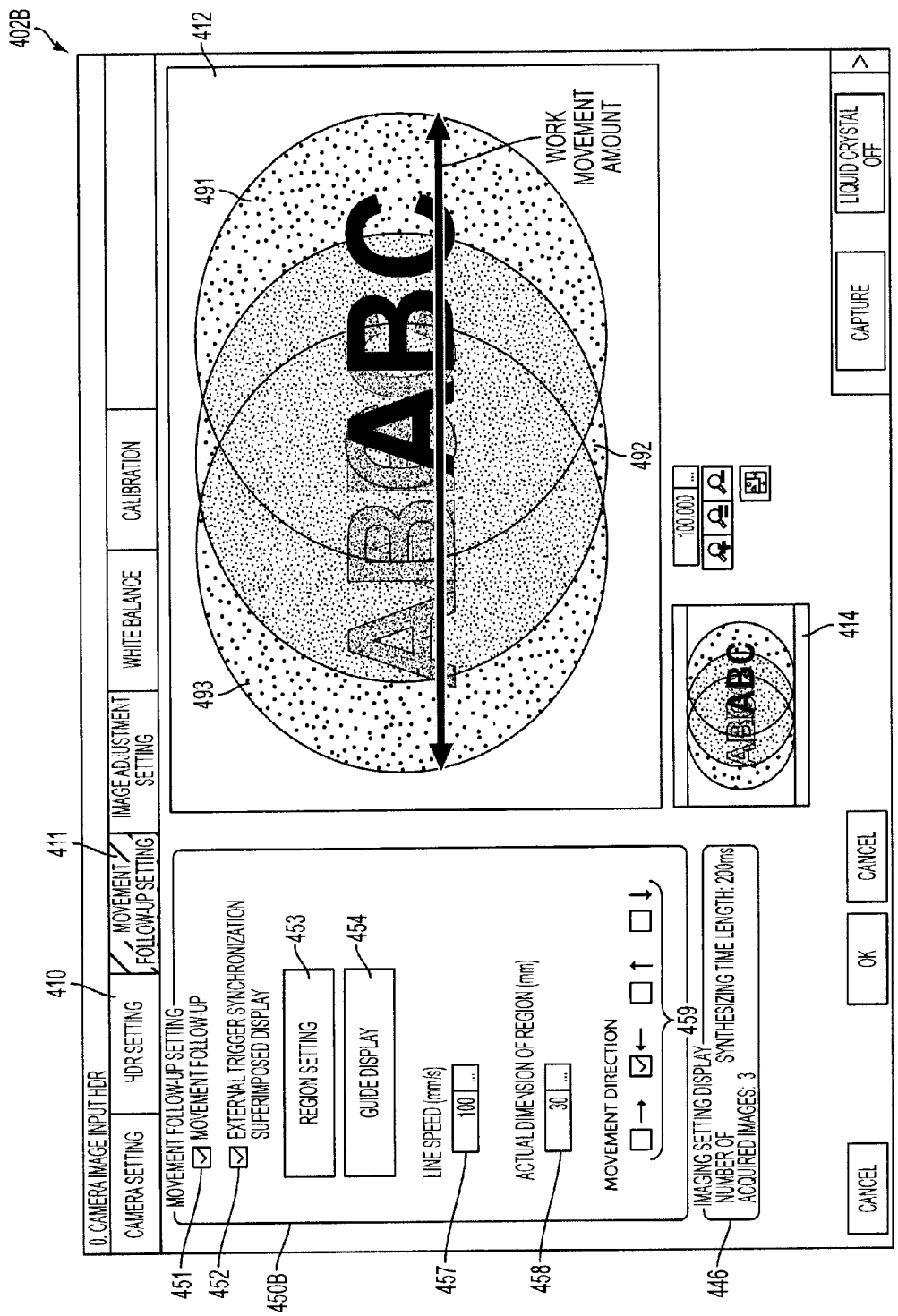
FIG. 54 is a diagram showing a setting mode screen for performing setting in the movement follow-up process, provided in the image processing device according to the embodiment of the present invention.

FIG. 54 is a diagram showing a setting mode screen 402B for performing the setting related to the movement follow-up process provided in the image processing device according to the embodiment of the present invention.

The setting mode screen 402B shown in FIG. 54 corresponds to that in which a movement follow-up setting input area 450B is displayed in place of the movement follow-up setting input area 450 in the setting mode screen 402 shown in FIG. 14. The movement follow-up setting input area 450B includes an external trigger synchronization superimposed display check box 452 in the movement follow-up setting input area 450. Other button arrangements, and the like are similar to the setting mode screen 402 shown in FIG. 14, and thus the detailed description thereof will not be repeated.

The external trigger synchronization superimposed display check box 452 accepts the setting of validation/invalidation of the movement follow-up process. The assisting function is validated when the movement follow-up check box 451 is checked. In other words, whether movement follow-up check box 451 is checked, the work 2 is sequentially imaged by the imaging unit 8 according to the imaging conditions of the synthesizing process setting predetermined at the timing the trigger signal is received from the photoelectric sensor, that is, the timing the work 2 passes the trigger position. A plurality of input images acquired by the respective imaging is displayed in a superimposed manner in correspondence with the view of the imaging unit 8.

By way of example, in the example shown in FIG. 54, three imaging are performed on the work 2 flowing the conveying line 6, and the input images 491, 492, 493 acquired by the respective imaging are superimposed and displayed in the image display area 412. The maximum length in the conveying direction of the input images 491, 492, 493 corresponds to the distance the work 2 moves during the imaging time length required to image a plurality of input images necessary for generating one synthesized image. The view of the imaging unit and the trigger position are adjusted such that the distance the work 2 moves during the imaging time length fits within the view of the imaging unit 8 (see FIGS. 27A and 27B).

As an example of displaying with the direction and the reduction scale for the movement direction (conveying direction) of the work 2 in the view of the imaging unit 8 coincided, a mode of superimposing and displaying a plurality of input images has been shown in FIG. 54, but instead of such a mode, the respective input images may be aligned and in the up and down direction in the plane of drawing with the left end in the plane of drawing orthogonal to the conveying direction as the reference.

Other structures and control structures are similar to the above-described embodiment, and thus the detailed description thereof will not be omitted.

According to the assisting function, the adjustment of various types of parameters can be performed while checking the state in which the work is actually flowing the conveying line. The adjustment suited to the respective conveying line thus can be more easily carried out.

G2. Change of Exposure Condition by Adjustment of Diaphragm Amount

In the above-described embodiment, the configuration of adjusting the exposure time length upon imaging the imaging unit 8 has been described as a unit for obtaining different exposure conditions. A configuration of adjusting the diaphragm amount of the optical system will be described in the following variant Generally, the diaphragm amount of the optical system is defined with an F value, which is a value obtained by dividing the focal length of the lens by an effective aperture. The magnitude of the F value is inversely proportional to the square of the light intensity that enters the imaging element. Therefore, the F value in each imaging is changed in the order of "10", "10/√2", "5", ... to realize the relationship between the exposure condition and the "brightness" range as shown in FIG. 6. In this case, the process similar to standardization (=g(Zi,j)/Δtj) by the exposure time length expressed in Equation (1) is implemented by multiplying the square of the F value.

As shown in this variant, when sequentially changing the diaphragm amount, the illumination intensity with respect to the work 2 is made constant, and the exposure time length in each imaging is also made constant (e.g., 1/4000 sec.).

Other processes are similar to the above-described embodiment, and thus the detailed description thereof will not be repeated.

According to the variant, the exposure time length in each imaging upon a plurality of imaging processes under different exposure conditions can be maintained constant. Strictly speaking, when the exposure time length becomes long compared to the movement velocity of the work 2, the movement amount of the work 2 in one imaging (exposure) may not be negligible. In the present variant, on the other hand, the exposure time length is maintained constant under any exposure condition, and thus enhanced is the imaging accuracy of the work 2 in the input image involved in the change of the exposure time length.

G3. Change of Exposure Condition by Adjustment of Illumination Intensity

In the above described embodiment, the configuration of adjusting the exposure time length upon imaging the imaging unit 8 has been described as a unit for obtaining different exposure conditions. A configuration of adjusting the illumination intensity to be irradiated on the work 2 will be described in another further variant below.

Generally, the work 2 to be tested or measured on the conveying line does not self-emit light. In other words, even in a case where the work 2 is a light emitting body such as an LED (Light Emitting Diode), tests on scratches and the like are performed in a non-light emitting state. The light intensity radiated from the work 2 is determined depending on the illumination light that enters the work 2. In terms of the exposure condition for the imaging unit 8, different exposure conditions can be realized by adjusting the intensity of the illumination light irradiated on the work 2, which is the imaging target of the imaging unit 8.

Figures 55, 56:
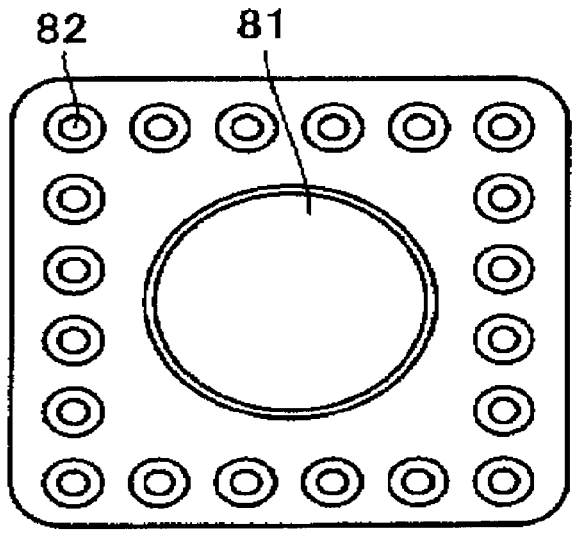
FIG. 55 is a plan view showing an imaging plane of the imaging unit used in the image processing device according to the embodiment of the present invention.
FIG. 56 is a diagram showing one example of a relationship between an illumination intensity (supply power) of a light emitting portion and a "brightness" range suited for imaging according to the embodiment of the present invention.

FIG. 55 is a plan view showing an imaging plane of the imaging unit 8 used in the image processing device according to the embodiment of the present invention. The imaging unit 8 shown in FIG. 55 includes a lens 81 for retrieving light to the imaging element, and a plurality of light emitting portions 82 arranged at the periphery of the lens 81. The light emitting portion 82 typically uses a light source having a relatively wide wavelength range such as a white LED. Furthermore, power for lighting the light emitting portion 82 is supplied from a power adjustment portion (not shown) to the imaging unit 8. The power for lighting the light emitting portion 82 is sequentially changed in synchronization with the imaging (exposure timing) according to the conditions described later.

The light intensity irradiated from the light emitting portion 82 is assumed to be proportional to the supplied power [W], and thus the light intensity radiated from the work 2 is also assumed to be proportional to the power supplied to the light emitting portion 82. For instance, the set of input images acquired when imaged with the exposure time length sequentially changed as 1/500 [sec.], 1/1000 [sec.], and 1/2000 [sec.] while supplying a fixed value 4 [W] to the light emitting portion 82 and the set of input images acquired when imaged with the power sullied to the light emitting portion 82 sequentially changed as 1 [W], 2 [W], and 4 [W] while fixing the exposure time length to 1/2000 [sec.] are assumed to substantially coincide. The influence of the illumination light other than of the light emitting portion 82 is assumed to be negligible.

FIG. 56 is a diagram showing one example of a relationship between the illumination intensity (supply power) of the light emitting portion 82 and the "brightness" range suited for imaging according to the embodiment of the present invention. With reference to FIG. 56, switching of the exposure condition similarly to FIG. 5 can be realized by sequentially increasing the illumination intensity of the light emitting portion 82, that is, the power to supply to the light emitting portion 82 by double.

Furthermore, the calculation formula of the synthetic luminance Ei when generating the synthesized image based on a plurality of input images acquired in such a manner is as expressed with Equation (3), similar to Equation (1) described above.

Equation 3

$$\ln E_j = \frac{\sum_{j=1}^{P} w(Z_{i,j})(\ln g(Z_{i,j}) - \ln \Delta t_j + C)}{\sum_{j=1}^{P} w(Z_{i,j})} \quad (3)$$

where,
w(Z): weighting function,
g(Z): response function of imaging element
$Z_{i,j}$: luminance information at coordinate position i of $j^{th}$ input image datum
$\Delta p_j$: illumination intensity (illumination energy) of $j^{th}$ input image datum In Equation (3), the term "$\ln(g(Z_{i,j})-\ln\Delta p_j)$" is equivalent to the value obtained by standardizing the luminance in each input image with the illumination intensity and evaluating the same as the "brightness". Other image synthesizing processes are similar to those in the embodiment described above, and thus the detailed description thereof will not be repeated.

Figure 57:
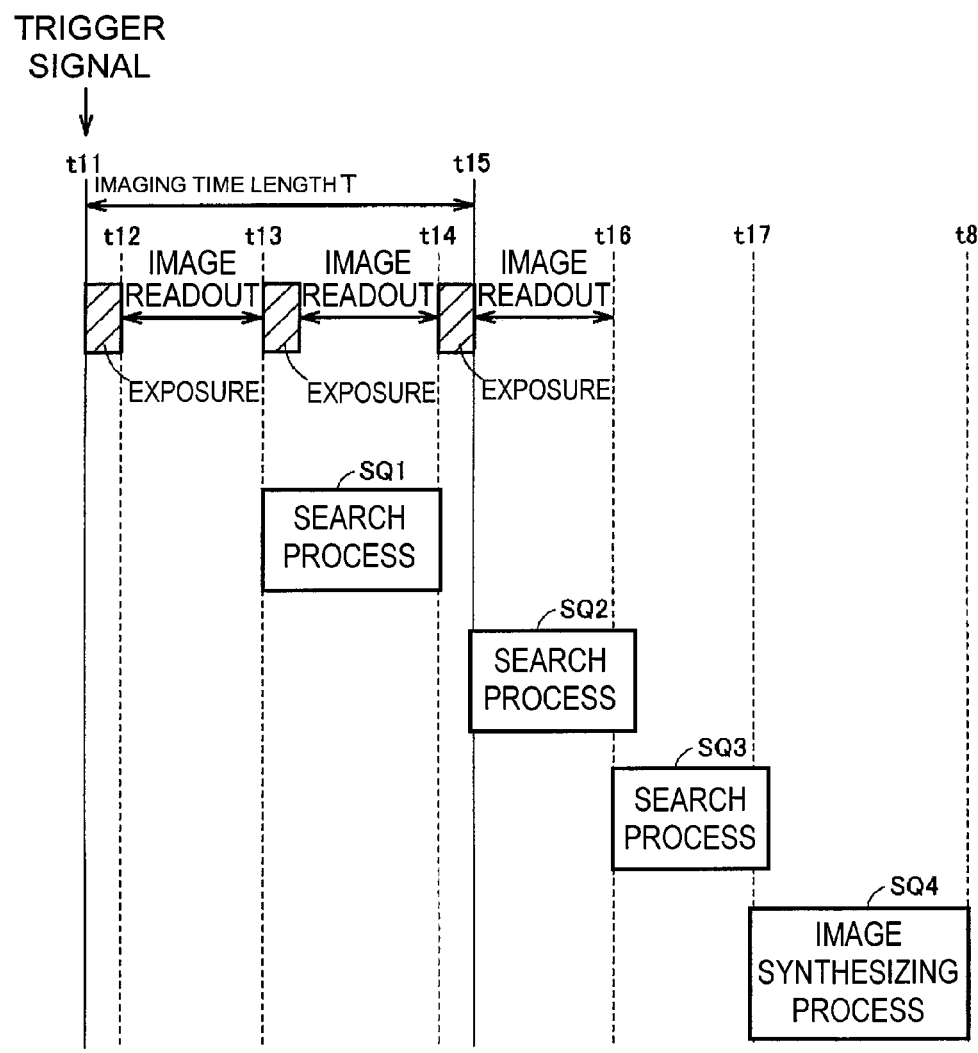
FIG. 57 is a diagram for describing the processing timings according to the embodiment of the present invention.

FIG. 57 is a diagram for describing the processing timings according to the embodiment of the present invention. With reference to FIG. 57, in the present variant, the exposure time length in each imaging is maintained at a constant value when acquiring a plurality of input images to be used in generating one synthesized image. In other words, imaging starts from time t11 in response to the trigger signal, and exposure continues from time t11 to t12. The exposure time length in other imaging is maintained at a value same as the relevant exposure time length.

Therefore, according to the present variant, the exposure time length in each imaging upon a plurality of imaging processes under different exposure conditions can be maintained constant. In the present variant, enhanced is the imaging accuracy of the work 2 in the input image involved in the change of the exposure time length since the exposure time length is maintained constant under any exposure condition.

G4. Change of Exposure Condition by Combination

Of the adjustment of the exposure time length described in the above embodiment, the adjustment of the diaphragm amount described above, and the adjustment of the illumination intensity described above, a plurality of such adjustments may be arbitrarily combined to realize different exposure conditions.

H. Other Embodiments

The program according to the present invention may include calling a necessary module, of the program modules provided as part of the operating system (OS) of the computer, with a predetermined array and at a predetermined timing and executing the process. In such a case, the module is not contained in the program itself, and the process is executed in cooperation with the OS. The program not including the module is also encompassed in the program of the present invention.

The program according to the present invention may be provided by being incorporated in one part of other programs. In such a case as well, the program itself does not include the module contained in other programs, and the process is executed in cooperation with other programs. The program incorporated in such other programs is also encompassed in the program of the present invention.

The program product to be provided is executed by being installed in a program storage unit such as a hard disk. The program product includes the program itself and the recording medium on which the program is stored.

Some or all of the functions implemented by the program of the present invention may be configured by dedicated hardware.

The embodiments disclosed herein are illustrative in all aspects and should not be construed as being restrictive. The scope of the invention is defined by the claims rather than by the above description, and all modifications equivalent in meaning to the claims and within the scope thereof are intended to be encompassed therein.

What is claimed is:

1. An image processing device comprising:
    a camera interface unit, connected to an imaging unit for imaging a measuring article and generating image data, for receiving the image data imaged by the imaging unit;
    a display screen output unit, connected to a display unit, for outputting display image data to be displayed on the display unit;
    an input unit for accepting an input from outside;
    an acquiring unit for acquiring a plurality of images by imaging a plurality of times under different exposure conditions using the imaging unit;
    a specifying unit for specifying positions of the specific measuring article contained in a plurality of first images acquired by the acquiring unit, respectively;
    an extraction unit for extracting second images having same sizes from the plurality of first images with the positions of the measuring article as references, respectively; and
    a synthesizing unit for generating a synthesized image with a dynamic range enlarged by synthesizing the plurality of second images.

2. The image processing device according to claim 1, further comprising:
    a registering unit for registering at least one of a reference image showing the specific measuring article and characteristic information of the specific measuring article; wherein
    the specifying unit specifies the positions of the specific measuring article respectively by searching for one of the pre-registered reference image and the characteristic information in the first images.

3. The image processing device according to claim 2, wherein
    the registering unit includes:
        a portion for extracting a region specified as the reference image from each of a plurality of third images acquired by the acquiring unit: and
        a portion for performing at least one of registration of the plurality of extracted references images in correspondence with the respective exposure conditions and registration of the characteristic information contained in each of the plurality of extracted reference images in correspondence with the exposure condition of the reference image corresponding to the characteristic information, and
    the specifying unit performs searching using at least one of the reference image and the characteristic information corresponding to the exposure condition for each of the first images.

4. The image processing device according to claim 2, wherein the registering unit extracts as the reference image a region having a preset size as a size of the second image to be extracted from the first image.

5. The image processing device according to claim 2, wherein the registering unit extracts as the reference image a region having a size independent from a region having a preset size as the size of the second image to be extracted from the first image according to the input to the input unit.

6. The image processing device according to claim 1, wherein the size of the second image is set on the image being displayed while the image imaged by the imaging unit is being displayed on the display unit.

7. The image processing device according to claim 1, further comprising:
    an abnormality monitoring unit for notifying an error when at least one of specification of the positions of the measuring article in the plurality of first images by the specifying unit and extraction of the plurality of second images from the plurality of first images is abnormal.

8. The image processing device according to claim 7, wherein the abnormality monitoring unit displays the region of each of the plurality of extracted second images in correspondence with a view of the imaging unit.

9. The image processing device according to claim 7, wherein the abnormality monitoring unit monitors both of an abnormality in specification of the positions corresponding to the reference images in the plurality of first images and an abnormality in extraction of the plurality of second images from the plurality of first images, and notifies the error with a type of the abnormality being distinguished.

10. The image processing device according to claim 7, wherein the abnormality monitoring unit determines presence of an abnormality according to whether or not a temporal position change of the region of the extracted second image indicates a change estimated from a line speed for conveying the measuring article.

11. The image processing device according to claim 1, wherein the specifying unit specifies the position of the specific measuring article in one of the subsequently acquired first images by extracting a preset region in one of the first images as a reference image showing the specific measuring article and searching for the reference image in the subsequent first image.

12. The image processing device according to claim 11, wherein
    the specifying unit extracts the preset region in the first image acquired first as a first reference image showing the specific measuring article, specifies the position of the specific measuring article in the first image acquired second by searching for the first reference image in the first image acquired second, extracts a region corresponding to a position of the first reference image searched in the first image acquired second as a second reference image showing the specific measuring article, and specifies the position of the specific measuring article in the first image acquired third by searching for the second reference image in the first image acquired third.

13. The image processing device according to claim 11, wherein the synthesizing unit limits a target region for generation of the synthesized image in each of the plurality of first images to a region set according to the input to the input unit.

14. The image processing device according to claim 11, wherein the specifying unit searches in the subsequently acquired first image with limitation to a region corresponding to a movement amount that is calculated by a product of a movement velocity of the measuring article in a view of the imaging unit set according to the input to the input unit and a time length required to acquire the plurality of images under the exposure conditions set according to the input to the input unit.

15. The image processing device according to claim 12, further comprising:

a position correction unit for correcting a relative positional relationship between a preceding first image and the subsequent first image so as to correspond to a movement amount, when a relative position shift amount between the preceding first image and the subsequent first image in performing alignment with the specific measuring article in the images as the reference in a series of the plurality of times of imaging by the acquiring unit is different at least by a predetermined value from the movement amount calculated by a product of a movement velocity of the measuring article in a view of the imaging unit set according to the input to the input unit and a time length required to acquire the preceding and subsequent first images under the exposure conditions set according to the input to the input unit.

16. The image processing device according to claim 1, further comprising:

a guide unit for displaying a guide on the display unit by providing the display screen output unit with information indicating a size of a maximum range for generation of the synthesized image of the specific measuring article, according to a movement distance calculated by a product of a movement velocity of the measuring article in a view of the imaging unit set according to the input to the input unit and a time length required to acquire the plurality of images under the exposure conditions set according to the input to the input unit.

17. The image processing device according to claim 16, wherein the guide unit displays the guide on the image imaged by the imaging unit.

18. The image processing device according to claim 16, wherein the synthesizing unit extracts partial images having a predetermined size from the plurality of images, respectively, and generates the synthesized image from the extracted partial images; and the size of the partial images is set on the image being displayed while the image imaged by the imaging unit is being displayed on the display unit.

19. The image processing device according to claim 16, further comprising:

an accepting unit for accepting a line speed for conveying the measuring article and a size of the synthesized image; wherein the guide unit calculates a length of the guide in a conveying direction according to the line speed and the size of the synthesized image.

20. The image processing device according to claim 19, further comprising:

a display control unit for causing the display unit to display the plurality of images acquired by starting the plurality of times of imaging under a plurality of different imaging conditions contained in the determined setting for synthesizing upon the measuring article passing a reference position of a conveying line, with coinciding in a scale size and a direction with respect to a movement direction of the measuring article in the view of the imaging unit.

* * * * *